United States Patent [19]
Takagi et al.

[11] Patent Number: 5,636,275
[45] Date of Patent: Jun. 3, 1997

[54] HINGE MECHANISM AND FOLDABLE PORTABLE TELEPHONE HAVING THE HINGE MECHANISM

[75] Inventors: Hisamitsu Takagi; Takahiro Agai; Tatsuzi Shigeta; Shigeru Takahashi; Yosiaki Kato, all of Kawasaki, Japan

[73] Assignee: Fujitsu Limited, Kanagawa, Japan

[21] Appl. No.: 598,209

[22] Filed: Feb. 6, 1996

[30] Foreign Application Priority Data

Mar. 31, 1995 [JP] Japan ................... 7-076761
May 30, 1995 [JP] Japan ................... 7-132302

[51] Int. Cl.⁶ .................................. H04M 1/00
[52] U.S. Cl. ........................... 379/433; 379/434
[58] Field of Search ........................ 379/433, 434, 379/428; 455/89, 90; 16/342, 325

[56] References Cited

U.S. PATENT DOCUMENTS

| | | |
|---|---|---|
| 4,822,965 | 4/1989 | Hyogo et al. . |
| 5,274,882 | 1/1994 | Persson . |
| 5,354,028 | 10/1994 | Kitamura ................ 16/342 |

FOREIGN PATENT DOCUMENTS

| | | |
|---|---|---|
| 0374721 | 6/1990 | European Pat. Off. . |
| 64-59992 | 3/1989 | Japan . |
| 5-263563 | 10/1993 | Japan . |

*Primary Examiner*—Jack K. Chiang
*Attorney, Agent, or Firm*—Helfgott & Karas

[57] ABSTRACT

A hinge mechanism for use in a portable telephone in which a foldable lid is rotatably supported by the hinge mechanism to rotate the foldable lid between an opened position and a closed position, includes a rotary shaft on which the lid is rotatably supported. A first spring, fitted to the shaft, generates a biasing force to rotate the lid on the shaft in a first direction from the closed position to the opened position. A second spring, fitted to the shaft, generates a biasing force to rotate the lid on the shaft in a second direction opposite to the first direction after the lid is further rotated from the opened position in the first direction. A first stopper restricts a rotation of the shaft in the first direction to cancel the biasing force of the first spring when the lid is further rotated on the shaft in the first direction from the opened position. A second stopper restricts a rotation of the shaft in the second direction to cancel the biasing force of the second spring when the lid is rotated on the shaft in the second direction back to the opened position after the lid is further rotated in the first direction from the opened position.

25 Claims, 46 Drawing Sheets

40

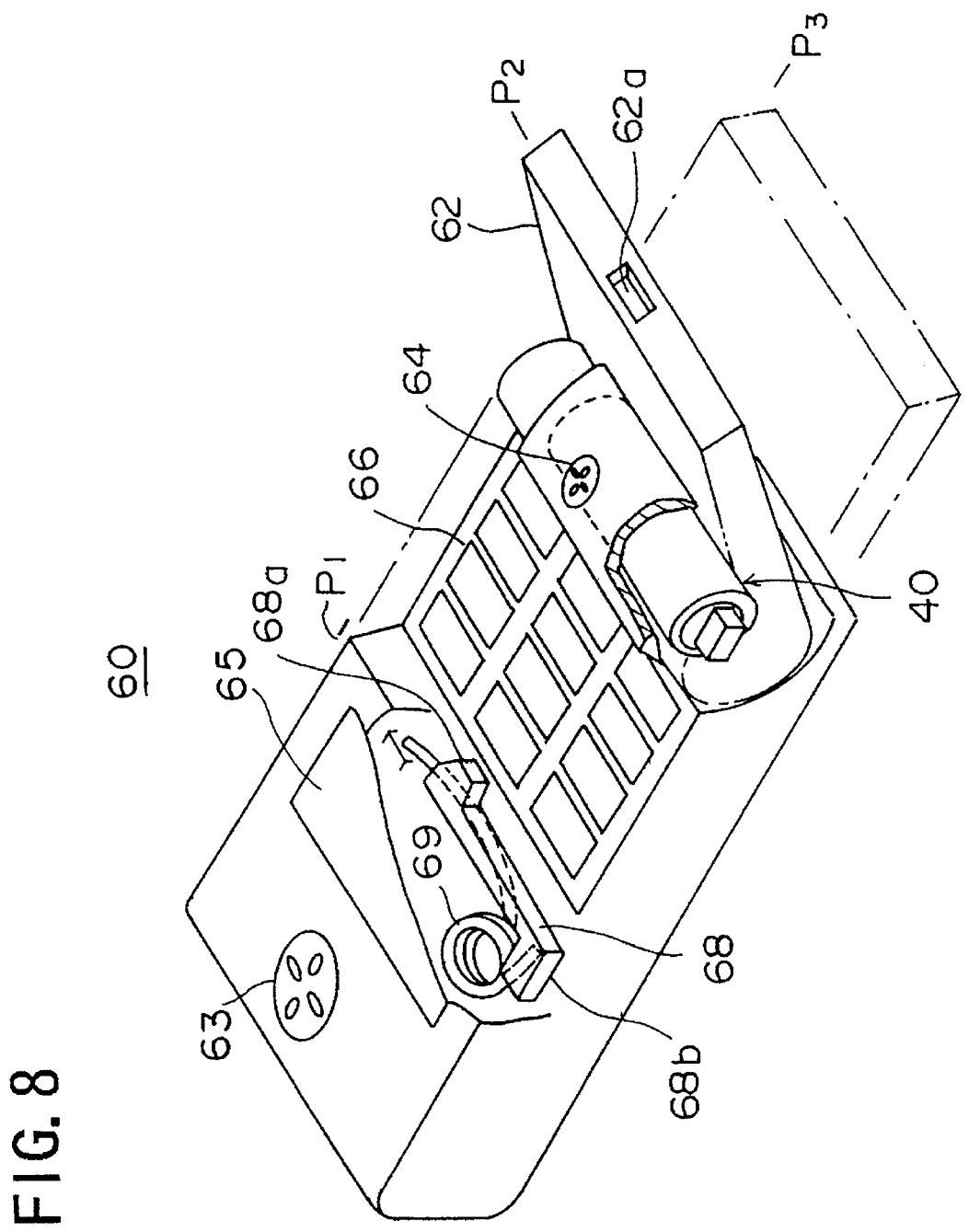

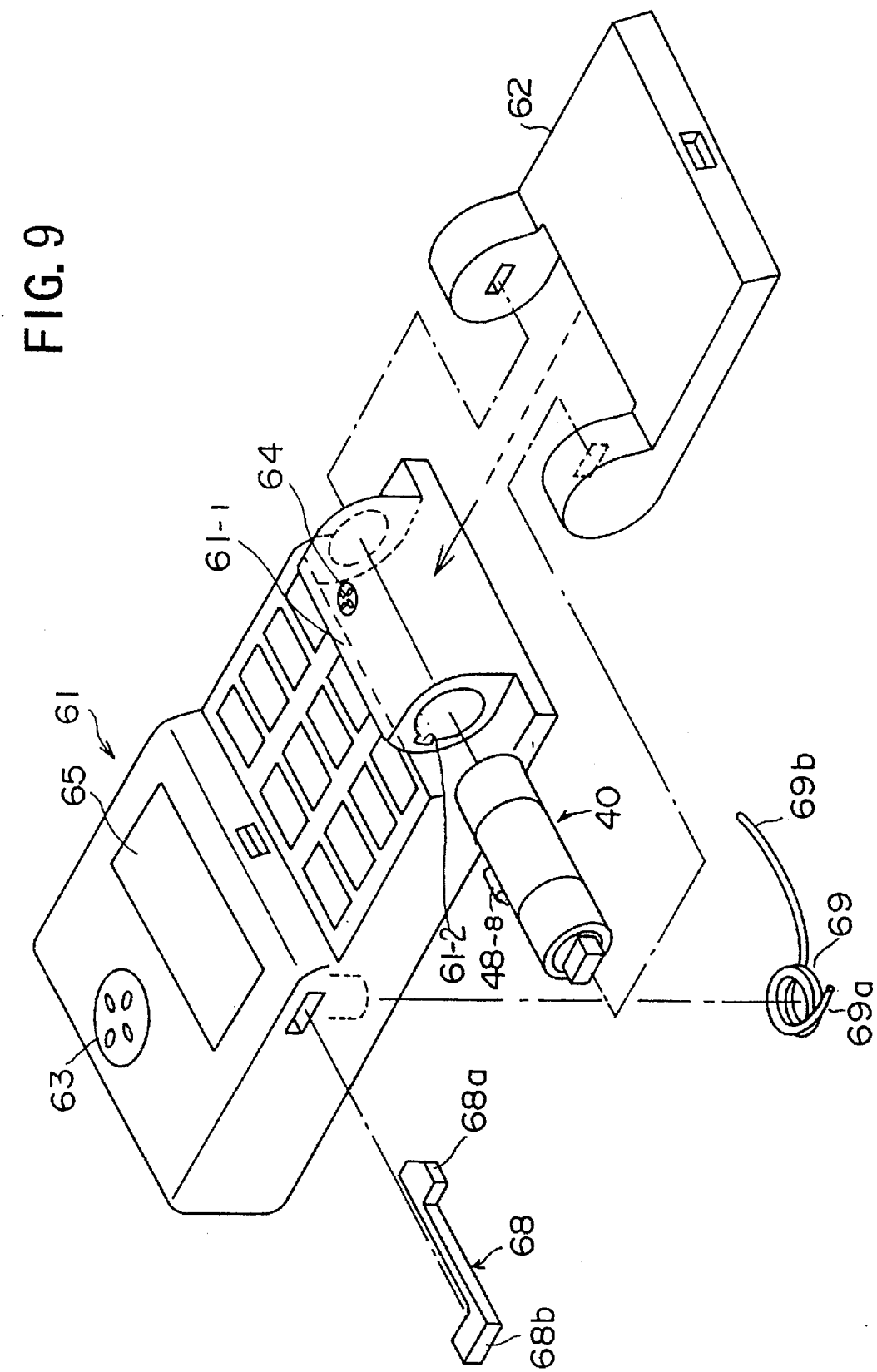

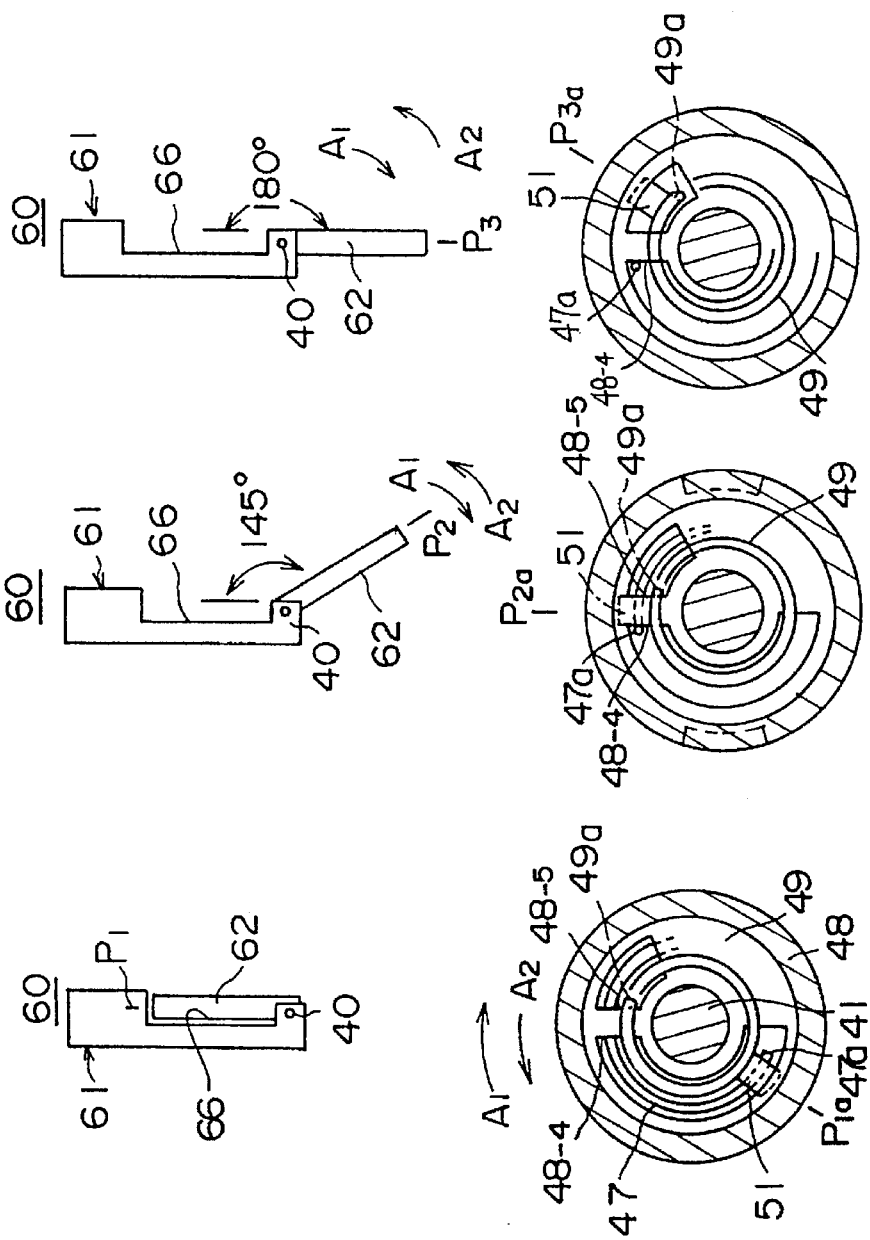

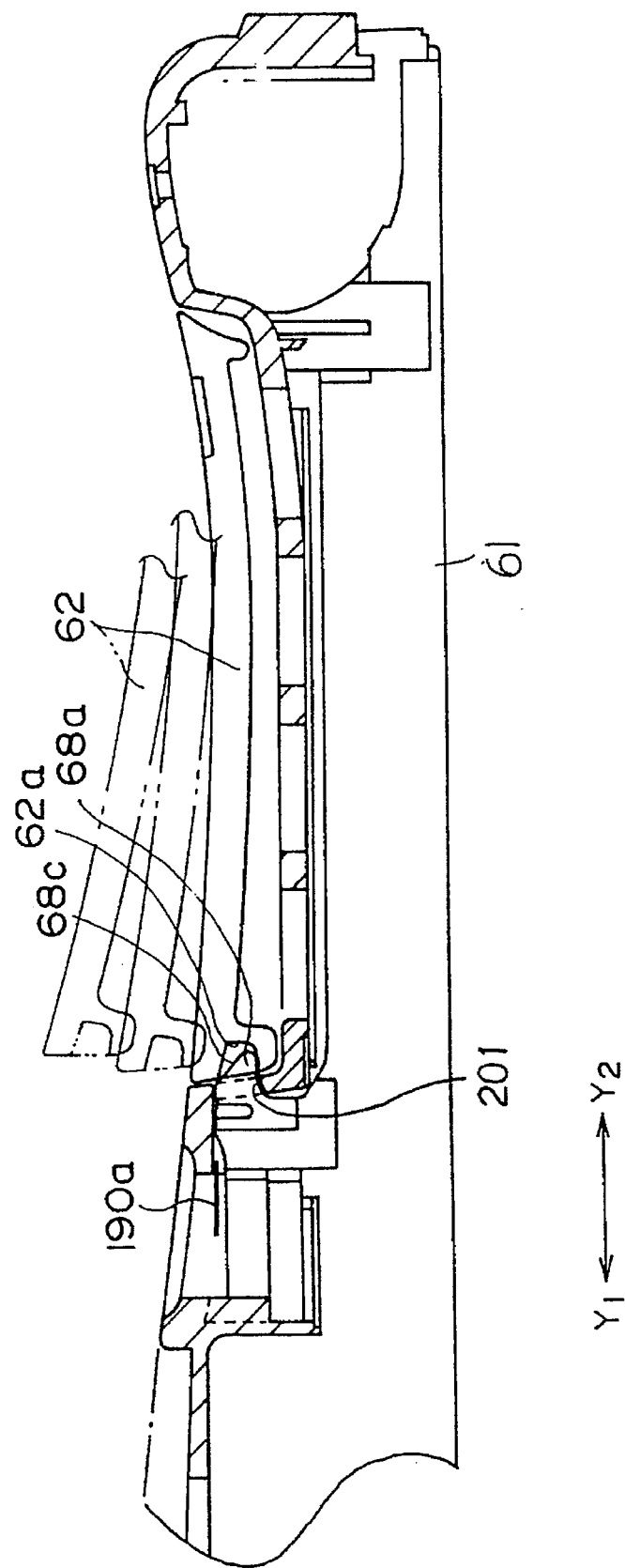

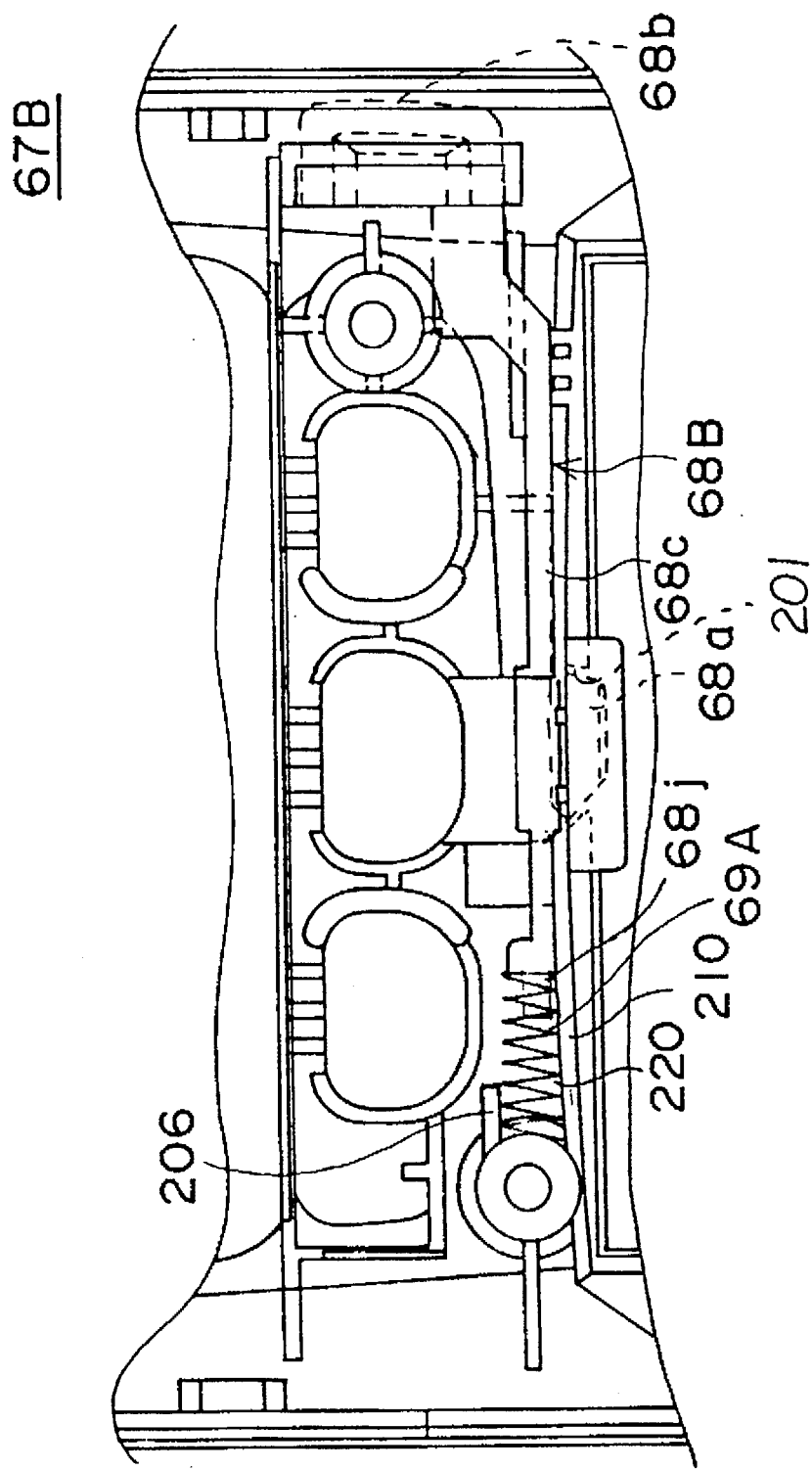

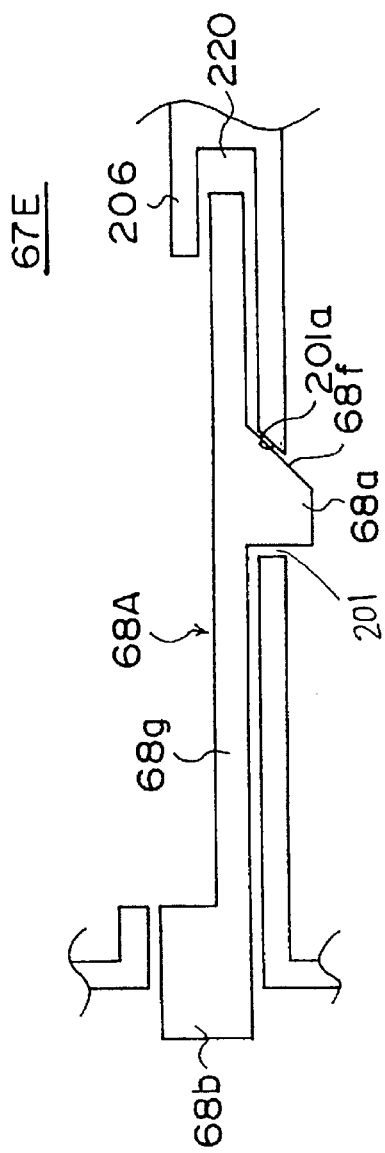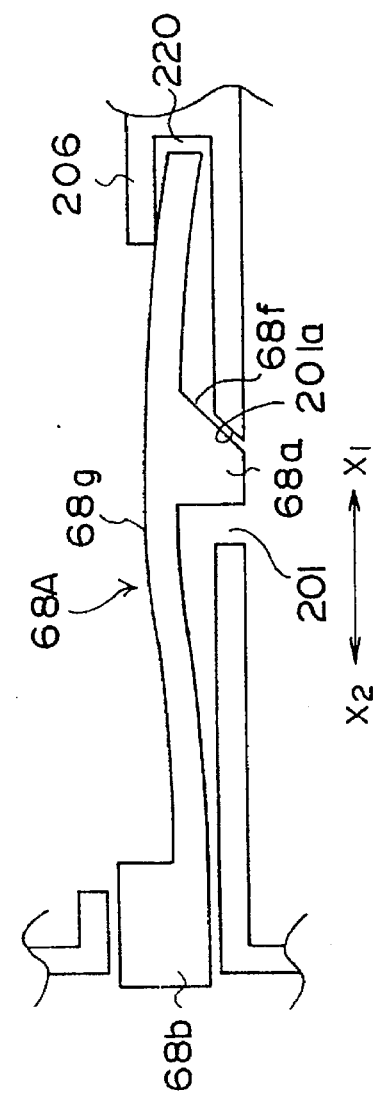

HINGE MECHANISM AND FOLDABLE PORTABLE TELEPHONE HAVING THE HINGE MECHANISM

BACKGROUND OF THE INVENTION (1) Field of the Invention

The present invention relates to a hinge mechanism and a foldable portable telephone having the hinge mechanism.

(2) Description of the Related Art

A foldable portable telephone 10 is shown in FIGS. 1A, 1B and 1C. The portable telephone 10 generally has a telephone body 11 and a foldable lid 12. The lid 12 is rotatably supported to the body 11 by a hinge 13. The lid 12 is opened away from or closed to the body 11 in rotating directions indicated by arrows "A1" and "A2" in FIGS. 1B and 1C.

A folded condition of the portable telephone 10 when it is not in use is shown in FIG. 1A. When the portable telephone 10 is in the folded condition, the lid 12 is placed in a closed position "P1". The telephone body 11 includes a ten-key portion 14, and the ten-key portion 14 is fully covered with the lid 12 in the closed position P1. The hinge 13 at this time is locked to fix the lid 12 to the body 11.

An unfolded condition of the portable telephone 10 when it is in use is shown in FIG. 1B. The hinge 13 is unlocked before the use of the portable telephone, and the lid 12 is rotated 145° in the direction A1 to an opened position "P2".

There is shown in FIG. 1C a condition of the portable telephone 10 when an external force is accidentally exerted onto the lid 12 in the direction A1, for example, when the portable telephone 10 is dropped. The lid 12 at such a time may be forced to a position "P2" that is 180° away from the body 11. Then, the lid 12 is rotated in the direction A2 from the position "P3" to the position "P2".

It is necessary that the hinge 13 of the foldable portable telephone 10 meets the following requirements:
a) The hinge automatically rotates the lid 12 in the direction "A1" from the closed position "P1" when the hinge is unlocked.
b) The hinge holds the lid 12 at the opened position "P2".
c) The hinge permits the lid 12 to be rotated in the direction "A1" from the position "P2" to the position "P3".
d) The hinge returns the lid 12 back to the position P2 if the lid 12 is rotated in the direction "A1" from the position "P2" to the position "P3".

In addition, it is desirable that the hinge 13 of the foldable portable telephone 10 meets the following requirements:
e) The hinge is small in size.
f) The hinge is built in a module.
g) The hinge includes a damper.

FIG. 2 shows a conventional hinge mechanism 20. The hinge mechanism 20 includes a pipe 21, a first helical torsion spring 22, a second helical torsion spring 23, and a connecting unit 24. The hinge mechanism 20 is used as the hinge 13 of the foldable portable telephone 10 in FIGS. 1A through 1C. In FIG. 2, the elements which are the same as corresponding elements in FIGS. 1A through 1C are designated by the same reference numerals.

The hinge mechanism 20 rotates the lid 12 in the direction "A1" to the opened position "P2" by using a resilient biasing force of the first helical torsion spring 22.

The hinge mechanism 20 returns the lid 12 back to the position "P2" by using a resilient biasing force of the second helical torsion spring 23 if the lid 12 is excessively rotated in the direction "A1" toward the position "P3"

The first helical torsion spring 22 has an arm portion 22a at one end of the spring 22, and the arm portion 22a is fitted in a slit 25a of a shaft 25. The shaft 25 is secured to the telephone body 11. The first helical torsion spring 22 has an arm portion 22b at the other end of the spring 22, and the arm portion 22b is brought into contact with the top of a plate 27. The plate 27 is secured to the lid 12.

The second helical torsion spring 23 has an arm portion 23a at one end of the spring 23, and the arm portion 23a is inserted between the lid 12 and the bottom of the plate 27. The second helical torsion spring 23 has an arm portion 23b at the other end of the spring 23, and the arm portion 23b is inserted to a hole 24a of the connecting unit 24.

The connecting unit 24 is rotatably supported on the shaft 25. The connecting unit 24 has a projection 24b, and a rotation of the connecting unit 24 on the shaft 25 is restricted by a connection of the projection 24b to a stopper 28. The stopper 28 is secured to the telephone body 11.

When the hinge mechanism 20 is locked to fix the lid 12 to the body 11 at the closed position "P1", as shown in FIG. 1A, the arm portion 22b is fixed and the first helical torsion spring 22 is twisted. A rotation of the connecting unit 24 on the shaft 25 is possible, and the arm portion 23b of the second helical torsion spring 23 is not fixed. The second helical torsion spring 23 is not twisted.

When the hinge mechanism 20 is unlocked, the lid 12 is rotated from the position "P1" in the direction "A1" due to the biasing force of the spring 22. The connecting unit 24 at this time is freely rotated on the shaft 25.

When the connecting unit 24 is rotated on the shaft 25 until the projection 24b touches the stopper 28, the biasing force of the spring 23 starts to act on the connecting unit 24 against the biasing force of the spring 22. The rotation of the lid 12 to the body 11 is stopped when the biasing force of the spring 23 and the biasing force of the spring 22 are in an equilibrium condition. The lid 12 is held at the opened position "P2".

FIG. 3 shows a condition of the hinge mechanism 20 in which the lid 12 is held at the position "P2". In FIG. 3, the biasing force "F1" of the spring 22 and the biasing force "F2" of the spring 23 are in an equilibrium condition.

When an external force is accidentally exerted onto the lid 12 in the direction "A1" at the position "P2", the lid 12 is further rotated in the direction "A1" to the position "P3" by the external force against the biasing force of the spring 23.

When the external force is no longer exerted on the lid 12, the lid 12 is rotated in the direction "A2" toward the position "P2" due to the biasing force of the spring 23.

FIGS. 4A and 4B show a conventional locking member 30. The locking member 30 includes a push button 31, a locking unit 32, a helical tension spring 33, and a helical compression spring 34. The locking member 30 is used to lock or unlock the hinge mechanism 10.

In FIG. 4A, a condition of the locking member 30 before the push-button 31 is pushed to the right (or in a direction indicated by an arrow X1 in FIG. 4B) is shown. The tension spring 33 is in a compressed state and the compression spring 34 is in an expanded state. The locking unit 32 is depressed by the compression spring 34 in a direction indicated by an arrow U2 in FIG. 4B. A downward extension 32a of the locking unit 32 projects downward from an opening 35.

In FIG. 4B, a condition of the locking member 30 after the push button 31 is pushed by the user to the right to lock the hinge mechanism 20 is shown. The locking unit 32 is pushed by the push button 31 in the direction indicated by the arrow X1 in FIG. 4B. A slot 32b of the locking unit 32 is guided by a pin 36 so that the locking unit 32 is moved up, against a biasing force of the spring 34, in a direction indicated by an arrow U1 in FIG. 4B. The downward extension 32a of the locking unit 32 is retracted upward from the opening 35, and the locking of the hinge mechanism 20 is thereby canceled. If the push button 31 is released by the user, the push button 31 and the locking unit 32 are returned, due to the biasing forces of the spring 33 and the spring 34, respectively, back to their initial positions shown in FIG. 4A.

Accordingly, the above-described hinge mechanism 20 has the following problems.

a) The flexibility of design is restricted.

When the portable telephone 10 is in use, the lid 12 must be held at the position P2 where the biasing force F1 of the spring 22 and the biasing force F2 of the spring 23 are in the equilibrium condition. Suppose that the spring 22 has a spring constant K1 and the spring 23 has a spring constant K2. To allow the lid 12 to be held at the position P2, it is necessary that the springs 22 and 23 meet the requirement: K1<K2. If K1≧K2, a position at which the lid 12 is actually held when the portable telephone 10 is in use incorrectly deviates from the position P2.

Therefore, since it is difficult to independently determine the spring constant K1 of the spring 22 and the spring constant K2 of the spring 23, the flexibility of design is restricted.

b) The lid 12 cannot be smoothly moved when it is folded or unfolded.

As described above, the springs 22 and 23 must meet the requirement: K1<K2. It is likely that the lid 12 is rotated from the position P1 to the position P2 too slowly or too quickly. Also, it is likely that the lid 12 moves irregularly.

c) Assembling operations to incorporate the hinge mechanism 20 into the foldable portable telephone 10 is not easily performed.

The hinge mechanism 20 is not built into a module. The assembling operation to incorporate the hinge mechanism 20 in the portable telephone 10 requires a large amount of assembling labor or time.

In addition, the hinge mechanism 20 requires a relatively large size if a connector is included in the hinge mechanism 20.

The above-described locking member 30 is, as shown in FIGS. 4A and 4B, comprised of the push-button 31, the locking unit 32, the helical tension spring 33, and the helical compression spring 34, which are separate independent parts. The locking member 30 requires a relatively large space of the portable telephone. It is difficult to reduce the size of the portable telephone 10 with the locking member 30.

SUMMARY OF THE INVENTION

An object of the present invention is to provide an improved hinge mechanism in which the above-described problems are eliminated.

Another object of the present invention is to provide a hinge mechanism which ensures a smooth operation of a foldable portable telephone.

Still another object of the present invention is to provide a hinge mechanism which increases the flexibility of design of the portable telephone.

A further object of the present invention is to provide a hinge mechanism which facilitates assembling operations to incorporate the hinge mechanism into the portable telephone.

Another object of the present invention is to provide a foldable portable telephone having an improved hinge mechanism in which the above-described problems are eliminated.

The above-mentioned objects of the present invention are achieved by a hinge mechanism which includes: a rotary shaft on which a foldable lid is rotatably supported; a first spring, fitted to the shaft, which generates a biasing force to rotate the lid on the shaft in a first direction from a closed position to an opened position; a second spring, fitted to the shaft, which generates a biasing force to rotate the lid on the shaft in a second direction opposite to the first direction after the lid is further rotated from the opened position in the first direction; a first stopper which restricts a rotation of the shaft in the first direction to cancel the biasing force of the first spring when the lid is further rotated on the shaft in the first direction from the opened position; and a second stopper which restricts a rotation of the shaft in the second direction to cancel the biasing force of the second spring when the lid is rotated on the shaft in the second direction back to the opened position after the lid is further rotated in the first direction from the opened position. The above hinge mechanism is so arranged to stop the rotation of the lid on the shaft and hold the lid at the opened position when the biasing force of the first spring is canceled by the first stopper and the biasing force of the second spring is canceled by the second stopper.

The above-mentioned objects of the present invention are achieved by a hinge mechanism which includes: a casing; a first shaft rotatably connected to the casing; a second shaft on which a foldable lid of a portable telephone is rotated, the first shaft and the second shaft being rotatably connected to each other; a first spring, connected to the casing and the first shaft, which generates a biasing force to rotate the first shaft relative to the casing in a first direction in which the lid is rotated from a closed position to an opened position; a second spring, connected to the first shaft and the second shaft, which generates a biasing force to rotate the first shaft relative to the second shaft in a second direction opposite to the first direction after the lid is further rotated from the opened position in the first direction; a first stopper which restricts a rotation of the first shaft to the casing in the first direction to cancel the biasing force of the first spring when the lid is further rotated in the first direction from the opened position; and a second stopper which restricts a rotation of the first shaft to the second shaft in the second direction to cancel the biasing force of the second spring when the lid is rotated in the second direction back to the opened position after the lid is further rotated in the first direction from the opened position. The above hinge mechanism is so arranged to stop the rotation of the lid on the second shaft and hold the lid at the opened position when the biasing force of the first spring is canceled by the first stopper and the biasing force of the second spring is canceled by the second stopper.

The hinge mechanism of the present invention makes it possible to increase the flexibility in design of the foldable portable telephone. It is possible that the hinge mechanism of the present invention ensures a smooth operation of the foldable portable telephone. It is possible that the hinge mechanism of the present invention facilitates the assembling operations to incorporate the hinge mechanism into the foldable portable telephone.

BRIEF DESCRIPTION OF THE DRAWINGS

The above and other objects, features and advantages of the present invention will be more apparent from the following detailed description when read in conjunction with the accompanying drawings in which:

FIG. 8 is a perspective view of a foldable portable telephone including the hinge mechanism in FIG. 5;

FIG. 9 is an exploded view of the portable telephone in FIG. 8;

FIGS. 10A through 10F are views of the portable telephone in FIG. 8;

FIG. 35 is a cross-sectional view of the lid locking member taken along a line XXXV—XXXV in FIG. 31;

FIGS. 40A, 40B and 41 are diagrams showing another modification of the lid locking member;

FIGS. 46A, 46B and 47 are diagrams showing another modification of the lid locking member.

DESCRIPTION OF THE PREFERRED EMBODIMENTS

A description will now be given of various preferred embodiments of the present invention with reference to the accompanying drawings.

Figure 7A:
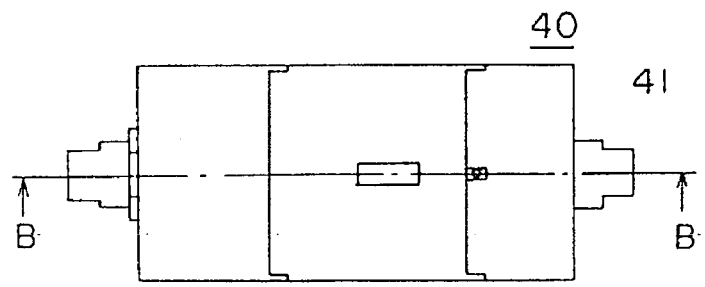
FIGS. 7A through 7F are views of the hinge mechanism in FIG. 5.
Figure 7B:
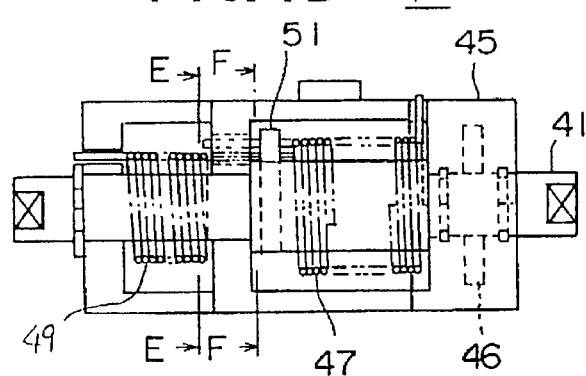
Figure 7C:
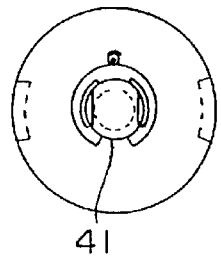
Figure 7D:
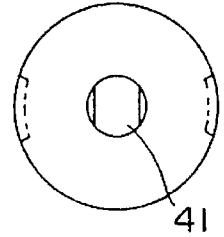
Figure 7E:
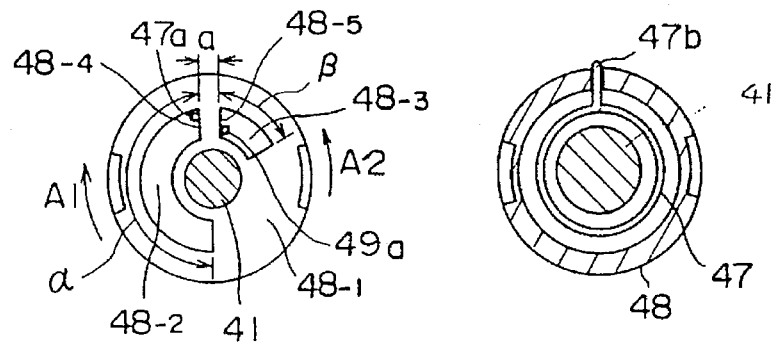
Figure 7F:
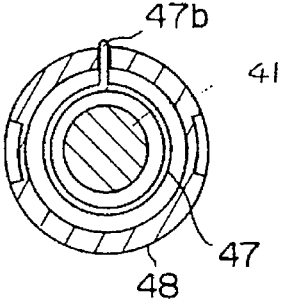

FIGS. 5, 6, and 7A through 7F show a hinge mechanism 40 in a first embodiment of the present invention. FIG. 7B is a cross-sectional view of the hinge mechanism 40 taken along a line B—B in FIG. 7A, and FIG. 7E and FIG. 7F are cross-sectional views of the hinge mechanism 40 taken along a line E—E and a line F—F in FIG. 7B.

Referring to FIGS. 5, 6 and 7A–7F, the hinge mechanism 40 generally has a rotary shaft 41, a rotary oil damper 42, a lid opening member 43, and a lid closing member 44. The lid closing member 44 is provided on a left portion of the shaft 41. The oil damper 42 is provided on a right portion of the shaft 41. The lid opening member 43 is provided in the middle of the shaft 41.

Figure 1A:
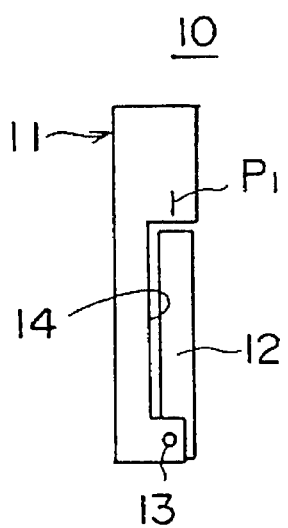
FIGS. 1A, 1B and 1C are diagrams of a foldable portable telephone.
Figure 1B:
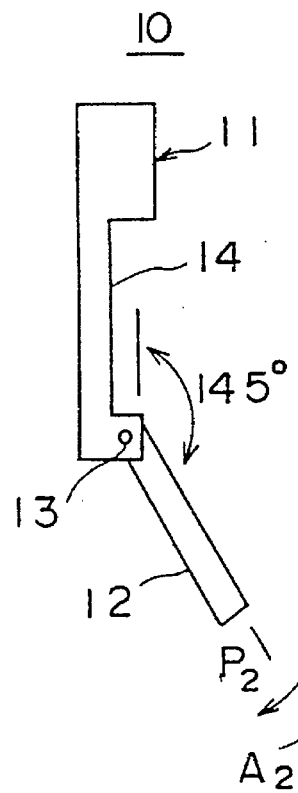
Figure 1C:
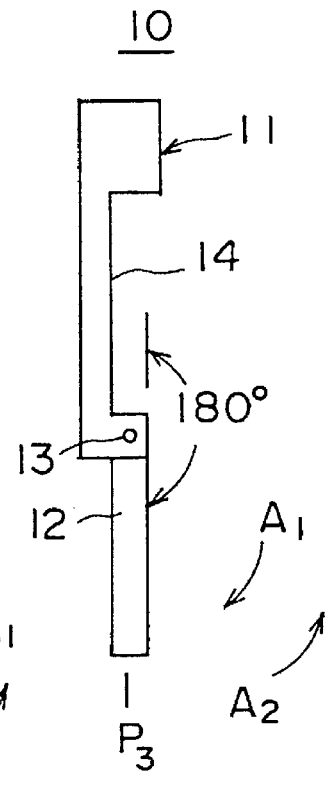
Figure 2:
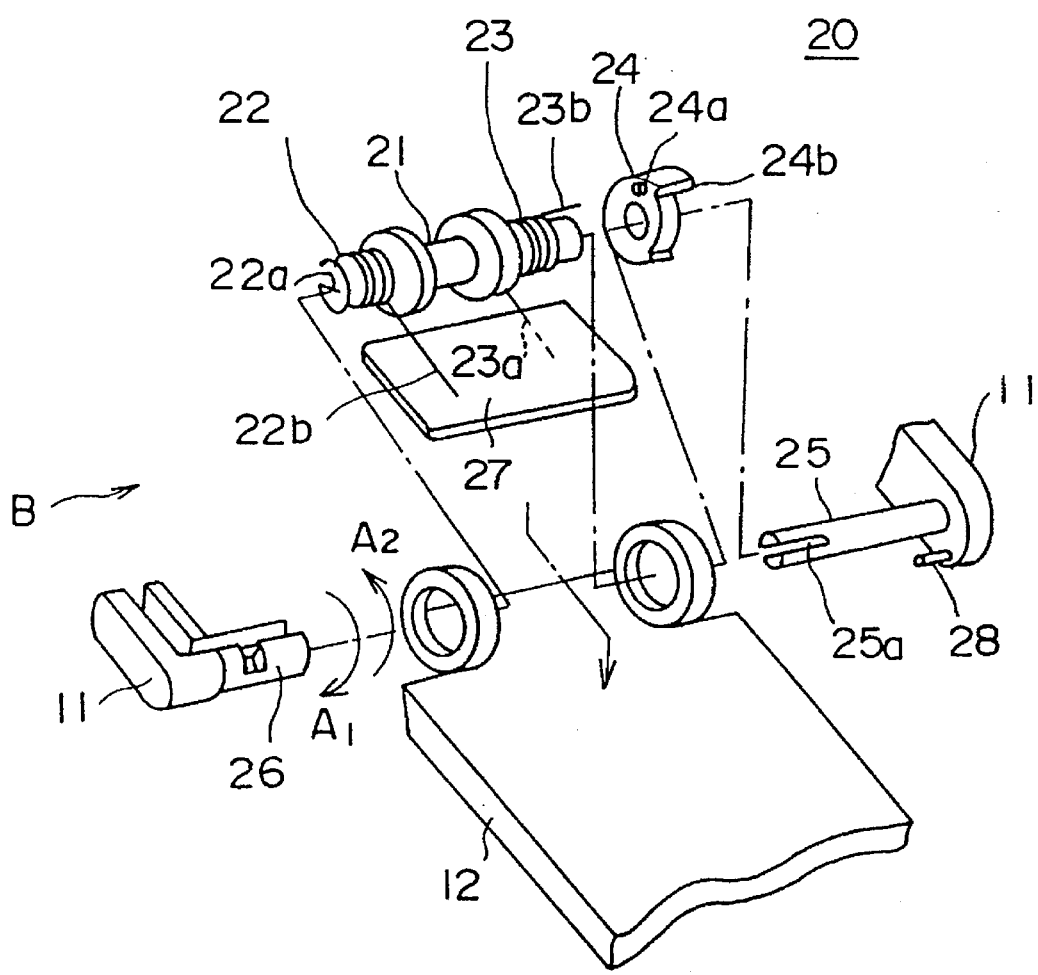
FIG. 2 is an exploded view of a conventional hinge mechanism.
Figure 3:
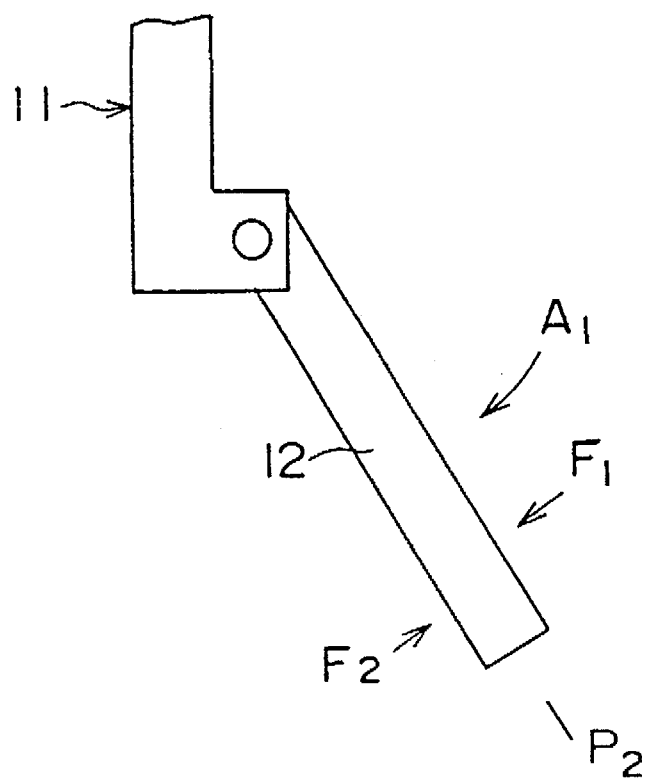
FIG. 3 is a diagram showing a condition of the conventional hinge mechanism in which a foldable lid is held at a position.
Figure 4A:
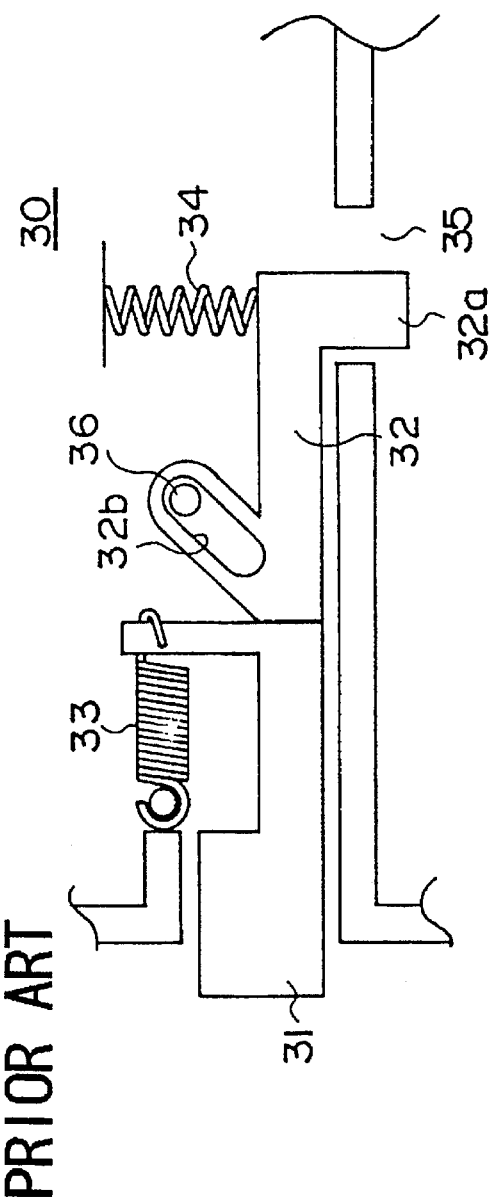
FIGS. 4A and 4B are diagrams showing a locking mechanism of the conventional hinge mechanism in FIG. 2.
Figure 4B:
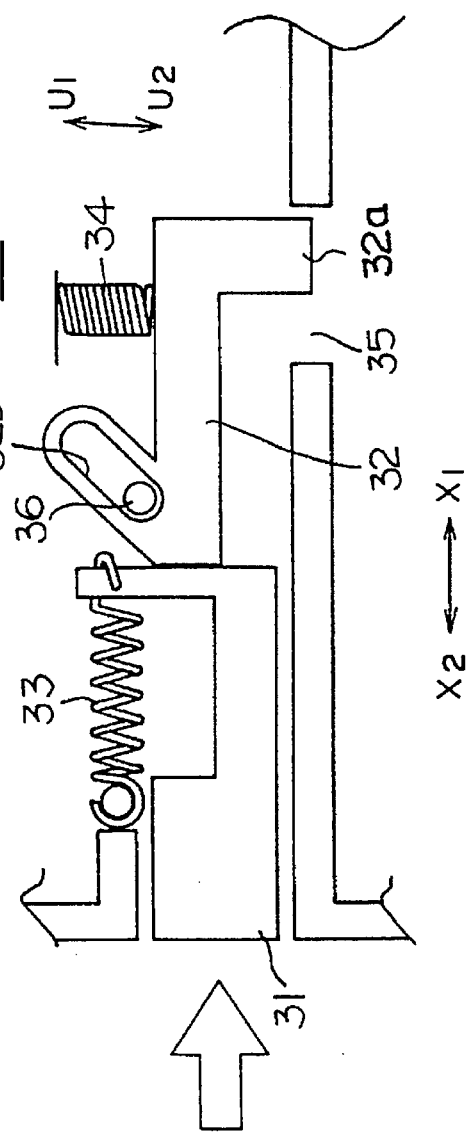
Figure 5:
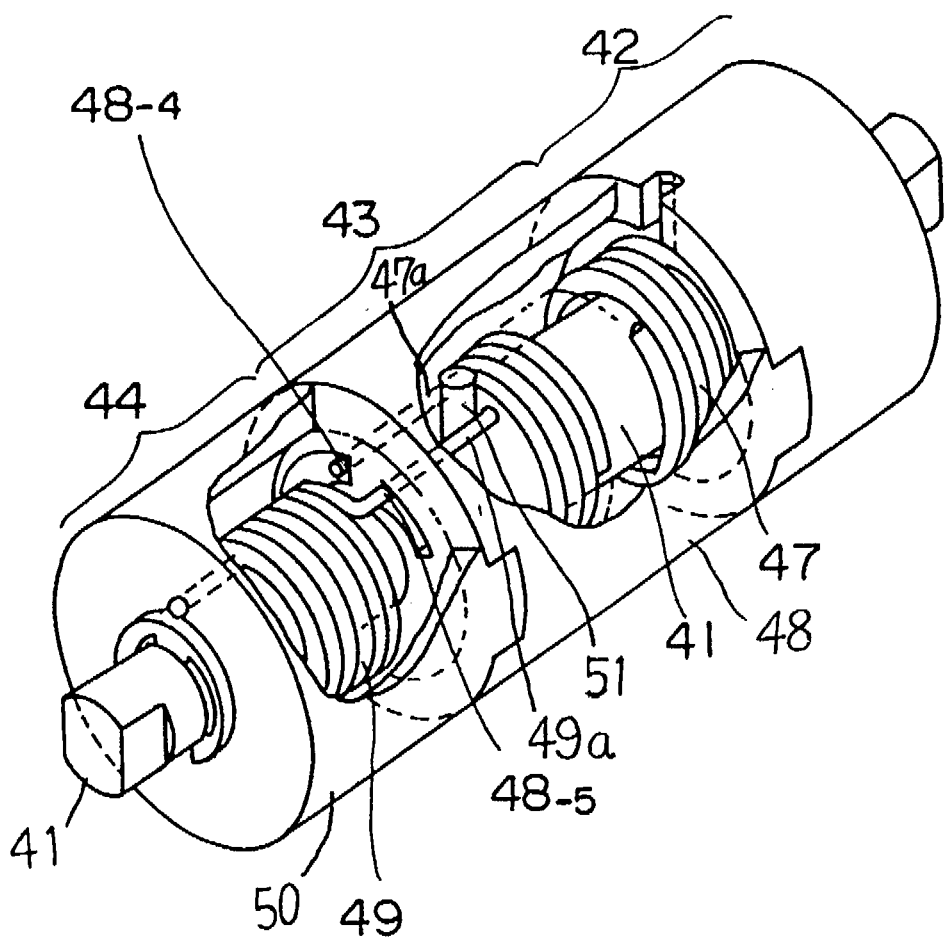
FIG. 5 is a perspective view of a hinge mechanism in a first embodiment of the present invention.
Figure 6:
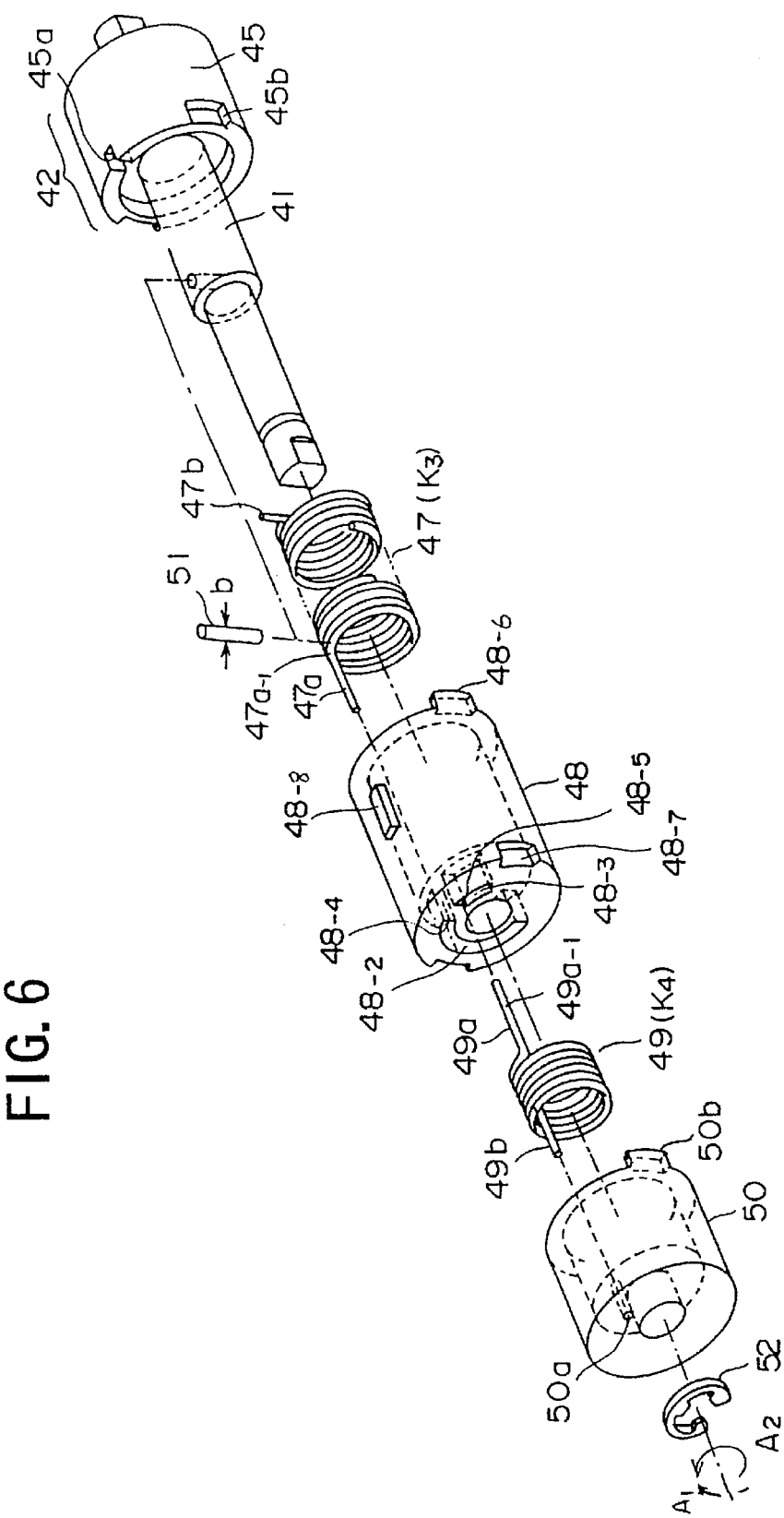
FIG. 6 is an exploded view of the hinge mechanism in FIG. 5.

As shown in FIG. 5, the hinge mechanism 40 is built in a module, and it is shaped into a generally cylindrical part.

The oil damper 42 includes a cylindrical casing 45 and a rotor 46. The casing 45 contains silicon oil therein. The rotor 46 is secured to the rotary shaft 41, and it is rotated integrally with the shaft 41 when the shaft 41 is rotated. A fluid resistance of the silicon oil included in the casing 45 is exerted on blades of the rotor 45 when the rotor 46 is rotated.

The lid opening member 43 includes a helical torsion spring 47 and a cylindrical casing 48. The torsion spring 47 is fitted to the shaft 41. The torsion spring 47 is surrounded by the casing 48. The torsion spring 47 serves as a first spring which rotates the foldable lid on the shaft 41 in the opening direction by a biasing force of the spring 47.

The lid closing member 44 includes a helical torsion spring 49 and a cylindrical casing 50. The torsion coil 49 is fitted to the shaft 41. The torsion spring 49 is surrounded by the casing 50. The torsion spring 49 serves as a second spring which rotates the foldable lid on the shaft 41 in the closing direction by a biasing force of the spring 49.

The casing 48 of the lid opening member 43 has an end face 48-1. As shown in FIG. 7E, the end face 48-1 includes a first circular slit 48-2, a second circular slit 48-3, a first stopper 48-4, and a second stopper 48-5.

The first circular slit 48-2 has an angle "α" that is about 180 degrees. The second circular slit 48-3 has an angle "β" that is about 35 degrees. The first stopper 48-4 is formed by an edge of the first circular slit 48-2. The second stopper 48-5 is formed by an edge of the second circular slit 48-3. A circumferential distance "a" between the first stopper 48-4 and the second circular slit 48-5 is substantially equal to a diameter "b" of a pin 51.

The pin 51 is fixed to the shaft 41. The pin 51 outwardly projects from the shaft 41 in its radial direction. The pin 51 is located backward of the end face 18-1 of the casing 48.

The helical torsion spring 47, which is the first spring, has a spring constant K3. The spring 47 includes an arm portion 47a at one end and an arm portion 47b at the other end. The arm portion 47a extends toward the lid closing member 44 in a direction parallel to the axial direction of the spring 47.

The helical torsion spring 49, which is the second spring, has a spring constant K4. The spring 49 includes an arm portion 49a at one end and an arm portion 49b at the other end. The arm portion 49a extends toward the lid opening member 43 in a direction parallel to the axial direction of the spring 49. The arm portion 49b extends in a direction opposite to the extending direction of the arm portion 49a and parallel to the axial direction of the spring 49.

Taking into account the opening and closing movements of the foldable lid in the portable telephone, the spring constant K3 of the first spring 47 and the spring constant K4 of the second spring 49 are determined independently of each other.

The first spring 47 is secured to the rotary shaft 41 by fitting the arm portion 47b into a cut-out portion 45a of the casing 45 of the oil damper 42. The arm portion 47a is fitted into the slit 48-2 of the casing 48.

The second spring 49 is secured to the shaft 41 by fitting the arm portion 49b into a hole 50a of the casing 50. The arm portion 49a is fitted into the slit 48-3 of the casing 48.

The casing 48 is connected to the casing 45 by fitting a connecting portion 48-6 to a recessed portion 45b of the casing 45. The casing 50 is connected to the casing 48 by fitting a connecting portion 50b to a recessed portion 48-7 of the casing 48. The casing 50 is secured to the shaft 41 by a washer 52.

An assembled condition of the hinge mechanism 40 is shown in FIGS. 5, 7A and 10E. This assembled condition corresponds to a condition of the portable telephone when it is in use for a communication.

In the assembled condition, the first spring 47 is slightly twisted so that the arm portion 47a is rotated in the direction "A2" relative to the fixed arm portion 47b. The arm portion 47a is brought into contact with the first stopper 48-4.

In the assembled condition, the second spring 49 is slightly twisted so that the arm portion 49a is rotated in the direction "A1" relative to the fixed arm portion 49b. The arm portion 49a is brought into contact with the second stopper 48-5.

In the assembled condition, the pin 51 is interposed between the arm portion 47a and the arm portion 49a.

FIGS. 8 and 9 show a foldable portable telephone 60 in which the above-described hinge mechanism 40 is included.

Referring to FIGS. 8 and 9, the portable telephone 60 includes a telephone body 61 with an end portion 61-1. The hinge mechanism 40 is inserted in the end portion 61-1. The portable telephone 60 includes a foldable lid 62. The lid 62 is rotatably supported to the telephone body 61 by the hinge mechanism 40. The lid 62 is fitted to both ends of the shaft 41 of the hinge mechanism 40.

When the lid 62 is fitted to the hinge mechanism 40, the projecting portion 48-6 of the casing 48 is inserted to a recessed portion 61-2 of the telephone body 61. The hinge mechanism 40 is arranged to the telephone body 61 such that the relationship between the angular position of the shaft 41 and the angular position of the lid 62 is initially in accordance with that when the lid 62 lies at the position "P2".

The telephone body 61 includes a receiver portion 63, a transmitter portion 64, a display portion 65, a ten-key portion 66, a locking unit 68, and a spring unit 69. The locking unit 68 and the spring unit 69 constitute a lid locking member which serves to lock or unlock the lid 62 of the portable telephone 60.

The locking unit 68 includes a laterally projecting portion 68a and a push button 68b. The spring unit 69 includes an arm portion 69a and an arm portion 69b. The projecting portion 68a is pushed in its projecting direction by a biasing force from the arm portion 69b of the spring unit 69, and the push button 68b is pushed back in its projecting direction by a biasing force from the arm portion 69a of the spring unit 69.

Referring to FIGS. 10A–10F, the operation of the hinge mechanism 40 which is incorporated in the portable telephone 60 will be described.

A rotating position of the rotary shaft 41 is indicated by an angular distance between the current position of the pin 51 on the shaft 41 and the initial position thereof. More specifically, rotating positions of the rotary shaft 41 when the lid 62 is at the positions "P1", "P2" and "P3" are respectively indicated by "P1a", "P2a" and "P3a" in FIGS. 10A–10F.

(1) When the lid 62 is in the folded condition (or at the closed position "P1" in FIG. 10A), the projecting portion 68a of the locking unit 68 is connected to a recessed portion 62a of the lid 62.

The rotating position of the shaft 41 in this condition is indicated by "P1a". The angular distance between the position "P1a" and the position "P2a" around the center of the shaft 41 is about 145 degrees. The arm portion 47a of the first spring 47 is pushed by the pin 51 so that the first spring 47 is twisted in the direction "A2".

(2) When the push button 68b is pushed by the user, the projecting portion 68a is disconnected from the recessed portion 62a of the lid 62. The shaft 41 is rotated in the direction "A1" due to the biasing force of the first spring 47. The lid 62 is rotated on the shaft 41 in the direction "A1" around the hinge mechanism 40, so that the lid 62 is opened from the closed position "P1" and moved toward the opened position "P2".

(3) When the lid 62 is rotated from the closed position "P1" to the opened position "P2", the rotor 62 of the oil damper 42 within the silicon oil is rotated together with the shaft 41. The shaft 41 is rotated in the direction "A1" at a relatively low speed due to the fluid resistance of the silicon oil acting on the rotor 62. Accordingly, the lid 62 is slowly rotated on the shaft 41 by the hinge mechanism 40.

(4) When the lid 62 is held at the opened position "P2" (FIG. 10B), the arm portion 49a of the second spring 49 is brought into contact with the second stopper 48-5, and the arm portion 47a of the first spring 47 is brought into contact with the first stopper 48-4. A further rotation of the lid 62 in the direction "A1" or "A2" is inhibited by the first and second stoppers 48-4 and 48-5. The biasing force of the first spring 47 to rotate the shaft 41 in the direction "A1" and the biasing force of the second spring 49 to rotate the shaft 41 in the direction "A2" are canceled by the first stopper 48-4 and the second stopper 48-5, respectively.

When the lid 62 is held at the position "P2", the pin 51 is interposed between the arm portion 47a of the first spring and the arm portion 49a of the second spring. The biasing force of the first spring 47 and the biasing force of the second spring 49 do not act on the pin 51.

Accordingly, the rotation of the lid 62 on the shaft is stopped and the lid 62 is held at the opened position "P2" when the biasing force of the first spring 47 is canceled by the first stopper 48-4 and the biasing force of the second spring 49 is canceled by the second stopper 48-5.

As described above, the spring constants K3 and K4 of the first and second springs 47 and 49 can be determined independently of each other. Therefore, even if the spring constants K3 and K4 are determined to be arbitrary values, the hinge mechanism 40 in the above embodiment can hold the lid 62 at a proper position for the use of the portable telephone 60.

(5) When the lid 62 is further rotated from the position "P2" by an external force (FIG. 10C), the arm portion 49a of the second spring 49 is pushed by the pin 51, so that the second spring 49 is twisted in the direction "A1". The shaft 41 is rotated in the direction "A1" to the position "P3a" by the biasing force of the second spring 49, as shown in FIG. 10F. Thus, the lid 62 is rotated on the shaft 41 to the position "P3"

If the external force acting on the lid 62 is removed, the shaft 41 is rotated on the shaft 41 in the direction "A2" from the position "P3a" to the position "P2a". At the position "P2a", the rotation of the shaft 41 is inhibited by the first and second stoppers 48-4 and 48-5. The lid 62 is held at the opened position "P2" as described above.

Figure 11:
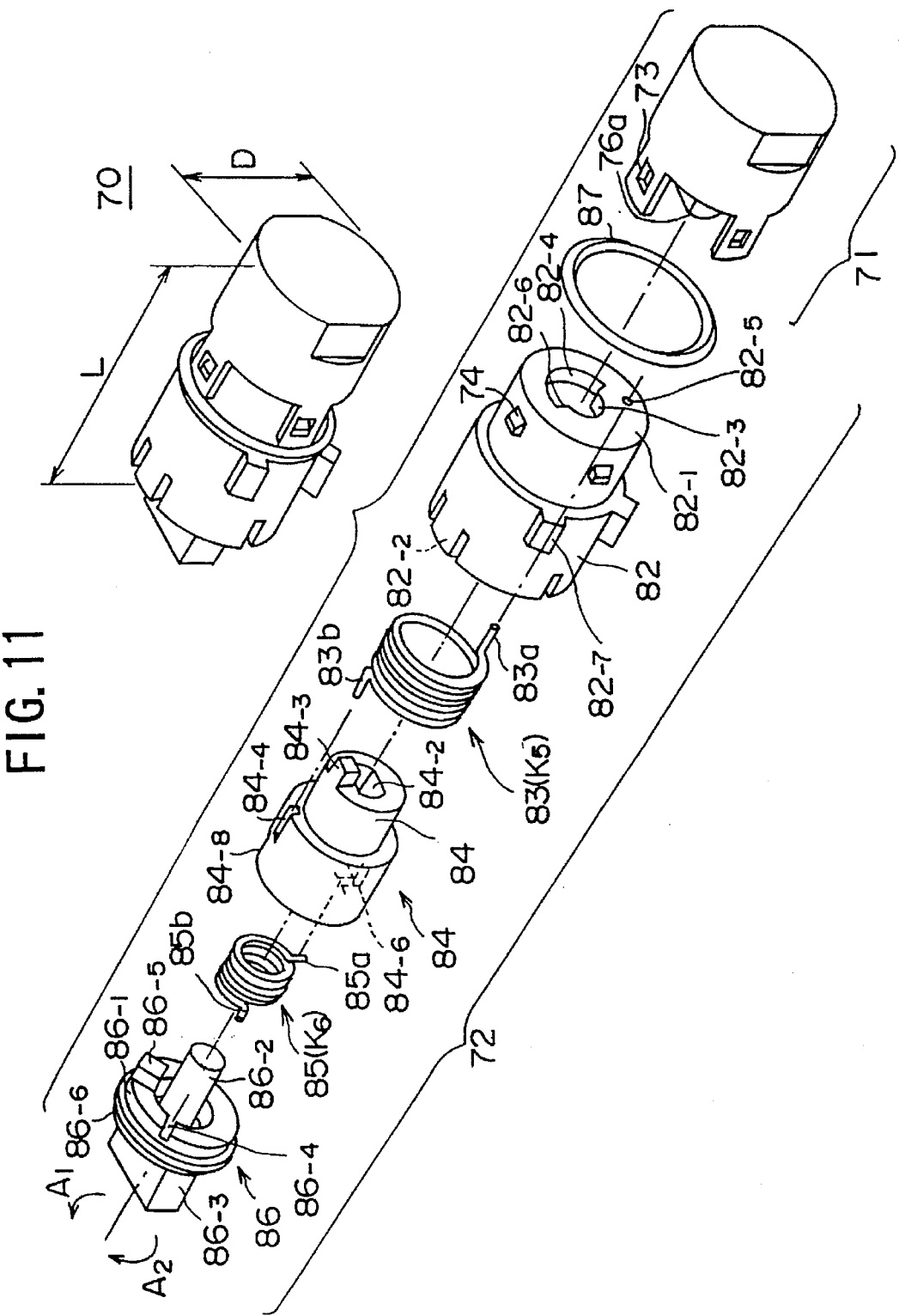
FIG. 11 is a perspective view of a hinge mechanism in a second embodiment of the present invention.
Figure 12:
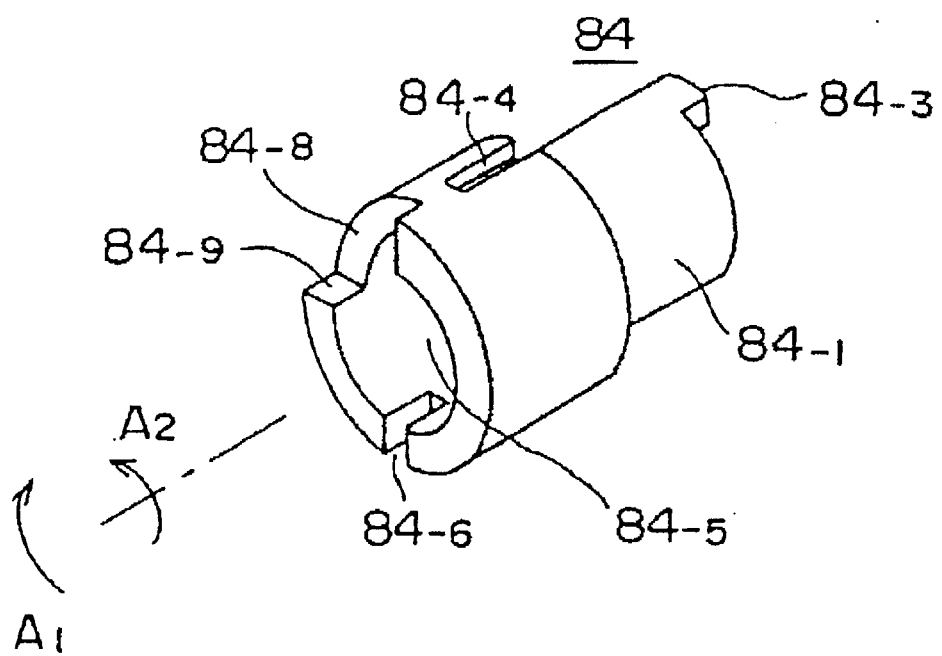
FIG. 12 is a perspective view of a first connecting shaft of the hinge mechanism in FIG. 11.
Figure 13:
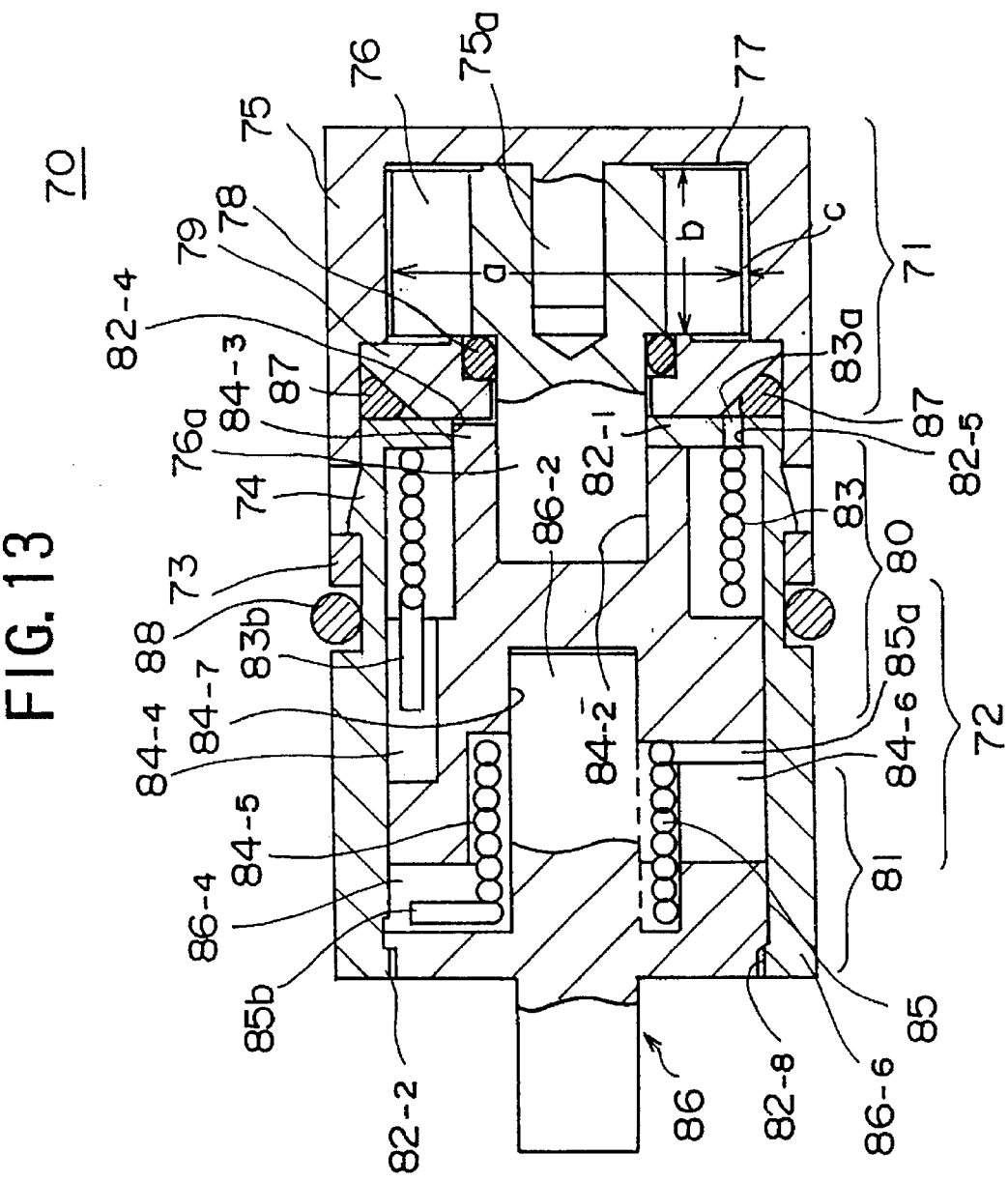
FIG. 13 is a cross-sectional view of the hinge mechanism in FIG. 11.

FIGS. 11, 12 and 13 show a hinge mechanism 70 in a second embodiment of the present invention.

Referring to FIG. 11, the hinge mechanism 70 includes a rotary oil damper 71 and a lid opening/closing member 72. The damper 71 is connected to the member 72 by fitting hooks 73 of the damper 71 to projections 74 of the member 72.

As shown in FIG. 11, the hinge mechanism 70 is built in a module, and it is shaped into a generally cylindrical part. To easily incorporate the hinge mechanism 70 into the foldable portable telephone, the size of the hinge mechanism 70 is very small. An overall diameter "D" of the hinge mechanism 70 is about 8 mm. A length "L" of the hinge mechanism 70 is about 15 mm.

The rotary oil damper 71, as shown in FIG. 13, includes a casing 75 with a shaft 75a, a rotor 76 with blades, an O-ring 78, and a cover 79. A silicon oil 77 is contained within a space between the casing 75 and the rotor 76 in the oil damper 71. The rotor 76 is fitted to the shaft 75a of the casing 75. A connecting portion of the casing 75 and the rotor 76 is sealed with the O-ring 78. The internal space of the oil damper 71 is closed with the cover 79.

The rotor 76 has a diameter "a" (FIG. 13) of about 6 mm, and it has a length "b" (FIG. 13) of about 3 mm. The ratio of the length "b" to the diameter "a" relating to the rotor 76 is approximately ½. The ratio "b/a" relating to the rotor 76 in this embodiment is rather greater than the ratio of the length to the diameter relating to any other rotors of the dampers.

Generally, a resisting torque T generated by the rotary oil damper 71 against a rotating force when the rotor 76 is rotated within the silicon oil 77 is represented by the following equation.

$$T=(\mu \pi^2 b/c)w$$

where "c" (indicated in FIG. 13) is a clearance between the rotor and the casing, "$\mu$" is a coefficient of viscosity of the silicon oil, "a" is the diameter of the rotor 76, "b" is the length of the rotor 76, and "w" is a rotating speed of the rotor 76.

The ratio "b/a" of the rotor 76 in the above embodiment is rather great, and the rotary oil damper 71 generates an adequate resisting torque even though the size of the hinge mechanism 70 is small (the diameter is about 8 mm).

The rotor 76 includes a shaft portion 76a which has a generally elliptical cross section.

The lid opening/closing member 72 is comprised of a lid opening unit 80 and a lid closing unit 82, as shown in FIG. 13.

The lid opening unit 80 includes a generally cylindrical casing 82, a helical torsion spring 83, and a first shaft 84. The helical torsion spring 83 serves as the first spring which rotates the foldable lid on the shaft in the opening direction by a biasing force of the spring 83. The first spring 83 has a spring constant K5. The first spring 83 includes an arm portion 83a at one end and an arm portion 83b at the other end.

The lid closing unit 81 includes a helical torsion spring 85 and a second shaft 86. The helical torsion spring 85 serves as the second spring which rotates the foldable lid on the shaft in the closing direction by a biasing force of the spring 85. The second spring 85 has a spring constant K6. The second spring 85 includes an arm portion 85a at one end and an arm portion 85b at the other end.

Similarly to the previously-described first embodiment, the spring constant K5 of the first spring 83 and the spring constant K6 of the second spring 85 in the second embodiment are determined independently of each other.

Referring to FIG. 11, one end of the casing 82 is formed as an end face 82-1, and the other end is formed as an opening 82-2. The end face 82-1 includes a central hole 82-3, a circular slit 82-4, and a small hole 82-5. The central hole 82-3 and the circular slit 82-4 are continuously formed. A first stopper 82-6 is formed by an edge of the circular slit 82-4. On the outer periphery of the casing 82, projections 82-7 are provided.

The first shaft 84 is, as shown in FIG. 12, shaped into a generally cylindrical part. The first shaft 84 includes a spring supporting portion 84-1, an elliptical hole 84-2, and an axially extending projection 84-3. The first spring 83 is supported on the spring supporting portion 84-1.

The first shaft 84 further includes a groove portion 84-4, a spring containing portion 84-5, a groove portion 84-6, and a bearing portion 84-7. The arm portion 83b of the first spring 83 is fitted into the groove portion 84-4. The second spring 85 is contained in the spring containing portion 84-5. The arm portion 85a of the second spring 85 is fitted into the groove portion 84-6. A cylindrical shaft portion 86-2 of the second shaft 86 is fitted into the bearing portion 84-7 and rotatably supported thereon.

The first shaft 84 further includes a cut-out portion 84-8. A second stopper 84-9 is formed by an edge of the cut-out portion 84-8.

The second shaft 86 includes a central plate portion 86-1, the cylindrical shaft portion 86-2 extending from one end of the central plate portion, and a rectangular shaft portion 86-3 extending from the other end of the central plate portion.

In the plate portion 86-1 of the second shaft 86, a groove 86-4, a projection 86-4 and a rib 86-6 are provided.

The lid opening/closing member 72 is arranged such that the first spring 83, the first shaft 84, the second spring 85 and the second shaft 86 are incorporated in the casing 82.

The first shaft 84 is connected to the first spring 83 by fitting the arm portion 83b to the groove 84-4. The first spring 83 is connected to the casing 82 by fitting the arm portion 83a to the hole 82-5. The projection 84-3 of the first shaft 84 is fitted to the circular slit 82-4 of the casing 82. As the casing 82 is stationary, the first shaft 84 is rotatable relative to the casing 82. The first spring 83 may be twisted in accordance with the rotation of the first shaft 84 relative to the casing 82 unless the projection 84-3 is connected to the first stopper 82-6.

The second shaft 86 is connected to the second spring 85 by fitting the arm portion 85b to the groove 86-4. The second spring 85 is connected to the first shaft by fitting the arm portion 85a to the groove 84-6. The first shaft 84 is rotatably connected to the second shaft 86 by fitting the shaft portion 86-2 to the bearing portion 84-7. The projection 86-5 of the second shaft 86 is fitted to the cut-out portion 84-6 of the first shaft 84. Thus, the second spring 85 may be twisted in accordance with the rotation of the first shaft 84 relative to the second shaft 86 unless the projection 86-5 is connected to the second stopper 84-9.

The casing 82 has a rear raised edge 82-8 on its inner peripheral wall. The rib 86-6 of the second shaft 86 is connected to the raised edge 82-8 to prevent separation of the second shaft 86 from the casing 82. The opening 82-2 is closed with the plate portion 86-1.

The biasing force of the first spring 83 serves to rotate the first shaft 84 relative to the casing 82 in the opening direction "A1". However, when the lid 62A is at the opened position "P2" to use the portable telephone, the rotation of the first shaft 84 relative to the casing 82 is stopped at a position where the projection 84-3 is brought into contact with the first stopper 82-6. The first shaft 84 is held at this position by the connection of the projection 84-3 and the first stopper 82-6. Thus, the biasing force of the first spring 83 at this position is canceled by the first stopper 82-6.

The biasing force of the second spring 85 serves to rotate the second shaft 86 relative to the first shaft 84 in the closing direction "A2". However, when the lid 62A is at the opened position "P2" to use the portable telephone, the rotation of the first shaft 84 relative to the second shaft 86 is stopped at the same position where the projection 86-5 is brought into contact with the second stopper 84-9. The second shaft 86 is held at this position by the connection of the projection 86-5 and the second stopper 84-9. Thus, the biasing force of the second spring 85 at this position is canceled by the second stopper 84-9.

In the assembled condition, the rotary oil damper 71 is connected to the lid opening/closing member 72 via an O-ring 87. As shown in FIGS. 11 and 13, the shaft portion 76a of the rotor 76 is fitted to the elliptical hole 84-2 of the first shaft 84. Therefore, the first shaft 84 and the rotor 76 can be rotated together.

The O-ring 87 is inserted between the casing 82 and the cover 79 of the oil damper 71 to prevent the leakage of the silicon oil from the oil damper 71.

On the periphery of the casing 82 at a connecting portion between the casing 75 and the casing 82, an O-ring 88 is provided to fix the hinge mechanism 70 to the foldable portable telephone. The O-ring 88 serves to prevent the leakage of oil from the periphery of the hinge mechanism 70, and serves to prevent irregular movement of the hinge mechanism 70 in the radial direction thereof.

Figure 14:
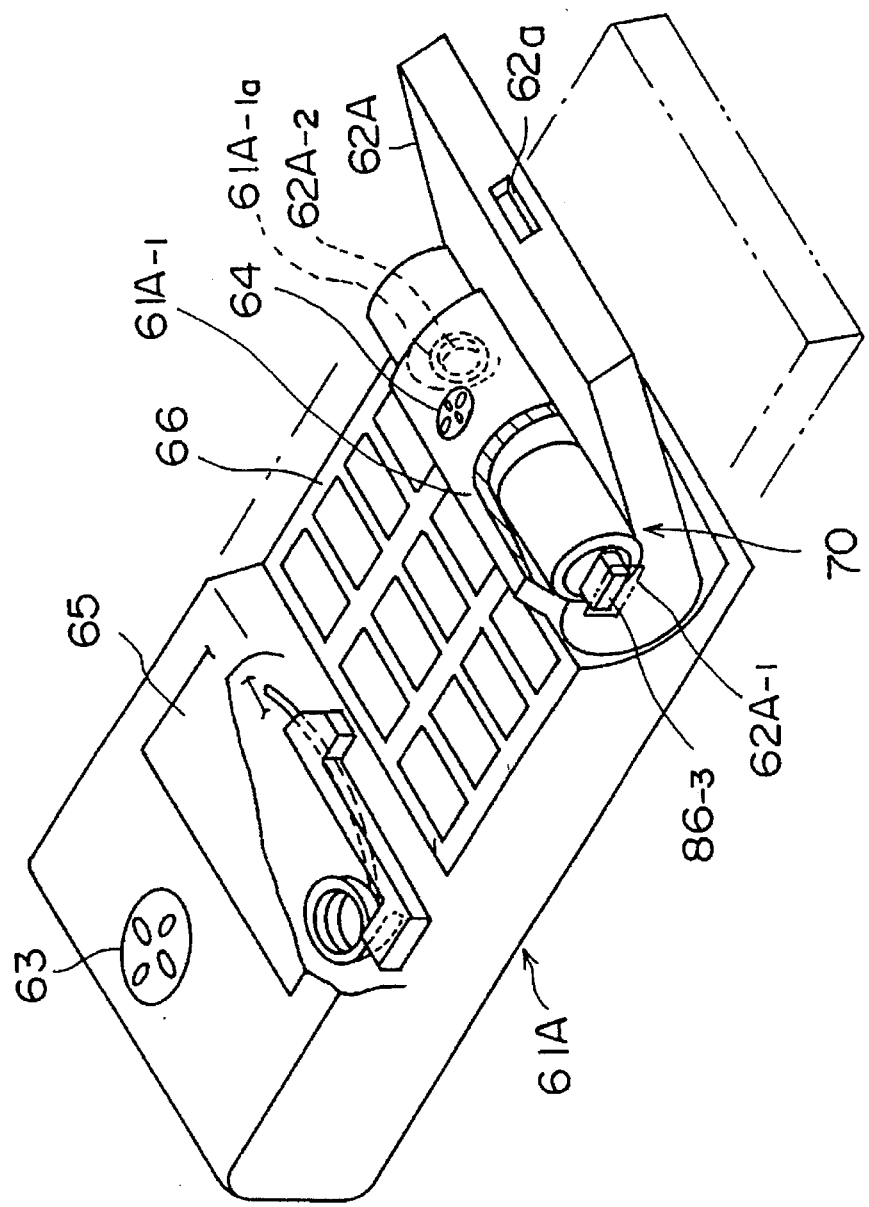
FIG. 14 is a perspective view of a foldable portable telephone including the hinge mechanism in FIG. 11.

FIG. 14 shows a foldable portable telephone 60A in which the above-described hinge mechanism 70 is included. In FIG. 14, the elements which are the same as corresponding elements in FIG. 8 are designated by the same reference numerals, and a description thereof will be omitted.

Referring to FIG. 14, the portable telephone 60A includes a telephone body 61A with an end portion 61A-1. The above hinge mechanism 70 is inserted in the end portion 61A-1. The portable telephone 60A includes a foldable lid 62A. The lid 62A is rotatably supported to the telephone body 61A by the hinge mechanism 70. The shaft portion 86-3 of the second shaft 86 projects from the side of the lid 62A.

The lid 62A includes a recessed portion 62A-1 and a shaft portion 62A-2. The shaft portion 86-3 of the second shaft 86 is connected to the shaft portion 62A-1. The shaft portion 62A-2 of the lid 62A is connected to a bearing hole 61A-1a.

The hinge mechanism 70 has a relatively small length. The hinge mechanism 70 is included only in an almost half part of the end portion 61A-1. The transmitter portion 64 and a buzzer (not shown) are included in the other half part of the end portion 61A1. Thus, the space of the end portion 61A-1 in the portable telephone 60A can be efficiently used.

In addition, the hinge mechanism 70 in this embodiment has a small size, and a sufficient space for installing a connector portion in the portable telephone 60A can be provided.

Referring to FIGS. 15A–15I, the operation of the hinge mechanism 70 which is incorporated in the portable telephone 60A will be described.

Hereinafter, a rotating position of the first shaft 84 is indicated by an angular distance between the current position of the projecting portion 84-3 on the first shaft 84 and the initial position thereof. A rotating position of the second shaft 86 is indicated by an angular distance between the current position of projecting portion 86-5 on the second shaft 86 and the initial position thereof.

Figure 15A:
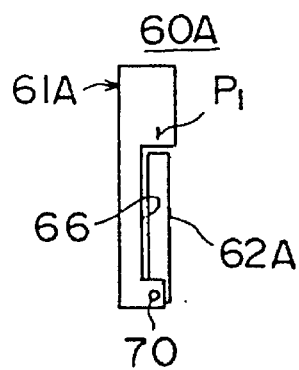
FIGS. 15A through 15I are views of the portable telephone in FIG. 14.
Figure 15B:
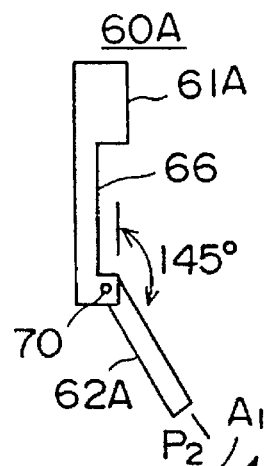
Figure 15C:
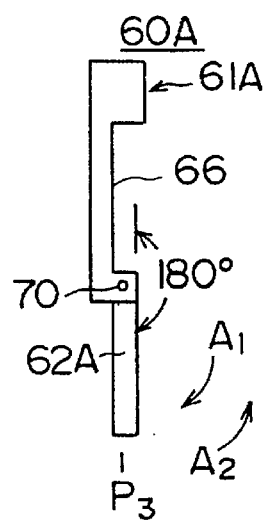
Figure 15D:
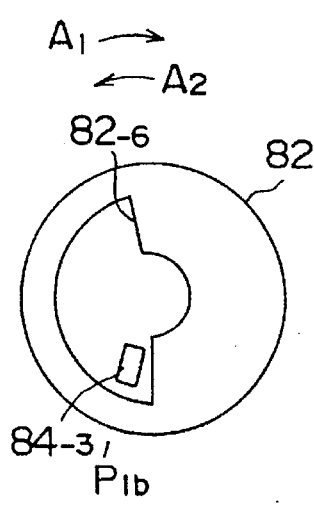
Figure 15E:
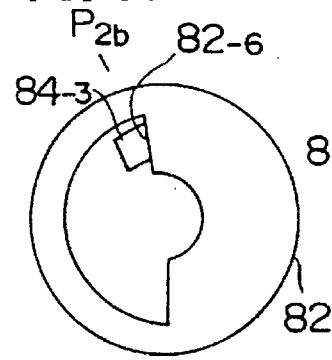
Figure 15F:
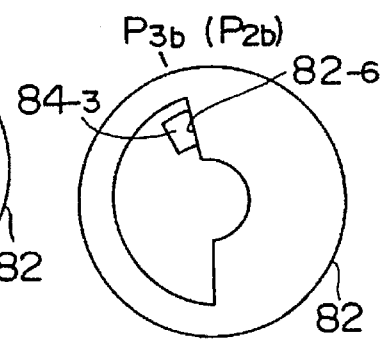
Figure 15G:
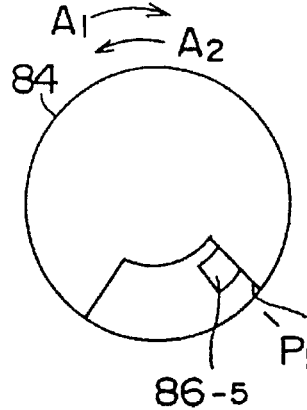
Figure 15H:
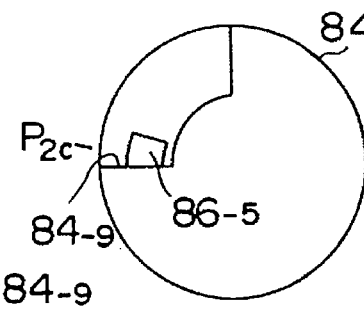
Figure 15I:
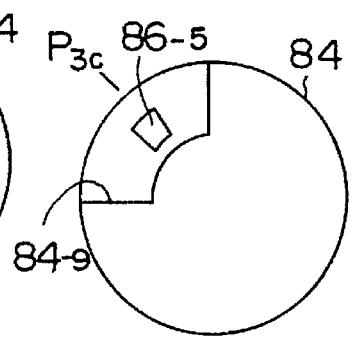

More specifically, rotating positions of the first shaft 84 when the lid 62A is at the positions "P1", "P2" and "P3" are respectively indicated by "P1b", "P2b" and "P3b" in FIGS. 15D–15F, and rotating positions of the second shaft 86 when the lid 62A is at the positions "P1", "P2" and "P3" are respectively indicated by "P1c", "P2c" and "P3c" in FIGS. 15G–15I.

(1) When the lid 62A is placed in the folded condition (or at the closed position "P1" in FIG. 15A), the second shaft 86 is rotated in the direction "A2" from the position "P2c" in FIG. 15H to the position "P1c" in FIG. 15G in accordance with the rotation of the lid 62A relative to the telephone body 61A. The second stopper 84-9 is pushed by the projecting portion 86-5, and the second shaft 86 is connected to the first shaft 84. The first shaft 84 is rotated in the direction "A2" from the position "P2b" in FIG. 15E to the position "P1b" in FIG. 15D.

The rotating position of the second shaft 86 in this condition is the position "P1c" indicated in FIG. 15G, and the rotating position of the first shaft 84 in this condition is the position "P1b" indicated in FIG. 15D.

The first spring 83 in this condition is twisted in the direction "A2".

(2) When the push button 68b is pushed by the user, the projecting portion 68a is disconnected from the recessed portion 62a of the lid 62A. The rotation of the first shaft 84 in the direction "A1" is started due to the biasing force of the first spring 83 after the projecting portion 68a is disconnected from the recessed portion 62a.

The second stopper 84-9 is pushed by the projecting portion 86-5, and the rotation of the second shaft 86 in the direction "A1" is started in accordance with the start of the rotation of the first shaft 84.

The rotor 76 is rotated on the shaft 75a in accordance with the rotation of the first shaft 84. The rotor 76 is slowly rotated against the resisting torque generated by the oil damper 71, and the rotating speed of the first and second shafts 84 and 86 is reduced. Therefore, in response to the movement of the push button 68b, the lid 62A is rotated from the closed position "P1" to the opened position "P2" at a relatively small rotating speed.

(3) When the lid 62A is held at the opened position "P2" (FIG. 15B), the rotation of the first shaft 84 is stopped at the position "P2b" as indicated in FIG. 15E. When the first shaft 84 is at the position "P2b", the first stopper 82-6 is pushed by the projecting portion 84-3 of the first shaft 84.

The rotation of the second shaft 86 is stopped at the position "P2c" as indicated in FIG. 15H. Therefore, the lid 62A is held at the position "P2" as shown in FIG. 15B.

(4) When the lid 62A is further rotated in the direction "A1" from the position "P2" by an external force (FIG. 15C), the first shaft 84 cannot be further rotated in the direction "A1" from the position "P2b" indicated in FIG. 15E. Thus, the first shaft 84 in this condition is at the position "P3b" in FIG. 15F which is the same as the position "P2b" in FIG. 15E.

The second shaft 86 in this condition is solely rotated in the direction "A1" from the position "P2c" in FIG. 15H to the position "P3c" in FIG. 15I. The second spring 85 is twisted by the second shaft 86 in the direction "A1". Therefore, the lid 62A at this time is further rotated in the direction "A1" from the position "P1" to the position "P3" as shown in FIG. 15C.

If the external force acting on the lid 62A is removed, the second shaft 86 is rotated in the direction "A2" back to the position "P2". Therefore, the lid 62A at this time is again held at the opened position "P2".

Figure 16:
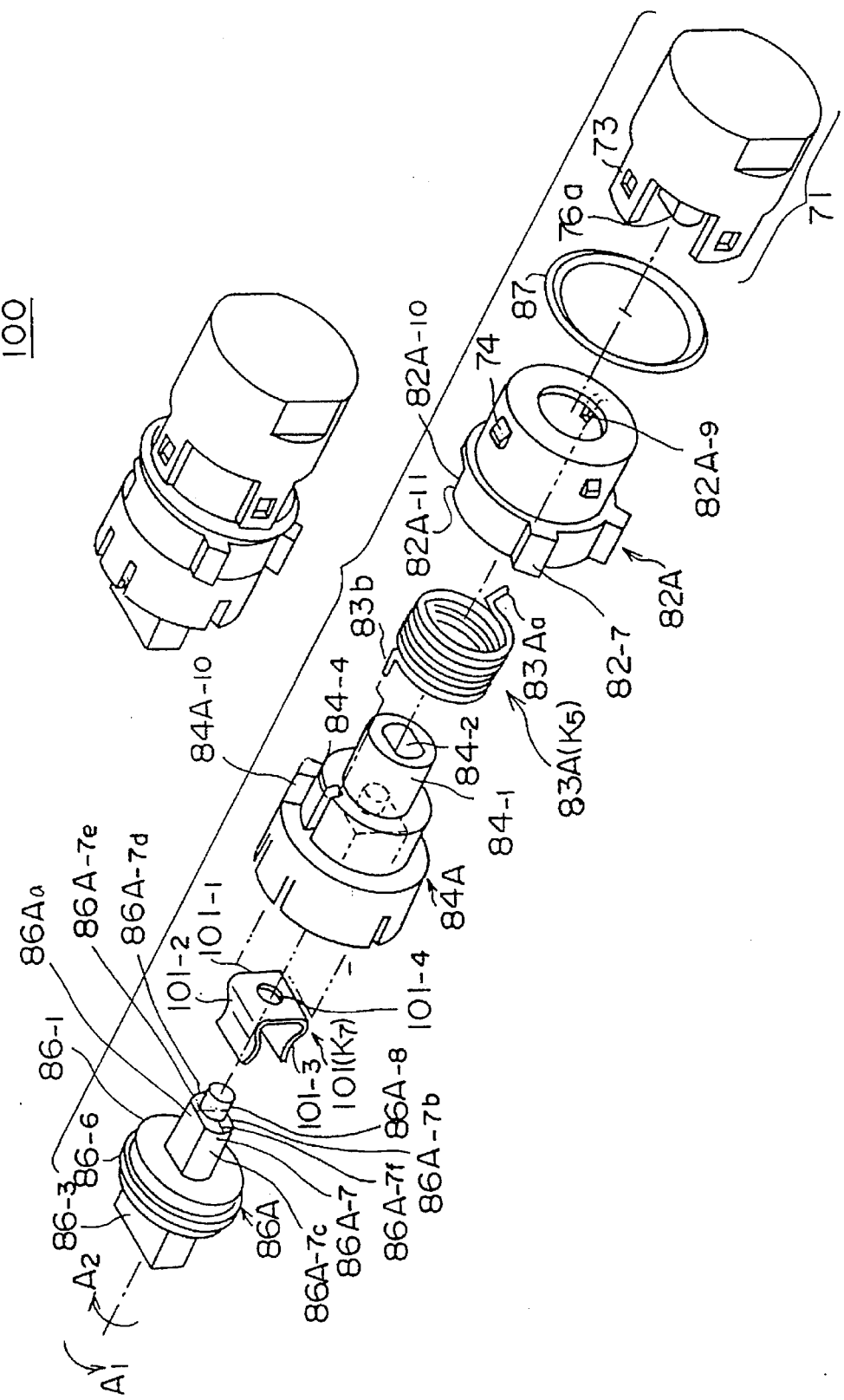
FIG. 16 is a perspective view of a hinge mechanism in a third embodiment of the present invention.
Figure 18:
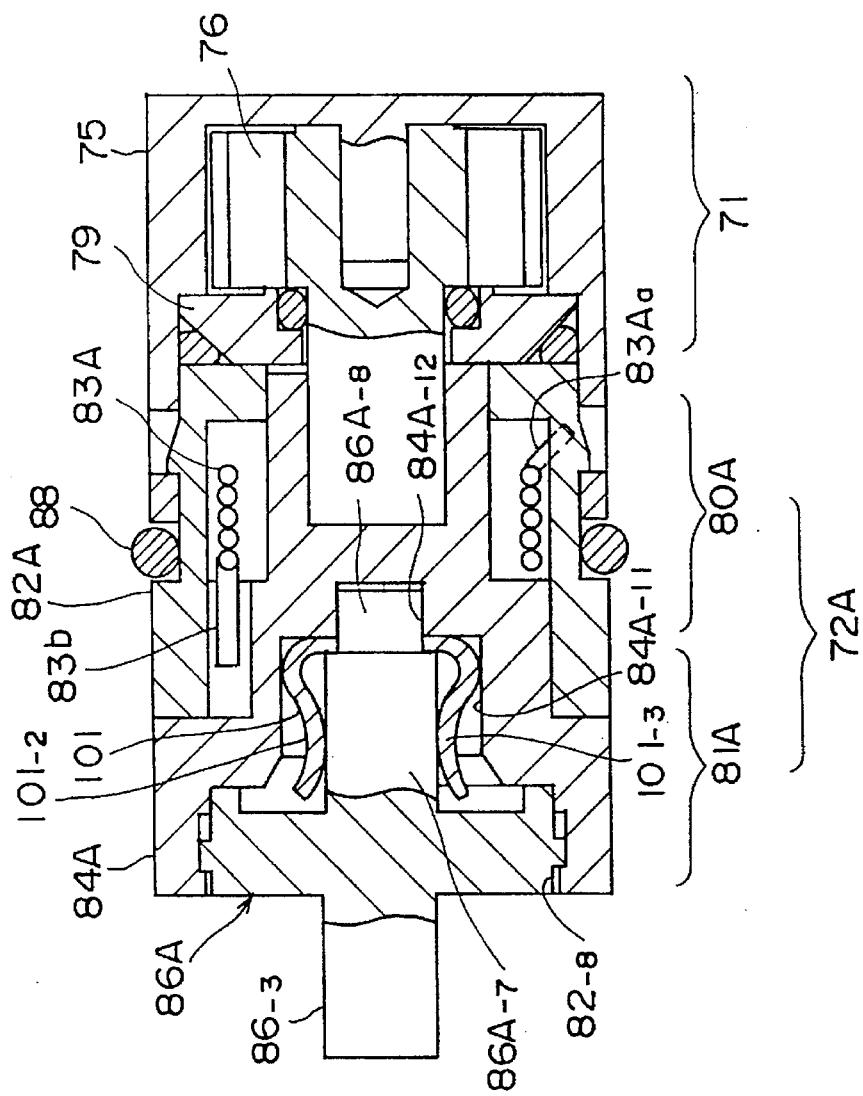
FIG. 18 is a cross-sectional view of the hinge mechanism in FIG. 16.

FIGS. 16 and 18 show a hinge mechanism 100 in a third embodiment of the present invention. In FIGS. 16 and 18, the elements which are the same as corresponding elements in FIGS. 11 and 13 are designated by the same reference numerals, and a description thereof will be omitted.

Referring to FIGS. 16 and 18, the hinge mechanism 100 includes the oil damper 71 and a lid opening/closing member 72A. The oil damper 71 is connected to the member 72A by fitting the hooks 73 of the oil damper 71 to the projections 74 of the member 72A.

The oil damper 71 in this embodiment is the same as the oil damper 71 in the above-described second embodiment.

The lid opening/closing member 72A is comprised of a lid opening unit 80A and a lid closing unit 82A, as shown in FIG. 13.

The lid opening unit 80A includes a generally cylindrical casing 82A, a helical torsion spring 83A, and a first shaft 84A. The helical torsion spring 83A is the first spring which rotates the foldable lid on the shaft in the opening direction by a biasing force of the spring 83A.

The first spring 83A is fitted to a spring supporting portion 84-1 of the first shaft 84A. An arm portion 83Aa of the first spring 83A is fitted to a groove portion 82A-9 of the casing 82A. An arm portion 83Ab of the first spring 83A is fitted to a groove portion 84-4 of the first shaft 84A.

Figure 17:
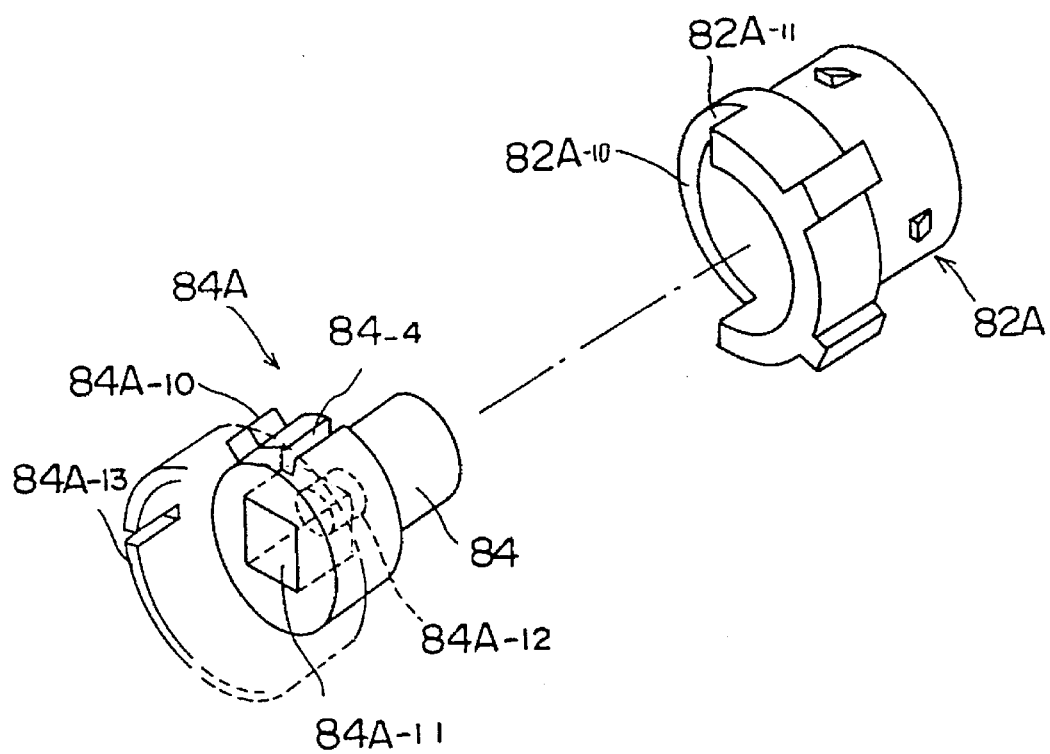
FIG. 17 is a perspective view of a portion of the hinge mechanism in FIG. 16.

FIG. 17 shows a portion of the hinge mechanism 100 in FIG. 16. Referring to FIG. 17, the casing 82A includes a cut-out portion 82A-10. A stopper 82A-11 which is the first stopper in this embodiment is formed by an edge of the cut-out portion 82A-10.

The first shaft 84A includes a projecting portion 84A-10. The first shaft 84A is connected to the casing 82A by fitting the projecting portion 84A-10 to the cut-out portion 82A-10 of the casing 82A.

Referring to FIGS. 16 and 18, the lid closing unit 81A includes a second shaft 86A and a snap leaf spring 101. The first shaft 84A is shared by the lid opening unit 80A and the lid closing unit 81A.

The first shaft 84A includes a leaf spring containing portion 84A-11, a bearing portion 84A-12, and a casing 84A-13. The leaf spring containing portion 84A-11 is formed into a generally cubic recessed portion. The bearing portion 84A-12 is located at a rear part of the leaf spring containing portion 84A-11, and formed into a generally cylindrical recessed portion.

The second shaft 86A includes a cam portion 86A-7. The cam portion 86A-7 of the second shaft has a generally elliptical cross section with a short axis 86A-7e and a long axis 86-7f. The cam portion 86A-7 includes a flat surface 86A-7a, a flat surface 86A-7b, a curved surface 86A-7c, and a curved surface 86A-7d.

The cam portion 86A-7 is formed integrally with the shaft portion 86-3. The shaft portion 86A-8 is formed by a leading edge of the cam portion 86A-7.

The snap leaf spring 101 is formed as a generally U-shaped part. The snap leaf spring 101 includes a base portion 101-1, and arm portions 101-2 and 101-3 which respectively extend from ends of the base portion 101-1.

The base portion 101-1 of the snap leaf spring 101 has a hole 101-4. The shaft portion 86A-8 of the second shaft 86A is inserted in the hole 101-4 of the snap leaf spring 101.

The snap leaf spring 101 has a spring constant K7. The snap leaf spring 101 has a size that can be contained in the leaf spring containing portion 84A-11. The rotation of the snap leaf spring 101 when it is contained therein is restricted by the leaf spring containing portion 84A-11.

The second shaft 86A is fitted to the casing 84A-13 of the first shaft 84A. The cam portion 86A-7 of the second shaft 86A is fitted between the arm portion 101-2 and the arm portion 101-3. Further, the shaft portion 86A-8 of the second shaft 86A is fitted to the bearing portion 84A-12 of the first shaft 84A.

Figure 19A:
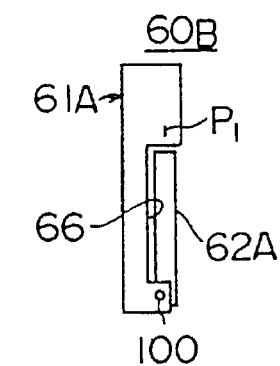
FIGS. 19A through 19I are views of a foldable portable telephone including the hinge mechanism in FIG. 16.
Figure 19B:
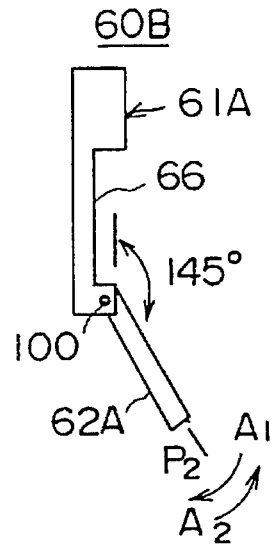
Figure 19C:
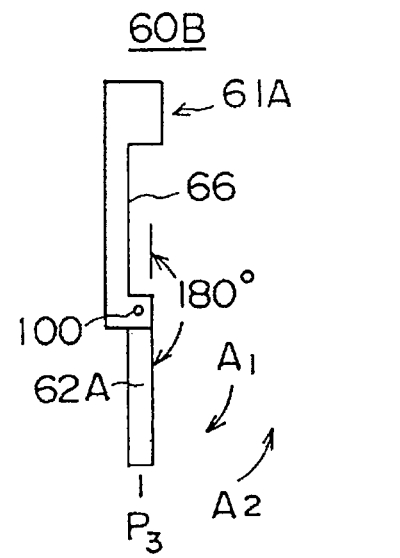

In the above-described hinge mechanism 100, a biasing force of the first spring 83A serves to rotate the first shaft 84A in the direction "A2" relative to the casing 82A. The rotation of the first shaft 84A is stopped, as shown in FIG. 19E, when the projecting portion 84A-10 is brought into contact with the first stopper 82A-11.

In the above-described hinge mechanism 100, a biasing force of the snap leaf spring 101 serves to stop the rotation of the second shaft 86A by fitting the arm portions 101-2 and 101-3 to the flat surfaces 86A-7a and 86A-7b of the second shaft 86A.

Similarly to the hinge mechanism 70 which is incorporated in the foldable portable telephone 60A in FIG. 14, the above-described hinge mechanism 100 is incorporated in a foldable portable telephone 60B.

Referring to FIGS. 19A–19I, the operation of the hinge mechanism 100 which is incorporated in the portable telephone 60B will be described.

Hereinafter, a rotating position of the first shaft 84A is indicated by an angular distance between the current position of the projecting portion 84A-10 on the first shaft 84A and the initial position thereof. A rotating position of the second shaft 86A is indicated by an angular distance between the current position of the long axis 86A-7f of the cam portion 86A-7 on the second shaft 86A and the initial position thereof.

Figure 19D:
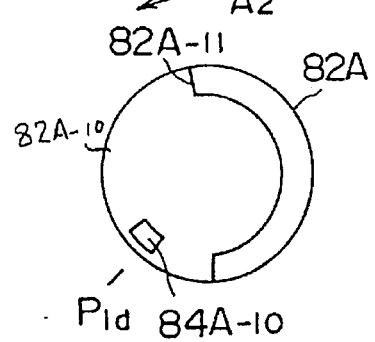
Figures 19E, 19F:
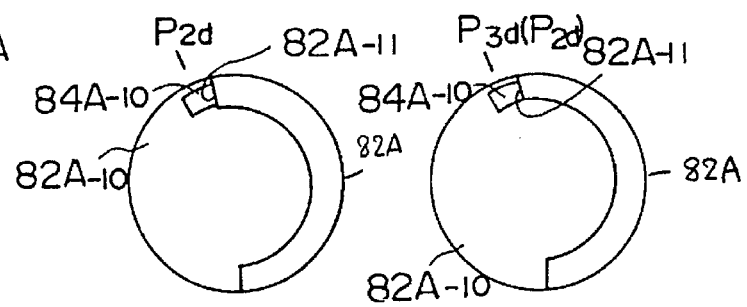
Figure 19G:
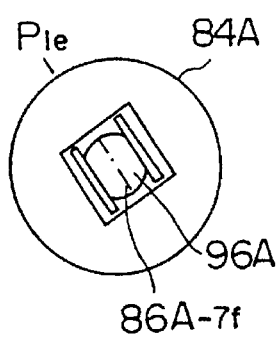
Figures 19H, 19I:
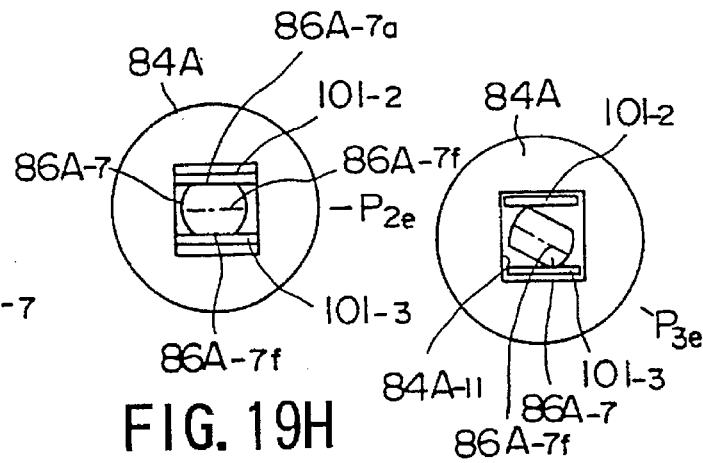

More specifically, rotating positions of the first shaft 84A when the lid 62A is at the positions "P1", "P2" and "P3" are respectively indicated by "P1d", "P2d" and "P3d" in FIGS. 19D–19F, and rotating positions of the second shaft 86A when the lid 62A is at the positions "P1", "P2" and "P3" are respectively indicated by "P1e", "P2e" and "P3e" in FIGS. 19G–19I.

(1) When the lid 62A is placed in the folded condition (or at the closed position "P1" in FIG. 19A), the second shaft 86A is rotated in the direction "A2" from the position "P2e" in FIG. 19H to the position "P1e" in FIG. 19G in accordance with the rotation of the lid 62A.

The snap leaf spring 101 in this condition is rotated in the direction "A2" in accordance with the rotation of the cam portion 86A-7. The first shaft 84A is rotated in the direction "A2" in accordance with the rotation of the snap leaf spring 101. The first shaft 84A in this condition is moved to the position "P1d" in FIG. 19D. The first spring 83A in this condition is twisted in the direction "A2" by the first shaft 84A.

(2) When the push button 68b is pushed by the user, the projecting portion 68a is disconnected from the recessed portion 62a of the lid 62A. The rotation of the first shaft 84A in the direction "A1" is started due to the biasing force of the first spring 83A after the projecting portion 68a is disconnected from the recessed portion 62a.

The second shaft 86A is rotated in the direction "A1" in accordance with the rotation of the first shaft 84A through the snap leaf spring 101 and the cam portion 86A-7.

The rotor 76 of the oil damper 71 is rotated on the shaft 75a in accordance with the rotation of the first shaft 84A. The rotor 76 is slowly rotated against the resisting torque generated by the oil damper 71, and the rotating speed of the first and second shafts 84A and 86A is reduced. Therefore, in response to the movement of the push button 68b, the lid 62A is rotated from the closed position "P1" to the opened position "P2" at a relatively small rotating speed.

(3) When the lid 62A is held at the opened position "P2" (FIG. 19B), the rotation of the first shaft 84A is stopped at the position "P2d" as indicated in FIG. 19E. When the first shaft 84A is at the position "P2d", the first stopper 82A-11 is pushed by the projecting portion 84A-10 of the first shaft 84A.

The rotation of the second shaft 86A is stopped at the position "P2e" as indicated in FIG. 19H. Therefore, the lid 62A is held at the position "P2" as shown in FIG. 19B.

(4) When the lid 62A is further rotated in the direction "A1" from the position "P2" by an external force (FIG. 19C), the first shaft 84A cannot be further rotated in the direction "A1" from the position "P2d" because of the first stopper 82A-11. Thus, the first shaft 84 is at the position "P3d" in FIG. 19F which is the same as the position "P2d" in FIG. 19E.

The second shaft 86A in this condition is solely rotated in the direction "A1" from the position "P2e" in FIG. 19H to the position "P3e" in FIG. 19I. The distance between the arm portions 101-2 and 101-3 of the snap leaf spring 101 is widened by the cam portion 86A-7 of the rotating second shaft 86A. Therefore, the lid 62A at this time is further rotated in the direction "A1" to the position "P3" as shown in FIG. 19C.

If the external force acting on the lid 62A is removed, the cam portion 86A-7 is rotated in the direction "A2" by the biasing force of the snap leaf spring 101. The second shaft 86A is thus rotated in the direction "A2" back to the position "P2e" in FIG. 19H. Therefore, the lid 62A at this time is again held at the opened position "P2".

Figure 20:
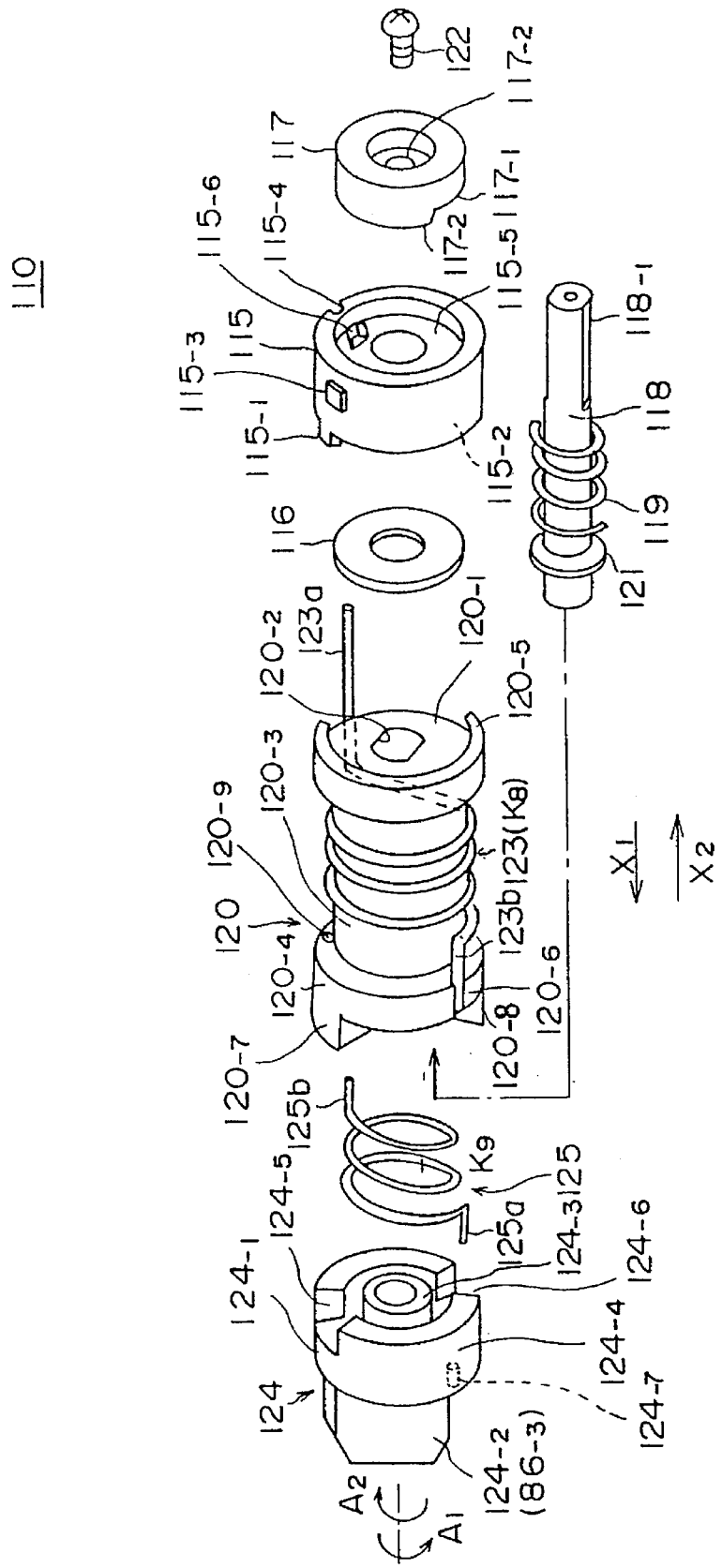
FIG. 20 is a perspective view of a hinge mechanism in a fourth embodiment of the present invention.
Figure 21:
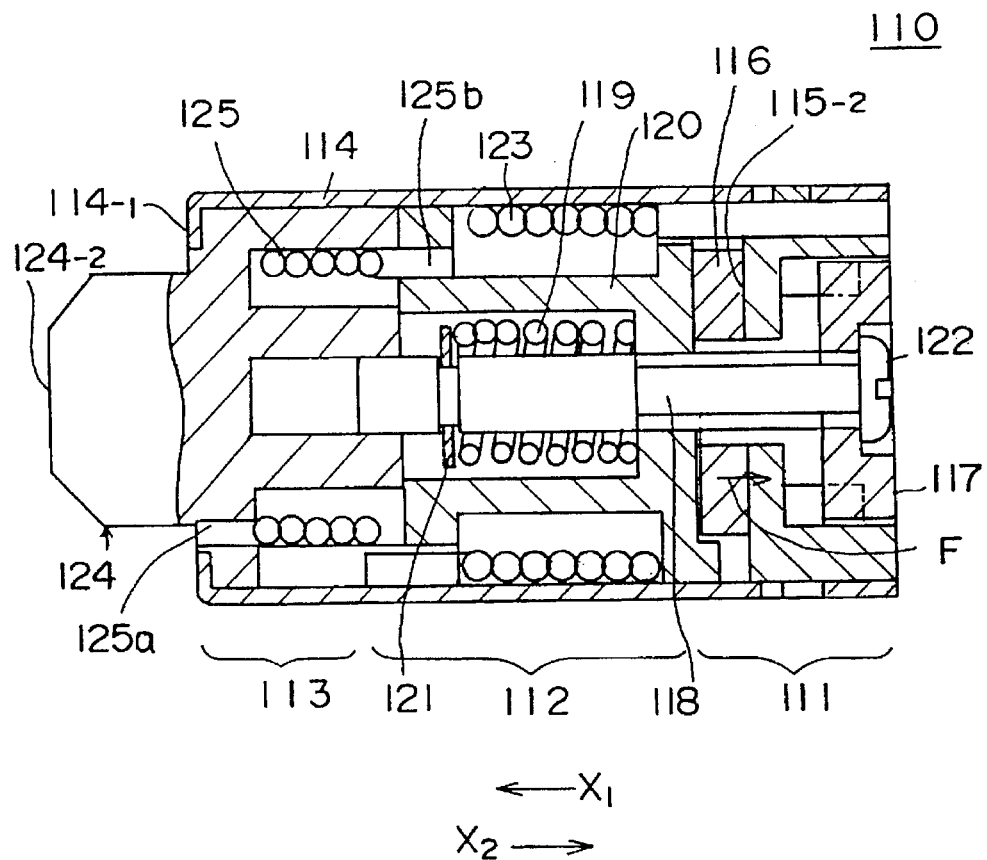
FIG. 21 is a cross-sectional view of the hinge mechanism in FIG. 20.

FIGS. 20 and 21 show a hinge mechanism 110 in a fourth embodiment of the present invention.

Referring to FIGS. 20 and 21, the hinge mechanism 110 includes a friction damper 111, a lid opening unit 112, and a lid closing unit 113. The lid opening unit 112 and the lid closing unit 113 in this embodiment are similar to corresponding elements in the hinge mechanism 70 in FIG. 11. The friction damper 111 is used in this embodiment instead of the oil damper 71 in the hinge mechanism 70.

The hinge mechanism 110 is build in a module as shown in FIG. 21. The friction damper 111, the lid opening unit 112, and the lid closing unit 113 are included in a cylindrical casing 114. The casing 114 is made of aluminum.

The friction damper 111 includes a base 115, a brake shoe 116, a cam unit 117, a shaft 118, and a helical compression spring 119.

In the friction damper 111, the base 115 has a generally cylindrical shape. The base 115 includes an axially extending stopper 115-1, a friction surface 115-2, a radial projection 115-3, and a groove 115-4. The projection 115-3 and the groove 115-4 are provided on the peripheral surface of the base 115. The base 115 further includes a recessed portion 115-5 and an axially extending projection 115-6. The projection 115-6 is provided in the recessed portion 115-5. The cam unit 117 is included in the recessed portion 115-5.

The brake shoe 116 is a generally circular plate. The brake shoe 116 is attached to an end surface of a flange 120-1 of a first shaft 120 by using an adhesive agent.

The cam unit 117 has a generally cylindrical shape. The cam unit 117 includes a cam portion 117-1 formed on an end face 117-2 of the cam unit 117. The cam portion 117-1 has a contour as shown in FIG. 22.

Figure 22:
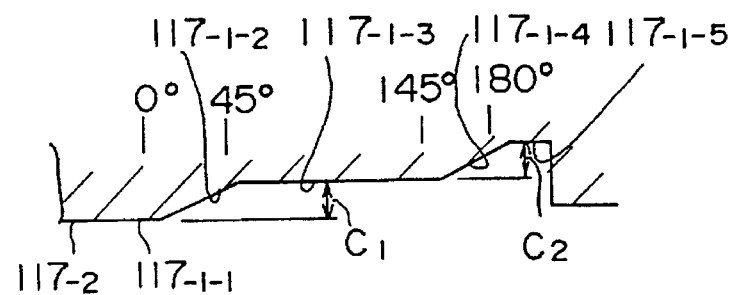
FIG. 22 is a perspective view of a portion of the hinge mechanism in FIG. 20.

Referring to FIG. 22, the cam portion 117-1 has an overall angle of about 220° around the center of the cam unit 117. The cam portion 117-1 includes a first surface 117-1-1, a second surface 1172, a third surface 117-1-3, a fourth surface 117-1-4, and a fifth surface 117-1-5.

The first surface 117-1-1 has a flat face and it is on the same plane as the end face 117-2. A position of the first surface 117-1-1 on the cam portion 117-1 is indicated by 0°.

The third surface 117-1-3 has a flat face that is recessed by a difference "c1" from the flat face of the first surface 117-1-1, as indicated in FIG. 22. The flat face of the third surface 117-1-3 has an angle of 45° to 145°.

The fifth surface 117-1-5 has a flat face that is recessed by a difference "c2" from the flat face of the third surface 117-1-3, as indicated in FIG. 22. The flat face of the fifth surface 117-1-5 has an angle of 200° to 220°.

The second surface 117-1-2 is a slope which interconnects the first surface 117-1-1 and the third surface 117-1-3. The fourth surface 117-1-4 is a slope which interconnects the third surface 117-1-3 and the fifth surface 117-1-5. An intermediate position of the fourth surface 117-1-4 is indicated by the angle 180°.

The compression spring 119 is fitted to the shaft 118. An end of the compression spring 119 is fixed to a retaining ring 121 which is inserted into the shaft 118.

The shaft 118 passes through the first shaft 120, the base 115 and the cam unit 117. A screw 122 is secured to an end portion of the shaft 118 to prevent the removal of the cam unit 177 from the shaft 118.

The shaft 118 includes a portion 118-1 which has a generally elliptical cross section. An elliptical hole 120-2 of the first shaft 120 and an elliptical hole 117-3 of the cam unit 117 are fitted into the portion 118-1 of the shaft 118. The first shaft 120 and the cam unit 117 can be rotated together relative to the base 115 when the shaft 118 is rotated. Also, the shaft 118 can be axially moved relative to the first shaft 120 and the base 115.

The compression spring 119 is in the compressed condition. The base 115 is held between the first shaft 120 and the cam unit 117, and the friction surface 115-2 of the base 115 is pushed by the brake shoe 116 under a predetermined force F which is produced by a biasing force of the compression spring 119.

The shaft 118 is rotated while the brake shoe 116 slides on the friction surface 115-2, and the friction damper 111 generates a resisting torque which reduces a rotating speed of the first shaft 120. The cam unit 117 serves to vary the resisting torque generated by the friction damper 111 in accordance with the rotating position of the first shaft 120. The biasing force of the compression spring 119 is varied by the rotation of the cam unit 117 relative to the base 115.

The lid opening unit 112 is comprised of the first shaft 120 and a helical torsion spring 123. The helical torsion spring 123 is the first spring which rotates the foldable lid in the opening direction from the position "P1" to the position "P2" by a biasing force of the spring 123.

The first shaft 120 has a generally cylindrical shape. The first shaft 120 includes the flange 120-1 at one end, a central cylinder portion 120-2, and a flange 120-4 at the other end. A semicircular rib 120-5 is provided on the flange 120-1. A groove 120-6 is provided on the peripheral surface of the flange 120-4. A pair of stoppers 120-7 and 120-8 are provided on the flange 120-4, and they axially extend from the flange 120-4 in a direction indicated by the arrow X1 in FIG. 20.

The first spring 123 has a spring constant KS. The first spring 123 includes an arm portion 123a and an arm portion 123b. The first spring 123 is fitted to the peripheral surface of the cylinder portion 120-2, the arm portion 123a is fitted to the groove 115-4 of the base 115, and the arm portion 123b is fitted to the groove 120-6 of the first shaft 120.

The lid closing unit 113 includes a second shaft 124 and a helical torsion spring 125. The helical torsion spring 125 is the second spring which rotates the foldable lid in the closing direction from the position "P3" to the position "P2" by a biasing force of the spring 125.

The second shaft 124 includes a central portion 124-1, a rectangular shaft 124-2 extending in the direction X1 from the central portion, and a cylindrical bearing portion 124-3 extending in the direction X2 from the central portion. The second shaft 124 further includes a cylindrical portion 124-4 extending in the direction X2 from the central portion, and cut-out portions 124-5 and 124-6 formed in the cylindrical portion 124-4.

The second spring 125 has a spring constant K9. The second spring 125 generates an resilient force which resists a torsional force or a compression force acting on the spring 125. The second spring 125 includes an arm portion 125a at one end and an arm portion 125b at the other end. The arm portion 125a is fitted to a hole 124-7 of the second shaft 125, and the second spring 125 is included inside the cylindrical portion 124-4.

The projection 120-7 is fitted to the cut-out portion 124-5 of the second shaft 124. The projection 120-8 is fitted to the cut-out portion 124-6. The end portion of the shaft 118 is fitted to the bearing portion 124-3. The arm portion 125b of the second spring 125 is fitted to a hole 120-9 of the first shaft 120. The first shaft 120 is thus connected to the second shaft 124.

The casing 114 is secured to the base 115 by fitting a recessed portion of the casing 114 to the projection 115-1. The first shaft 120 and the second shaft 124 are surrounded by the casing 114.

A movement of the second shaft 124 in the direction X1 is restricted by the flange 114-1 of the casing 114.

The second spring 125 is in the compressed condition. The friction surface 115-2 of the base 115 is additionally pushed by the brake shoe 116 in the direction X2 due to a biasing force of the second spring 125.

Figure 23A:
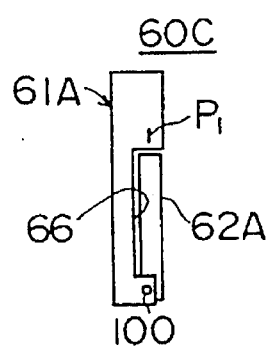
FIGS. 23A through 23L are views of a foldable portable telephone including the hinge mechanism in FIG. 20.
Figure 23B:
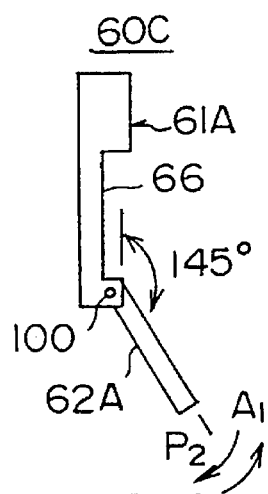
Figure 23C:
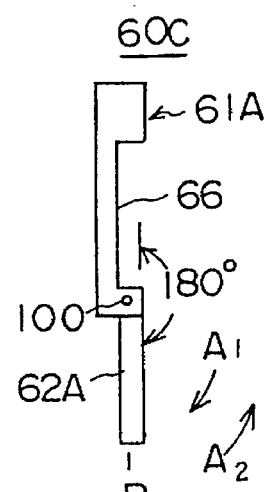

In the assembled condition of the hinge mechanism 110, the first spring 123 is twisted in the direction "A1" which generates the biasing force to press the first shaft 120 against the base 115. As shown in FIG. 23E, the rib 120-5 is brought into contact with the stopper 115-1, and a rotating position of the first shaft 120 is indicated by "P2f".

The second shaft 124 in this condition is rotated in the direction "A2" relative to the first shaft 120 due to the biasing force of the second shaft 125. As shown in FIG. 23H, the end 124-4a of the cylindrical portion 124-4 is brought into contact with the stoppers 120-7 and 120-8, and a rotating position of the second shaft 125 is indicated by "P2g".

Figure 23D:
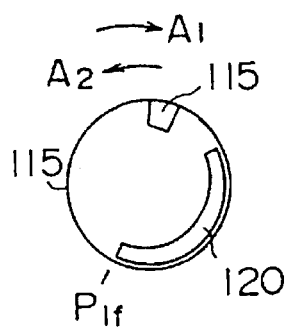
Figure 23E:
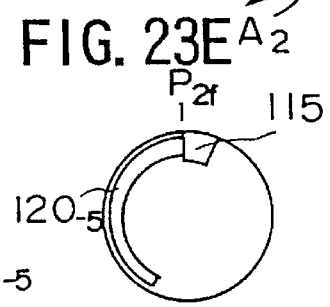
Figure 23F:
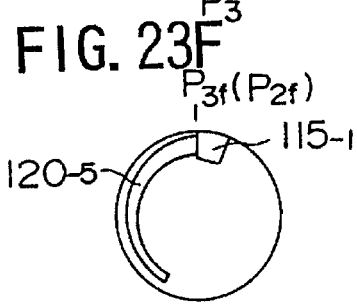
Figure 23G:
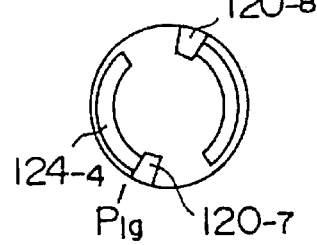
Figure 23H:
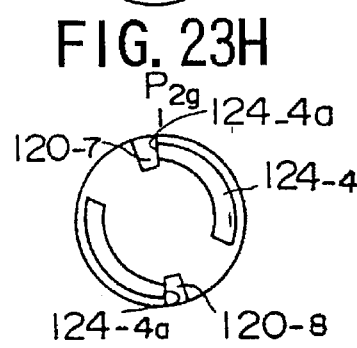
Figure 23I:
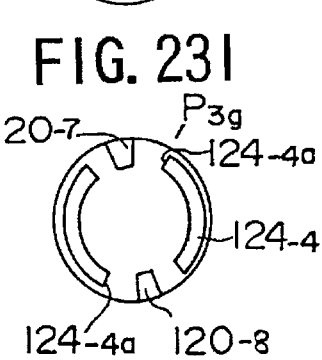
Figure 23J:
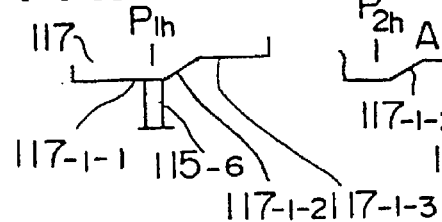
Figure 23K:
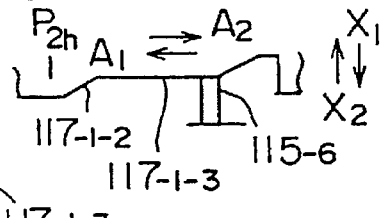

The cam unit 117 in this condition is as shown in FIG. 23K. The projection 115-6 of the base 115 is brought into contact with a position of the third surface 117-1-3 of the cam unit 117 near the fourth surface 117-1-4.

Referring to FIGS. 23A–23L, the operation of the hinge mechanism 110 which is incorporated in a foldable portable telephone 60C will be described.

The above-described hinge mechanism 110 is incorporated in the portable telephone 60C, similarly to the hinge mechanism 70 shown in FIG. 14. Similarly, the foldable lid 62A is attached to the portable telephone 60C.

Hereinafter, a rotating position of the first shaft 120 is indicated by an angular distance between the current position of the end of the rib 120-5 on the first shaft 120 and the initial position thereof. A rotating position of the second shaft 124 is indicated by an angular distance between the current position of the end 124-4a of the cylindrical portion 124-4 and the initial position thereof. A rotating position of the cam unit 117 is indicated by an angular distance between the current 0° position of the cam 117-1 and the initial position thereof.

Figure 23L:
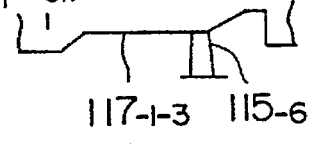

More specifically, rotating positions of the first shaft 120 when the lid 62A is at the positions "P1", "P2" and "P3" are respectively indicated by "P1f", "P2f" and "P3f" in FIGS. 23D–23F, rotating positions of the second shaft 124 when the lid 62A is at the positions "P1", "P2" and "P3" are respectively indicated by "P1g", "P2g" and "P3g" in FIGS. 23G–23I, and rotating positions of the cam unit 117 when the lid 62A is at the positions "P1", "P2" and "P3" are respectively indicated by "P1h", "P2h" and "P3h" in FIGS. 23J–23L.

(1) When the lid 62A is placed in the folded condition (or at the closed position "P1" in FIG. 23A), the second shaft 124 is rotated in the direction "A2" from the position "P2g" in FIG. 23H to the position "P1g" in FIG. 23G in accordance with the rotation of the lid 62A.

The stoppers 120-7 and 120-8 in this condition are pushed by the end 124-4a of the cylindrical portion 124-4. The first shaft 120 is rotated in the direction "A2" to the position "P1f" in FIG. 23D in accordance with the rotation of the second shaft 124. The first spring 123 is twisted in the direction "A2" by the rotation of the first shaft 120.

The cam unit 117 is rotated in accordance with the rotation of the first shaft 120, and it is moved to the position "P1h" in FIG. 23J. The projection 115-6 is brought into contact with the first surface 117-1-1, and the cam unit 117 is axially moved in the direction X2. The spring 119 is further compressed by the above movement of the cam unit 117.

(2) When the push button 68b is pushed by the user, the projecting portion 68a is disconnected from the recessed portion 62a of the lid 62A. The rotation of the first shaft 120 and the cam unit 117 in the direction "A1" is started due to the biasing force of the first spring 123 after the projecting portion 68a is disconnected from the recessed portion 62a.

The stoppers 120-7 and 120-8 are pushed by the end 124-4a of the cylindrical portion 124-4, and the second shaft 124 is rotated in the direction "A1" in accordance with the above rotation of the first shaft 120. The lid 62A is placed into the opened position "P2".

The brake shoe 116 is rotated in accordance with the above rotation of the first shaft 120 while the brake shoe 116 slides on the friction surface 115-2. The friction damper 111 serves to reduce the rotating speed of each of the first shaft 120 and the second shaft 124.

The brake shoe 116 is slowly rotated against the resisting torque generated by the friction damper 111, and the rotating speed of the first and second shafts 120 and 124 is reduced. Therefore, in response to the movement of the push button 68b, the lid 62A is rotated from the closed position "P1" to the opened position "P2" at a relatively small rotating speed.

More specifically, when the rotation of the first shaft 120 in the direction "A1" is started, the projection 115-6 and the first surface 117-1-1 are in contact as shown in FIG. 23J. The spring 119 is compressed when the cam unit 117 is at the position "P1h". The force to press the brake shoe 116 on the friction surface 115-2 is increased due to the biasing force of the spring 119.

When the first shaft 120 is being rotated in the direction "A1", the biasing force of the first spring 123 is reduced in accordance with the rotation of the first shaft 120. The point at which the projection 115-6 and the cam unit 117 are in contact with each other is moved from the first surface 117-1-1 to the third surface 117-1-3 via the second surface 117-1-2 as shown in FIG. 23K. The spring 119 is gradually elongated and returns back to the non-compressed condition. Thus, the force to press the brake show 116 on the friction surface 115-2 is gradually reduced.

(3) When the lid 62A is held at the opened position "P2" (FIG. 23B), the rotation of the first shaft 120 is stopped at the position "P2f" as indicated in FIG. 23E. When the first shaft 120 is at the position "P2f", the stopper 115-1 of the base 115 is pushed by the end of the rib 120-5 of the first shaft 120.

The rotation of the second shaft 124 is stopped at the position "P2g" as indicated in FIG. 23H. Therefore, the lid 62A is held at the position "P2" as shown in FIG. 23B.

(4) When the lid 62A is further rotated in the direction "A1" from the position "P2" by an external force, the first shaft 120 cannot be further rotated in the direction "A1" from the position "P2f" because of the stopper 115-1. Thus, the first shaft 120 is at the position "P3f" in FIG. 23F which is the same as the position "P2f" in FIG. 23E.

The second shaft 124 in this condition is solely rotated in the direction "A1" from the position "P2g" in FIG. 23H to the position "P3g" in FIG. 23I. The second spring 125 is twisted in the direction "A1" by the rotation of the second shaft 124. Therefore, the lid 62A is further rotated in the direction "A1" to the position "P3" as shown in FIG. 23C.

If the external force acting on the lid 62A is removed, the second shaft 124 is rotated in the direction "A2" by the biasing force of the second spring 125. The second shaft 124 returns back to the position "P2g" in FIG. 23H, and the lid 62A is held again at the opened position "P2"

Figure 24:
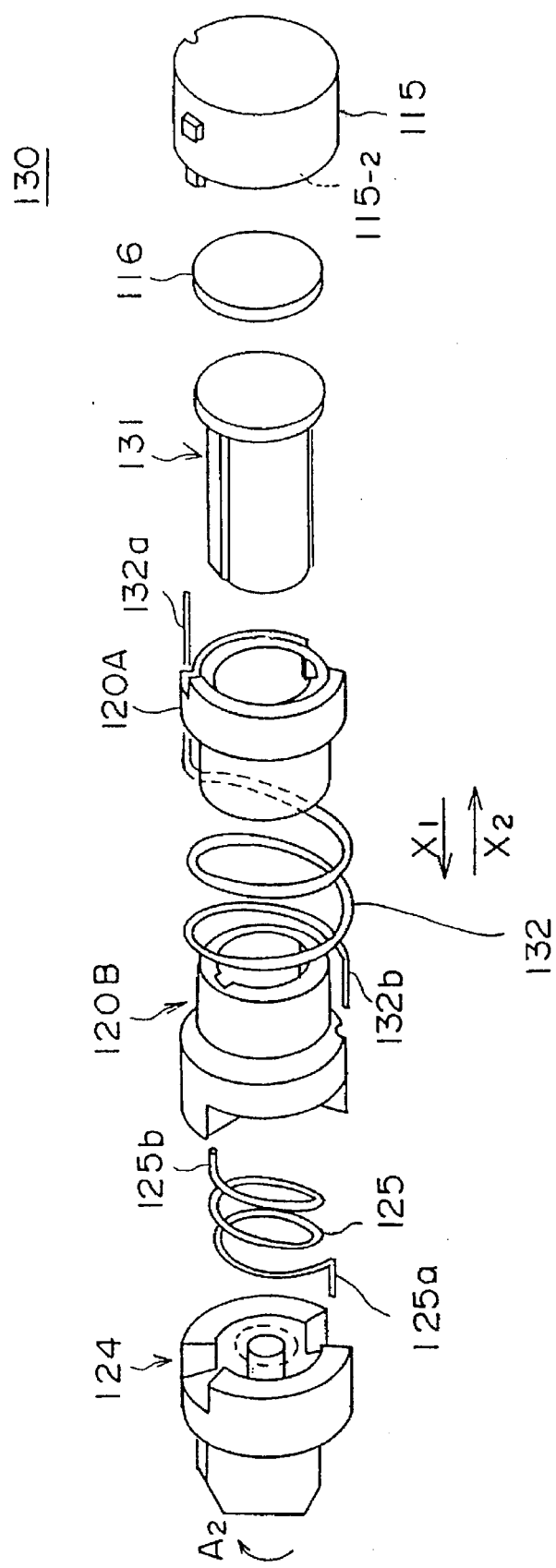
FIG. 24 is a perspective view of a hinge mechanism in a fifth embodiment of the present invention.
Figure 25:
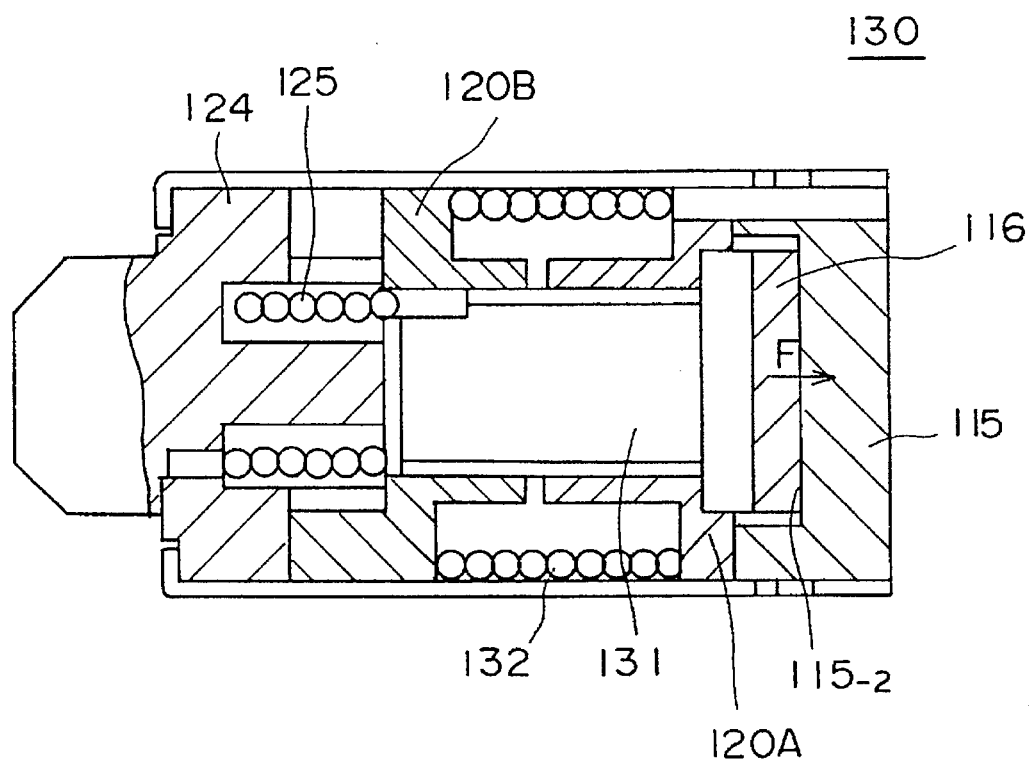
FIG. 25 is a cross-sectional view of the hinge mechanism in FIG. 24.

FIGS. 24 and 25 show a hinge mechanism 130 in a fifth embodiment of the present invention.

The hinge mechanism 130 in this embodiment may be a modification of the hinge mechanism 110 in FIGS. 20 and 21. In FIGS. 24 and 25, the elements which are the same as corresponding elements in FIGS. 20 and 21 are designated by the same reference numerals, and a description thereof will be omitted.

Referring to FIGS. 24 and 25, the hinge mechanism 130 includes no elements which correspond to the helical compression spring 119 and the shaft 118 in the fourth embodiment.

The hinge mechanism 130 includes two separate shaft portions 120A and 120B which correspond to the first shaft 120. The shaft portions 120A and 120B are fitted to a shaft 131, and the shaft 131 and the shaft portions 120A and 120B can be rotated together. The shaft portions 120A and 120B are slidable on the shaft 131 in the directions X1 and X2.

The brake shoe 116 is attached to one end of the shaft 131. The brake shoe 116 is fitted to the friction surface 115-2 of the base 115.

A spring 132 is fitted to the peripheral surfaces of the shaft portions 120A and 120B. The spring 132 is a helical torsion spring which generates a biasing force when compressed or twisted. An arm portion 132a of the spring 132 is fixed to the base 115, and an arm portion 132b of the spring 132 is fixed to the shaft portion 120B.

In the assembled condition, the spring 132 on the shaft portions 120A and 120B is compressed and twisted. The friction surface 115-2 is pressed by the brake shoe 116 due to the biasing force of the spring 132. Also, the spring 132 serves as the first spring which rotates the first shaft in the opening direction by the biasing force of the spring 132.

The second spring 125 is secured to the second shaft 124 by fitting the arm portion 125a to the second shaft 124 and fitting the arm portion 125b to the shaft 131.

The operation of the hinge mechanism 130 when the hinge mechanism 130 is incorporated in the foldable portable telephone is the same as the operation of the hinge mechanism 110 described above, and a description thereof will be omitted.

FIGS. 26 through 30 show various modifications of the foldable portable telephone in which the hinge mechanism of the present invention is incorporated.

Figure 26:
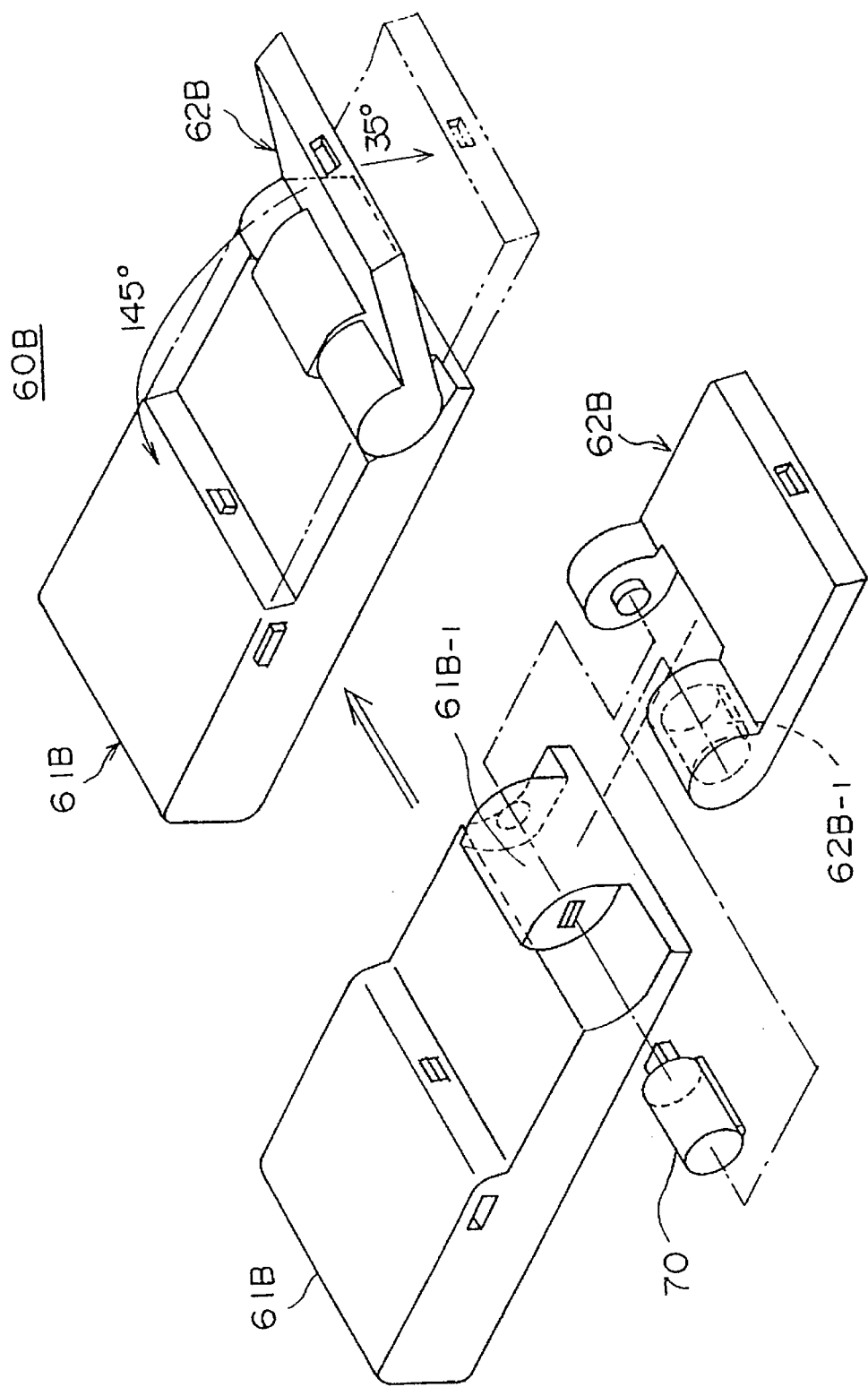
FIGS. 26 through 30 are views of various modifications of the foldable portable telephone including the hinge mechanism of the present invention.

Referring to FIG. 26, a foldable portable telephone 60B includes a telephone body 61B, a foldable lid 62B, and the hinge mechanism 70 shown in FIG. 11.

The foldable lid 62B has an end portion 62B-1 in which the hinge mechanism 70 is included.

The telephone body 61B has an end portion 61B-1 to which the above-described lid 62B is attached. It is not necessary to include the hinge mechanism 70 within the telephone body 61B, and in the end portion 61B-1, the transmitter portion and the buzzer, other than the hinge mechanism 70, may be included. Therefore, the internal space of the portable telephone 60B can be efficiently used.

It is also possible that any of the hinge mechanism 100 shown in FIGS. 16 and 18, the hinge mechanism 110 shown in FIGS. 20 and 21, and the hinge mechanism 130 shown in FIGS. 24 and 25 be incorporated in the portable telephone 60B in a similar manner, instead of the hinge mechanism 70.

Figure 27:
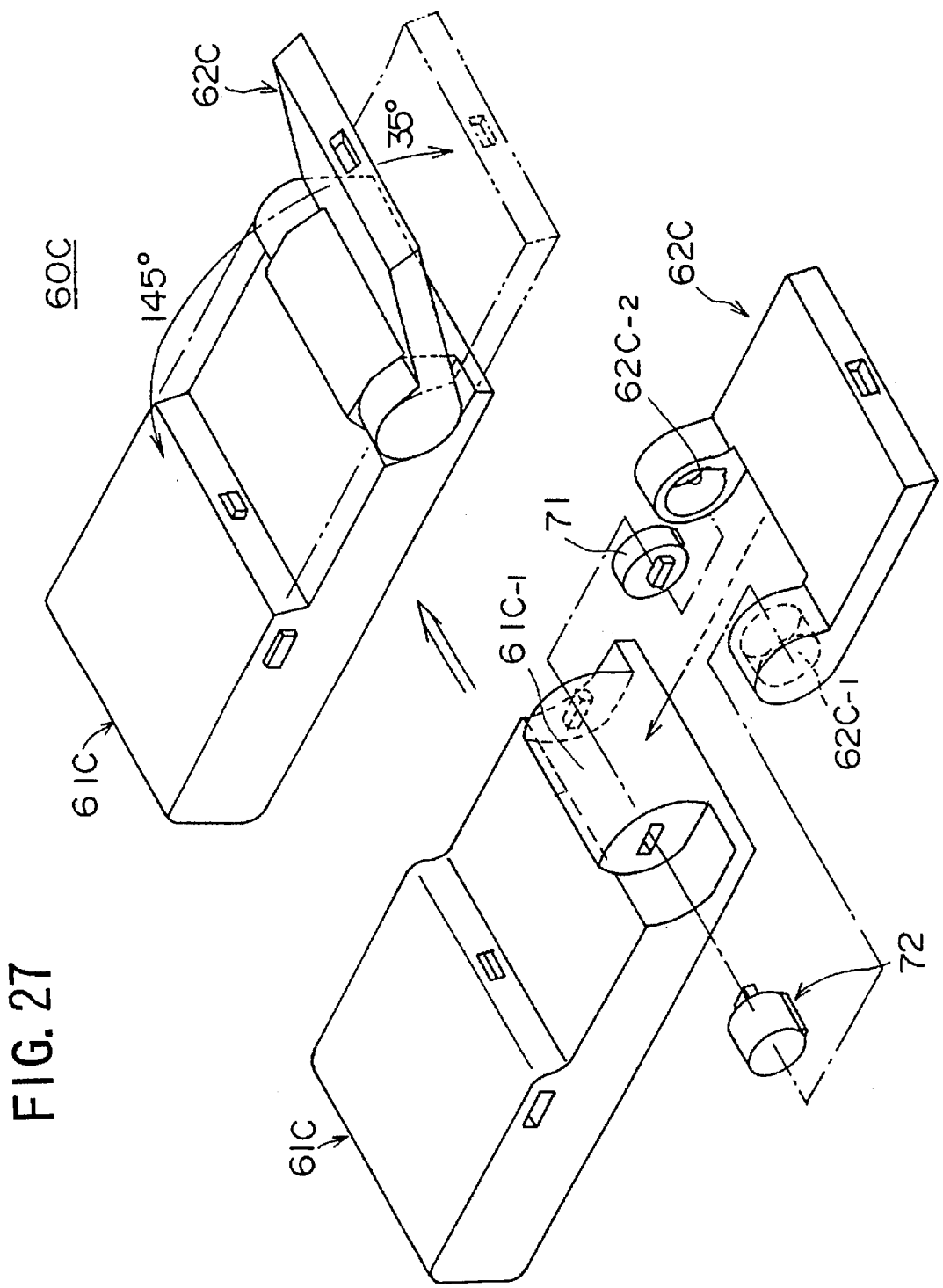

Referring to FIG. 27, a foldable portable telephone 60C includes a telephone body 61C, a foldable lid 62C, the rotary oil damper 71, and the lid opening/closing member 72. The oil damper 71 and the member 72 are included in the hinge mechanism 70 shown in FIG. 11, and they are separately included in the portable telephone 60C.

The foldable lid 62C has an end portion 62C-1 containing the lid opening/closing member 72, and has an end portion 62C-2 containing the oil damper 71. The end portions 62C-1 and 62C-2 are separately provided in the foldable lid 62C.

The telephone body 61C has an end portion 61C-1 to which the above lid 62C is attached. It is not necessary to include the hinge mechanism 70 within the telephone body 61C, and in the end portion 61C-1, the transmitted portion and the buzzer, other than the hinge mechanism 70, may be included. Therefore, the internal space of the portable telephone 60C can be efficiently used.

It is also possible that any of the hinge mechanism 100 shown in FIGS. 16 and 18, the hinge mechanism 110 shown in FIGS. 20 and 21, and the hinge mechanism 130 shown in FIGS. 24 and 25 be incorporated in the portable telephone 60C in a similar manner, instead of the hinge mechanism 70.

Figure 28:
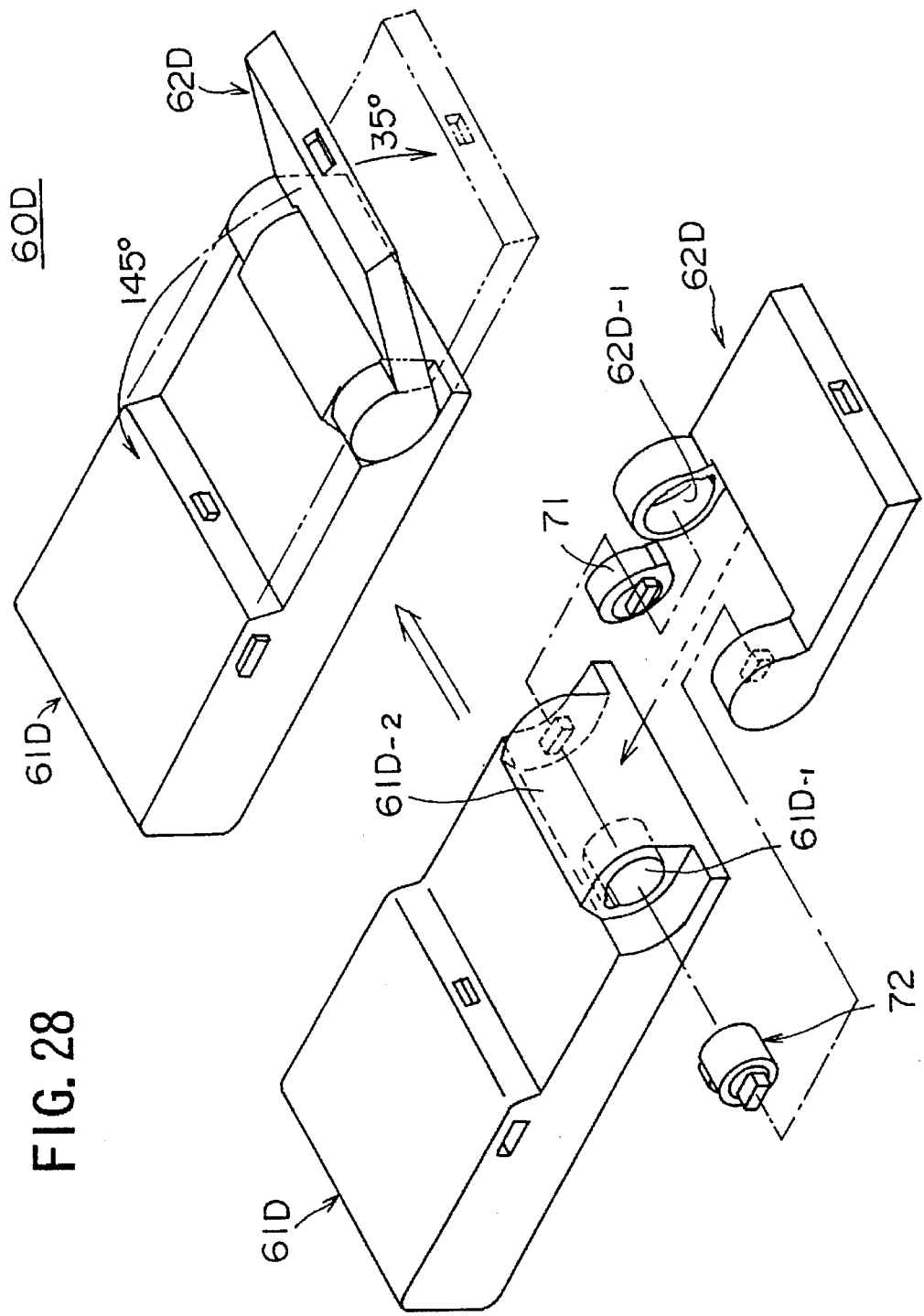

Referring to FIG. 28, a foldable portable telephone 60D includes a telephone body 61D, a foldable lid 62D, the rotary oil damper 71, and the lid opening/closing member 72. The oil damper 71 and the member 72 are separately included in the portable telephone 60D.

The foldable lid 62D has an end portion 62D-1 in which only the oil damper 71 is included. The telephone body 61D has an end portion 61D-1 in which only the lid opening/closing member 72 is included, and the above lid 62D is attached to an end portion 61D-2 of the telephone body 61D.

Therefore, it is not necessary to include the oil damper 71 within the telephone body 61D, and in the end portion 61D-2, the transmitter portion and the buzzer, other than the hinge mechanism 70, may be included. Therefore, the internal space of the portable telephone 60D can be efficiently used.

It is also possible that any of the hinge mechanism 100 shown in FIGS. 16 and 18, the hinge mechanism 110 shown in FIGS. 20 and 21, and the hinge mechanism 130 shown in FIGS. 24 and 25 be incorporated in the portable telephone 60D in a similar manner, instead of the hinge mechanism 70.

Figure 29:
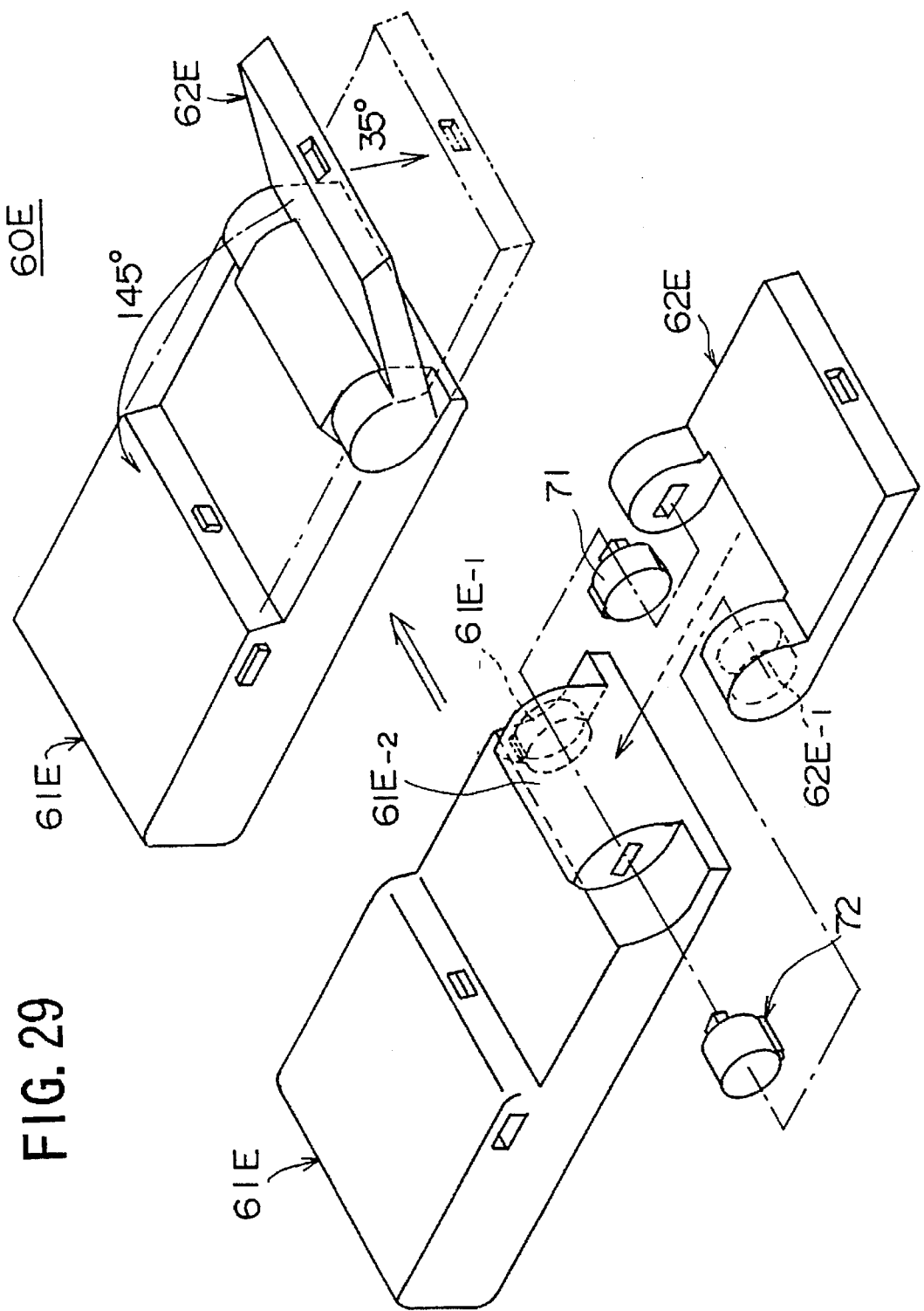

Referring to FIG. 29, a foldable portable telephone 60E includes a telephone body 61E, a foldable lid 62E, the rotary oil damper 71, and the lid opening/closing member 72. The damper 71 and the member 72 are separately included in the portable telephone 60E.

The foldable lid 62E has an end portion 62E-1 in which only the lid opening/closing member 72 is included. The telephone body 61E has an end portion 61E-1 in which only the oil damper 71 is included. The above lid 62E is attached to an end portion 61E-2 of the telephone body 61E.

Therefore, it is not necessary to include the lid opening/closing member 72 within the telephone body 61E, and in the end portion 61E-2, the transmitter portion and the buzzer (both not shown), other than the hinge mechanism 70, may be included. Therefore, the internal space of the portable telephone 60E can be efficiently used.

It is also possible that any of the hinge mechanism 100 shown in FIGS. 16 and 18, the hinge mechanism 110 shown in FIGS. 20 and 21, and the hinge mechanism 130 shown in FIGS. 24 and 25 be incorporated in the portable telephone 60E in a similar manner, instead of the hinge mechanism 70.

Figure 30:
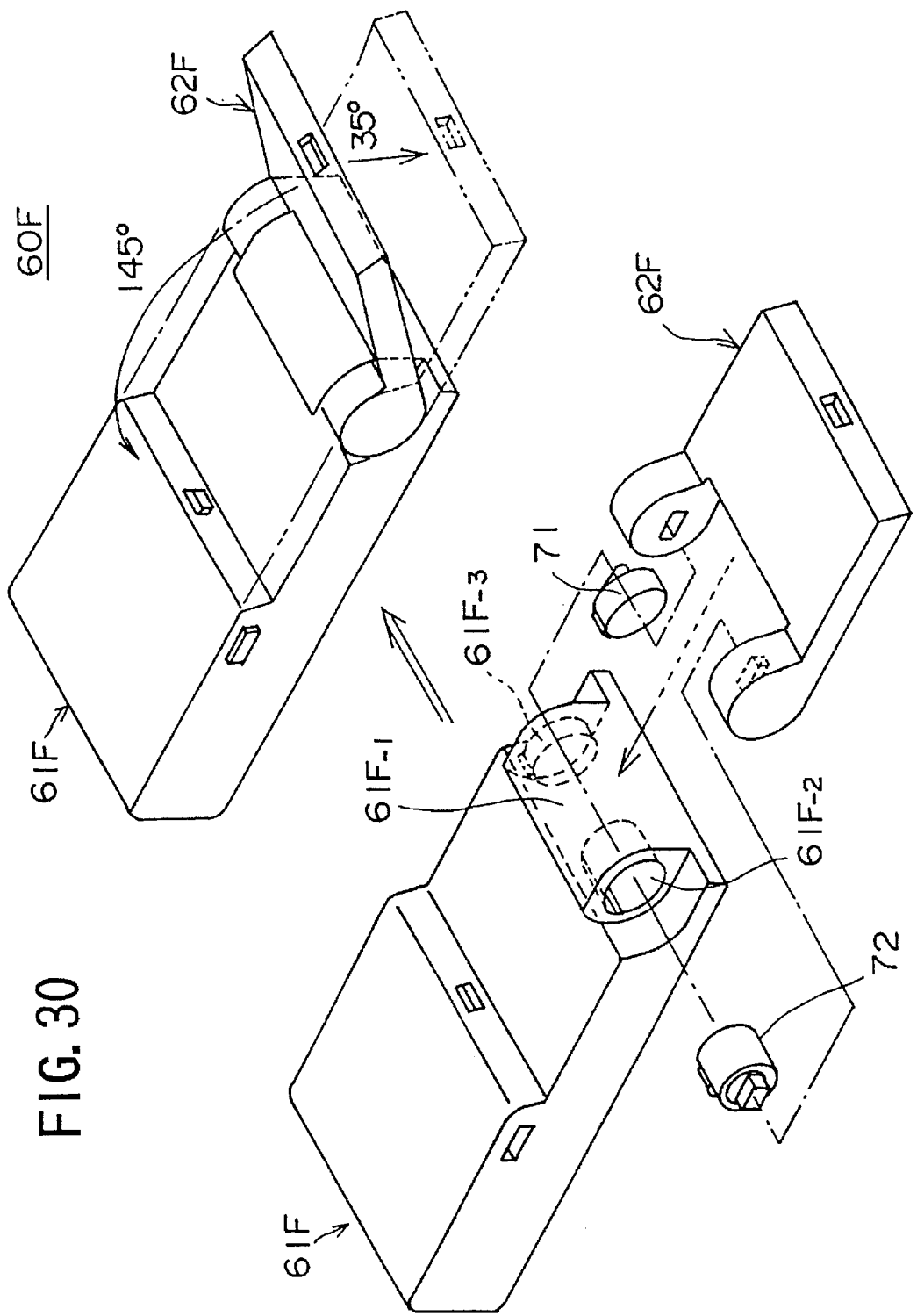

Referring to FIG. 30, a foldable portable telephone 60F includes a telephone body 61F, a foldable lid 62F, the rotary oil damper 71, and the lid opening/closing member 72. The damper 71 and the member 72 are separately included in the portable telephone 60F.

The telephone body 61F has a portion 61F-1 which has an end portion 61F-2 containing the lid opening/closing member 72 and an end portion 61F-3 containing the oil damper 71. The foldable lid 62F is attached to the portion 61F-1, and, in the portion 61F-1, the transmitter portion and the buzzer (both not shown) are included.

The oil damper 71 and the member 72 are separately incorporated in the portable telephone 60F. Therefore, the flexibility in design of the portable telephone 60F is relatively high in comparison with that of the portable telephone 60 in FIG. 8 or that of the portable telephone 60A in FIG. 14.

It is also possible that any of the hinge mechanism 100 shown in FIGS. 16 and 18, the hinge mechanism 110 shown in FIGS. 20 and 21, and the hinge mechanism 130 shown in FIGS. 24 and 25 be incorporated in the portable telephone 60F in a similar manner, instead of the hinge mechanism 70.

Referring to FIGS. 31 through 37B, a lid locking member of a foldable portable telephone including the hinge mechanism of the present invention will be described. The lid locking member ensures a smooth operation of the foldable portable telephone in which the hinge mechanism of the present invention is incorporated.

The lid locking member is also shown in FIGS. 8 and 9. In FIGS. 31 through 37B, the elements which are the same as corresponding elements in FIGS. 8 and 9 are designated by the same reference numerals, and a description thereof will be omitted.

Figure 31:
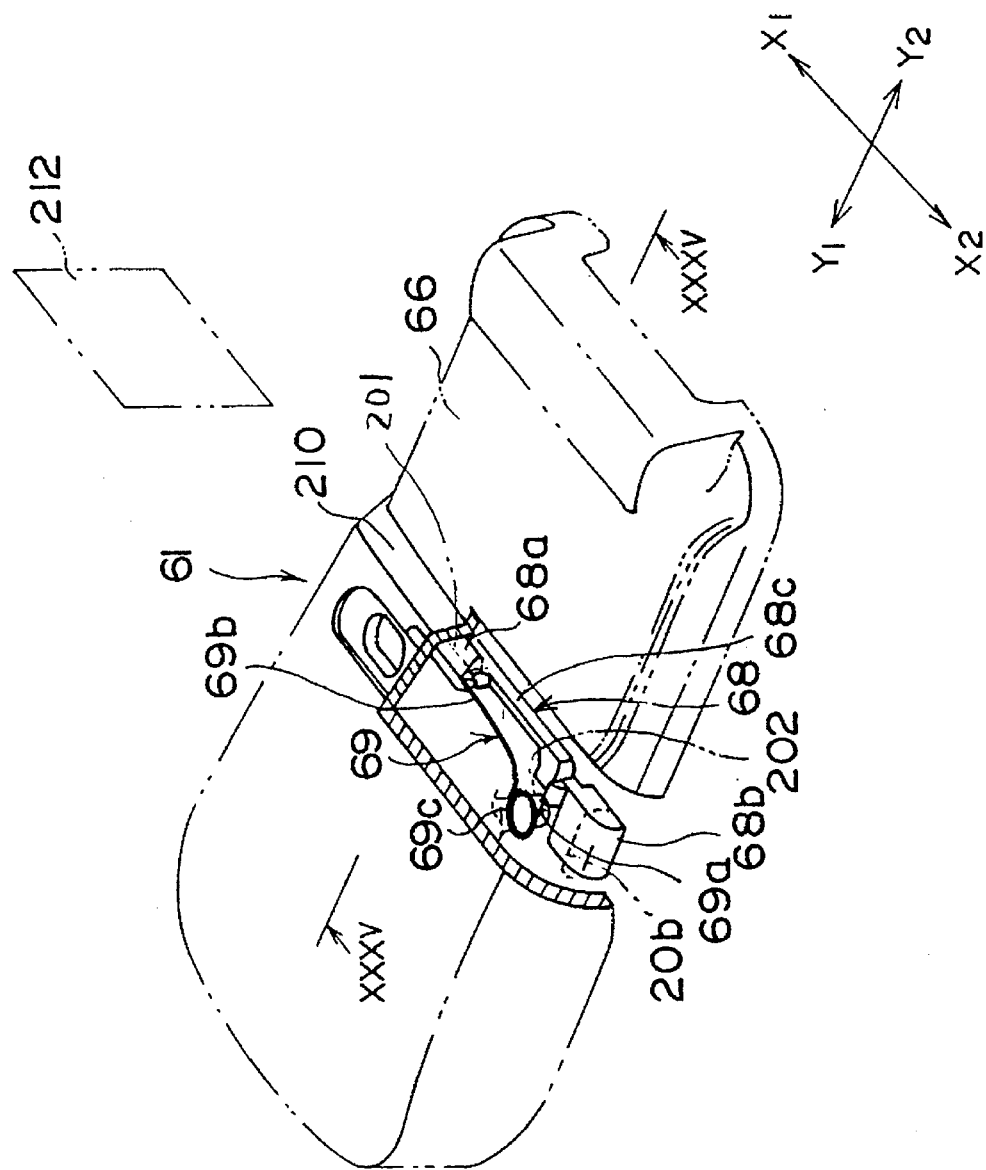
FIG. 31 is a perspective view of a lid locking member of a foldable portable telephone including the hinge mechanism of the present invention.

Referring to FIG. 31, a lid locking member 67 includes the locking unit 68 and the spring unit 69. The locking unit 68 in this embodiment is a resin-molded part made of a poly-acetal resin. The poly-acetal resin has a relatively high wear resistance and a relatively high toughness.

Figure 36A:
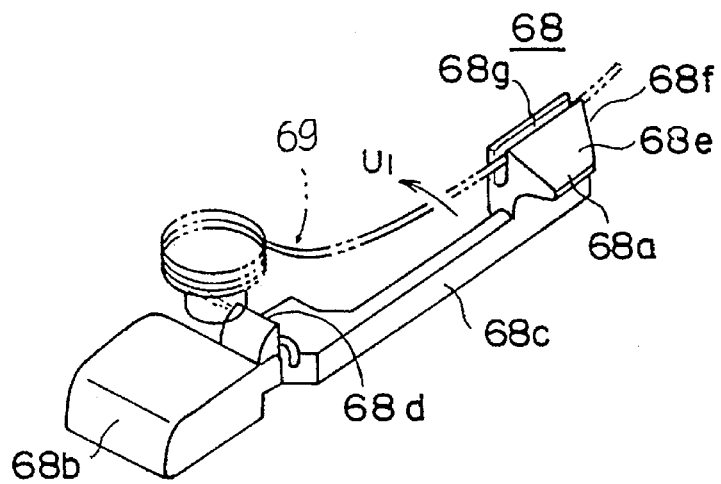
FIGS. 36A, 36B and 36C are views of a locking unit of the lid locking member in FIG. 31.
Figure 36B:
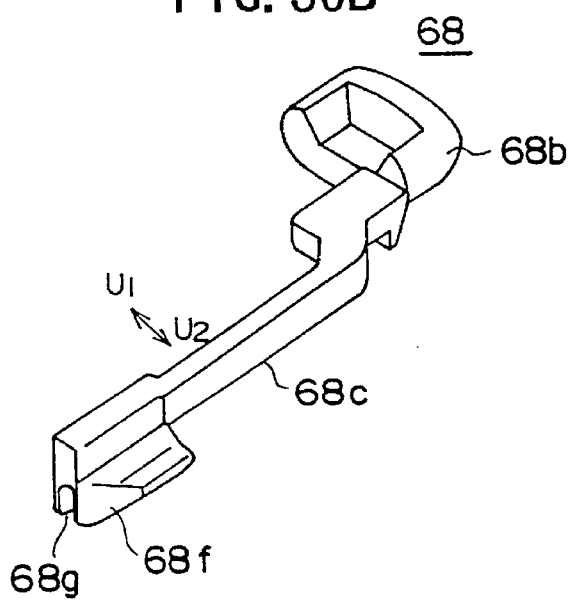
Figure 36C:
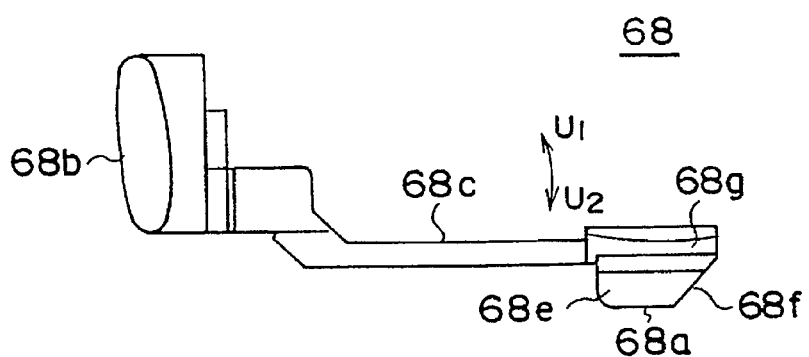

As shown in FIGS. 36A through 36C, the locking unit 68 has an elongated shape. The locking unit 68 includes an arm portion 68c, the push button 68b at one end of the arm portion 68c, and the projecting portion 68a at the other end of the arm portion 68c. The arm portion 68c is tough enough to resist a bending force repeatedly exerted in directions indicated by the arrows U1 and U2.

The locking unit 68 further includes a projection 68d in the vicinity of the push button 68b. One end of the spring unit 69 is secured to the projection 68d.

The projecting portion 68a has a generally triangular cross section, and it includes a laterally extending slope 68e. The projecting portion 68a includes a forwardly extending slope 68f at its leading end, and an axially extending groove 68g on its top.

Figure 32:
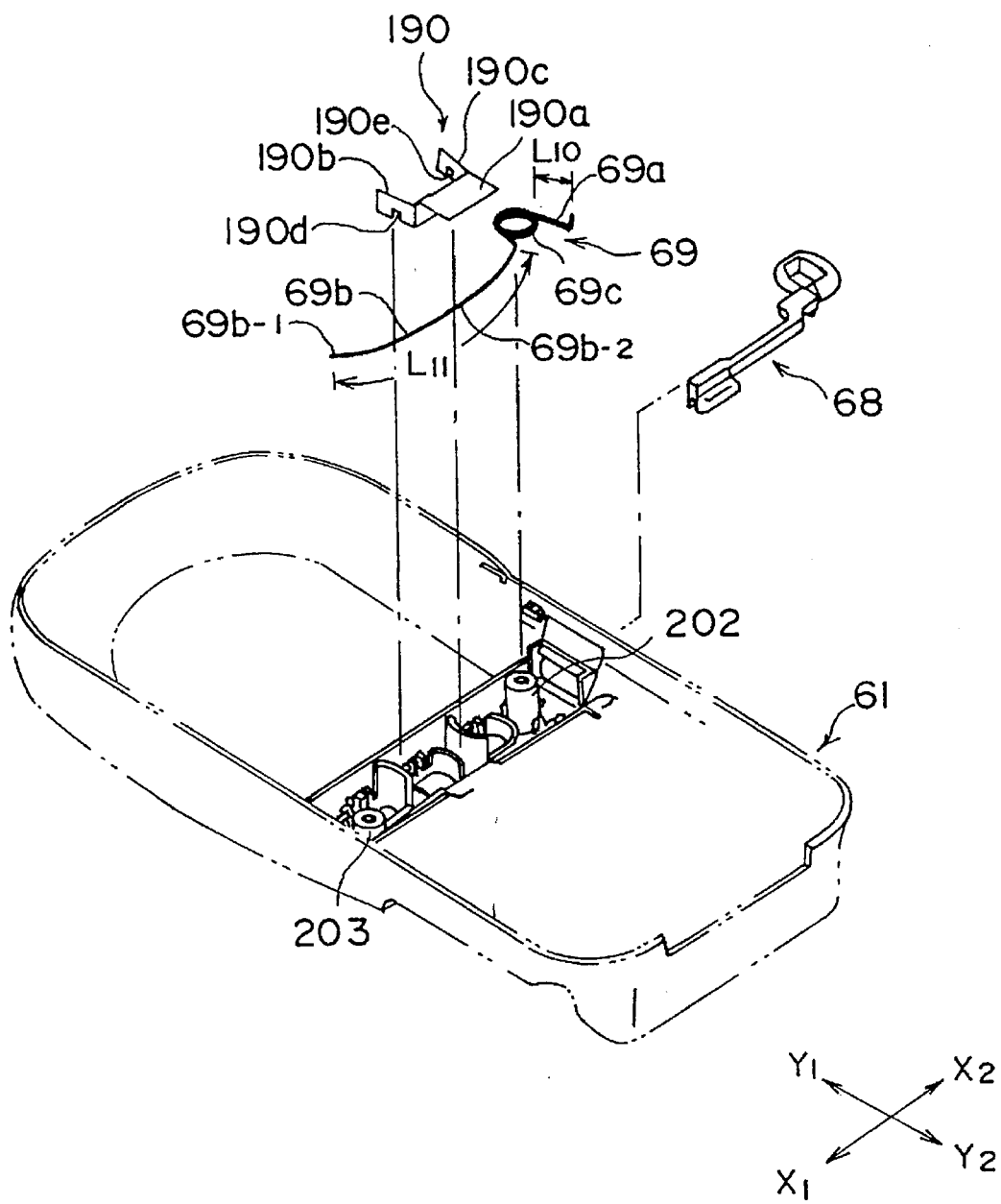
FIG. 32 is an exploded view of the lid locking member in FIG. 31.

The spring unit 69 is a helical torsion spring. The spring unit 69 includes a coil portion 69c, and two arm portions 69a and 69b extending from the coil portion 69c. As shown in FIG. 32, the arm portion 69a has a small length L10, and the arm portion 69b has a length L11 that is rather greater than the length L10 of the arm portion 69a. The arm portion 69a extends from the coil portion 69c in a direction perpendicular to the axial direction of the locking unit 68. The arm portion 69b extends from the coil portion 69c in a direction parallel to the axial direction of the locking unit 68, and it is slightly curved toward the locking unit 68.

Referring to FIG. 32, a retaining unit 190 is a sheet-metal part. The retaining unit 190 includes a retaining surface 190a, and two arm portions 190b and 190c extending from the retaining surface 190a. The arm portions 190b and 190c include cut-out portions 190d and 190e, respectively. The retaining unit 190 is secured to the telephone body 61 by fitting the cut-out portions 190d and 190e.

Figure 33:
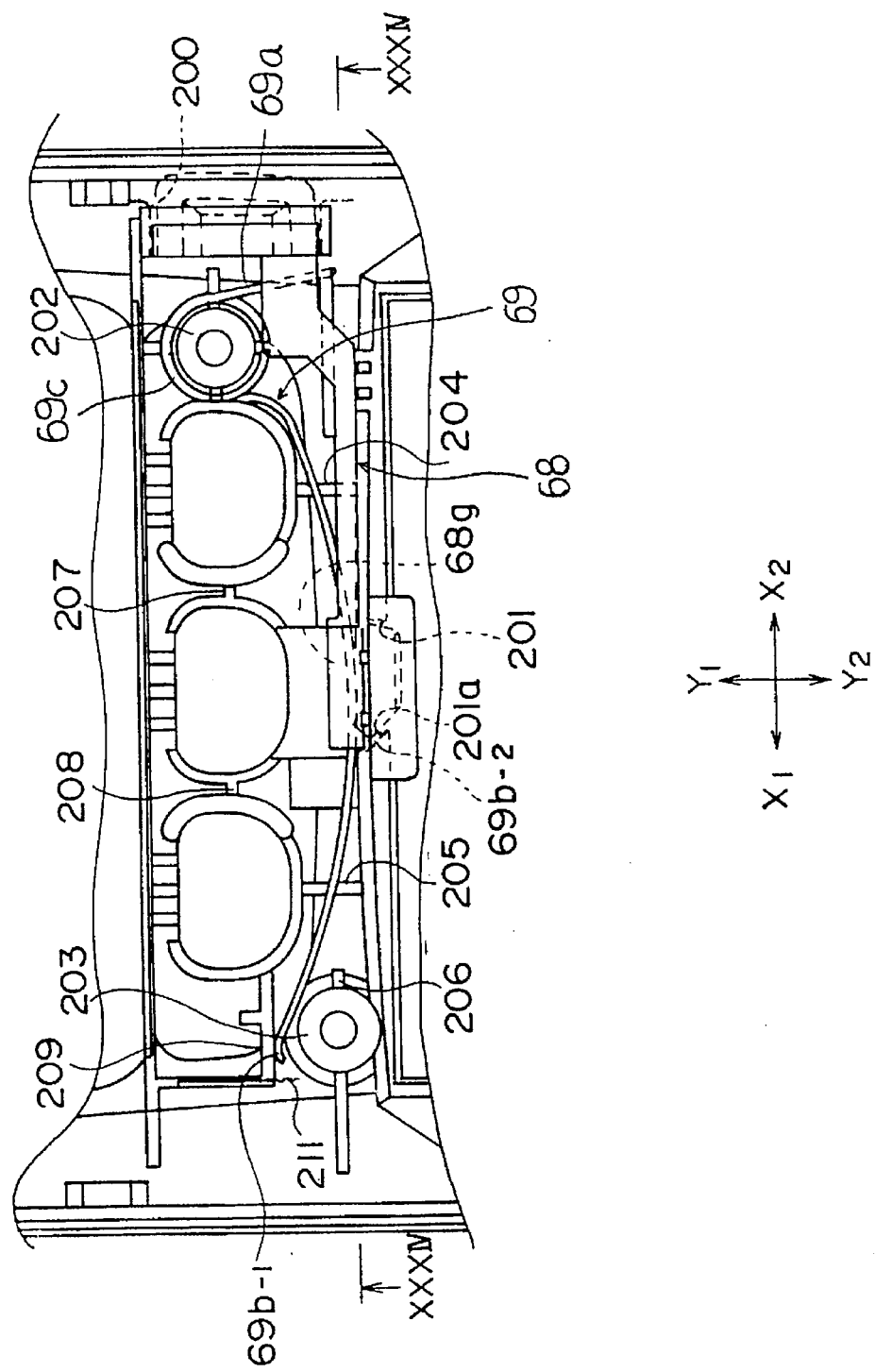
FIG. 33 is a bottom view of the lid locking member in FIG. 31.

Referring to FIG. 32, the telephone body 61 includes two openings 200 and 201, two bosses 202 and 203, and various ribs 204, 205, 206, 207, 208 and 209. As shown in FIG. 33, the opening 200 is located in the middle of a side portion of the telephone body 61, and the opening 201 is located at the center of the telephone body 61. As shown in FIG. 35, the opening 201 is formed in a raised wall 210 between the ten-key portion 66 and the display portion 65. The opening 201 includes a slope 201a on the inner peripheral wall of the opening 201. The slope 201a is located at one end of the opening 201 opposite to the opening 200.

As it is apparent from FIG. 32, the lid locking member 67 is incorporated in the portable telephone by fitting to the telephone body 61 the spring unit 69, the locking unit 68 and the retaining unit 190, in this order.

Figure 34:
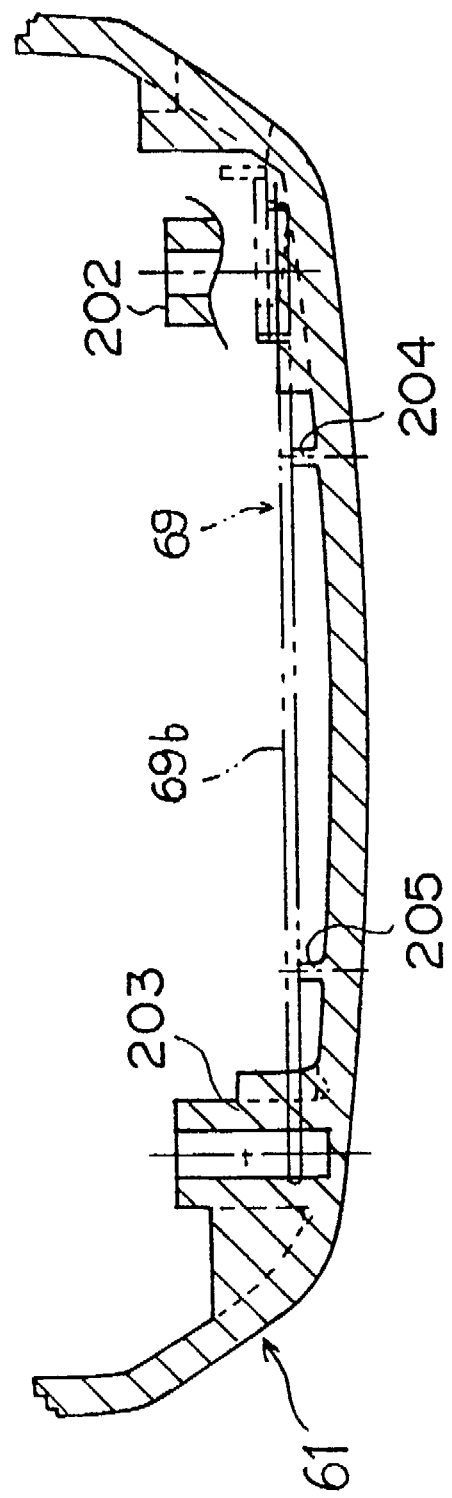
FIG. 34 is a cross-sectional view of the lid locking member taken along a line XXXIV—XXXIV in FIG. 33.

Referring to FIGS. 33 and 34, the coil portion 69c of the spring unit 69 is fitted to the boss 202. The arm portion 69b is supported on the ribs 204 and 205, and an end 69b-1 of the arm portion 69b is inserted in a space 211 between the boss 203 and the rib 209. The arm portion 68c of the locking unit 68 is placed on the inner surface of the raised wall 210. The push button 68b projects outward from the opening 200. The projecting portion 68a projects from the opening 201.

The arm portion 69a of the spring unit 69 is connected to the projection 68d of the locking unit 68. The locking unit 68 is pushed by the spring unit 69 in the direction X1 due to a biasing force of the arm portion 69a. Thus, the push button 68b projects outward from the opening 200.

An intermediate part 69b-2 of the arm portion 69b of the spring unit 69 is fitted in the groove 68g of the locking unit 68. The locking unit 68 is pushed by the spring unit 69 in the direction Y2 due to a biasing force of the arm portion 69b. Thus, as shown in FIG. 35, the projecting portion 68a of the locking unit 68 projects from the opening 201 in the direction Y2.

The retaining unit 190 is secured to the telephone body 61 by fitting the cut-out portions 190d and 190e to the ribs 207 and 208. The retaining portion 190a is connected to the projection 68d of the locking unit 68. The projecting portion 68a is held by the retaining surface 190a as shown in FIG. 35.

As shown in FIG. 35, when the lid 62 is placed in the folded condition, the end of the lid 62 is brought into contact with the projecting portion 68a of the locking unit 68. The projecting portion 68a is slightly moved in the direction Y1 by the lid 62.

When the lid 62 is at the closed position "P1", the projecting portion 68a is connected to the recessed portion 62a of the lid 62. Thus, the lid 62 is locked at the closed position "P1" by the lid locking member 67.

In the above-described operation of the lid locking member 67, the arm portion 68c of the locking unit 68 is resiliently bent and returns back to the initial, straight condition by using the biasing force of the spring unit 69. The push button 68b is stationary during the above operation.

Figure 37A:
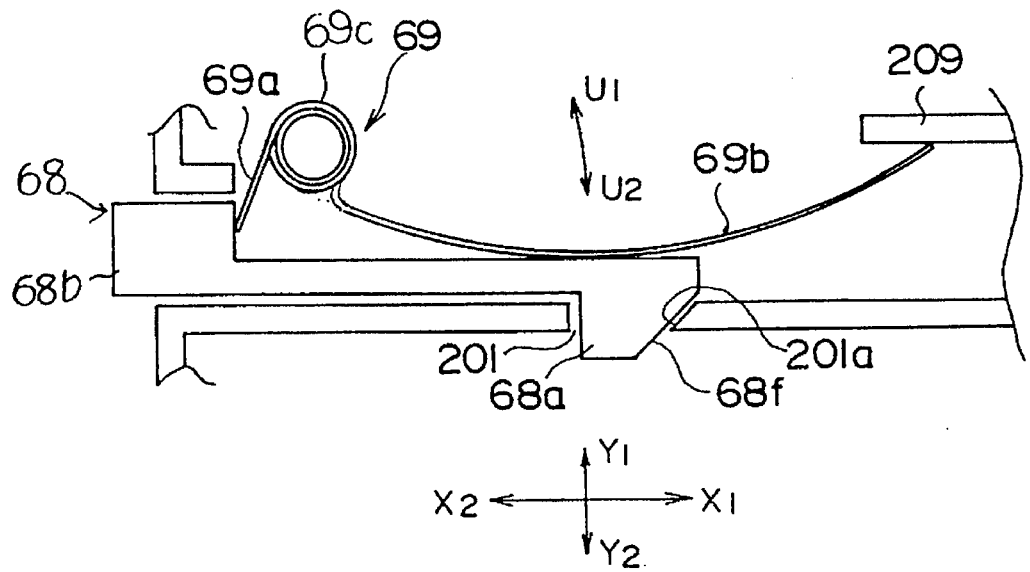
FIGS. 37A and 37B are diagrams for explaining operations of the lid locking member in FIG. 31.
Figure 37B:
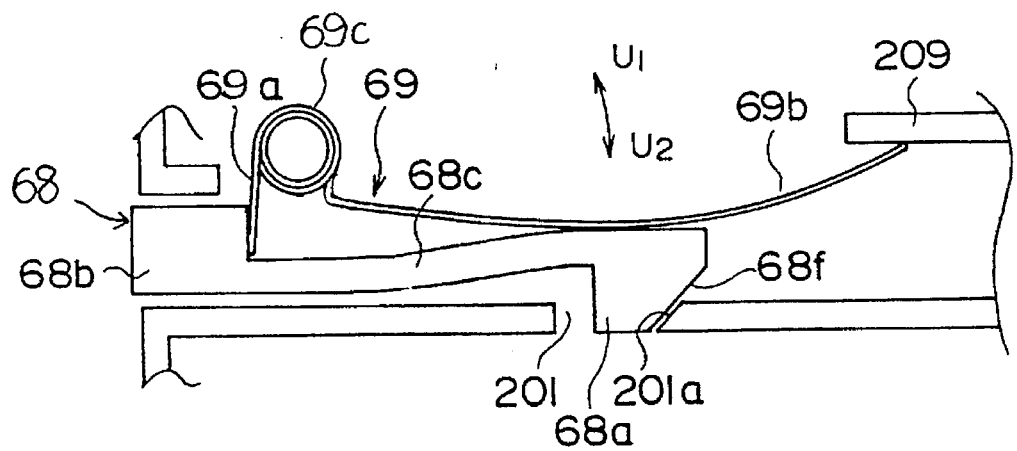

Referring to FIGS. 37A and 37B, when the push button 68b is pushed by the user, the locking unit 68 is moved in the direction X1 relative to the telephone body 61 against the biasing force of the arm portion 69a of the spring unit 69. The projecting portion 68a is moved also in the direction X1, and the slope 68f slides on the slope 201a of the opening 201. The projecting portion 68f is thus moved in the direction Y1 toward the inside of the opening 201. The arm portion 68c is resiliently bent in the direction U1. Also, the intermediate part 69b-2 of the arm portion 69b is resiliently bent in the direction Y1.

As the projecting portion 68a is moved inward to the opening 201, the projecting portion 68a is disconnected from the recessed portion 62a of the lid 62. The lid 62 is thus unlocked and it is placed in the opened condition.

When the external force exerted by the user to the push button 68b is removed, the locking unit 68 is moved in the direction X2 back to the initial position due to the biasing force of the arm portion 69a of the spring unit 69. The arm portion 68c of the spring unit 68 returns from the bent condition to the initial, straight condition. Thus, the projecting portion 68a projects from the opening 201 in the direction Y2 again.

Accordingly, the projecting portion 68a of the locking unit 68 is moved back and forth in the directions Y2 and Y1 and it is slightly moved in the directions X1 and X2. The arm portion 69b of the spring unit 69 at such times slides in the groove 68g of the locking unit 68. Therefore, the biasing force of the arm portion 69b of the spring unit 69 stably acts on the locking unit 68.

If the lid locking member includes no spring unit 69, the arm portion 68c of the locking unit 68 would have a permanent deformation when the push button 68b is pushed by the user several thousand times. However, in the lid locking member 67 in the above embodiment, the biasing force of the arm portion 69b of the spring unit 69 always acts on the arm portion 68c. Therefore, the lid locking member 67 can provide a high reliability of the operation of the portable telephone.

If the arm portion 68c is broken when the lid 62 is in the closed condition, the lid 62 can be unlocked by inserting a card 212 between the raised wall 210 and the lid 62, as shown in FIG. 31. As the inserted card 212 moves in the direction X2, the projecting portion 68a is pushed in the direction Y1 by the card 212. Thus, the projecting portion 68a of the locking unit 68 can be disconnected from the recessed portion 61a of the lid 62 by using the card 212.

Figure 38A:
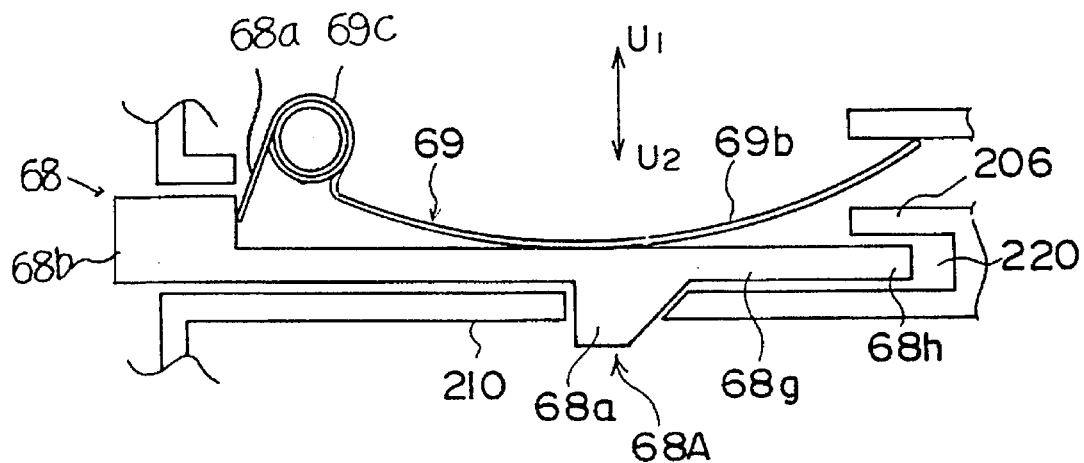
FIGS. 38A, 38B and 39 are diagrams showing a modification of the lid locking member.
Figure 38B:
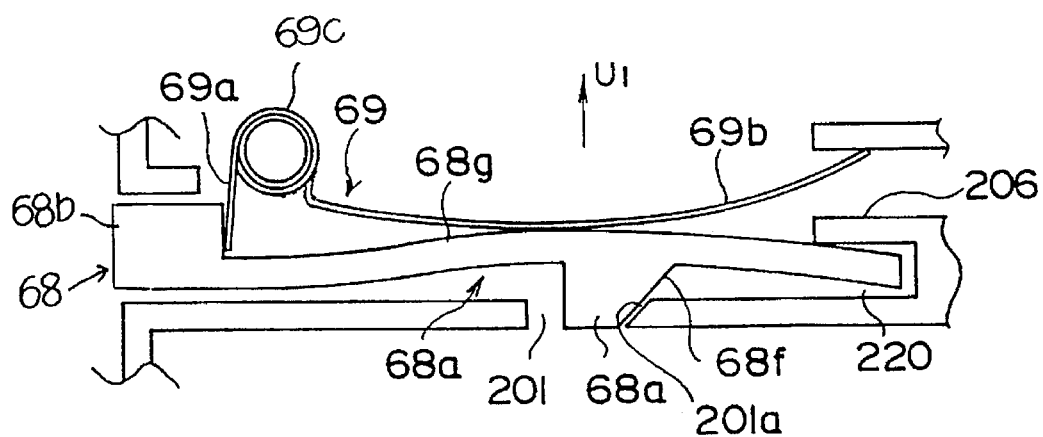
Figure 39:
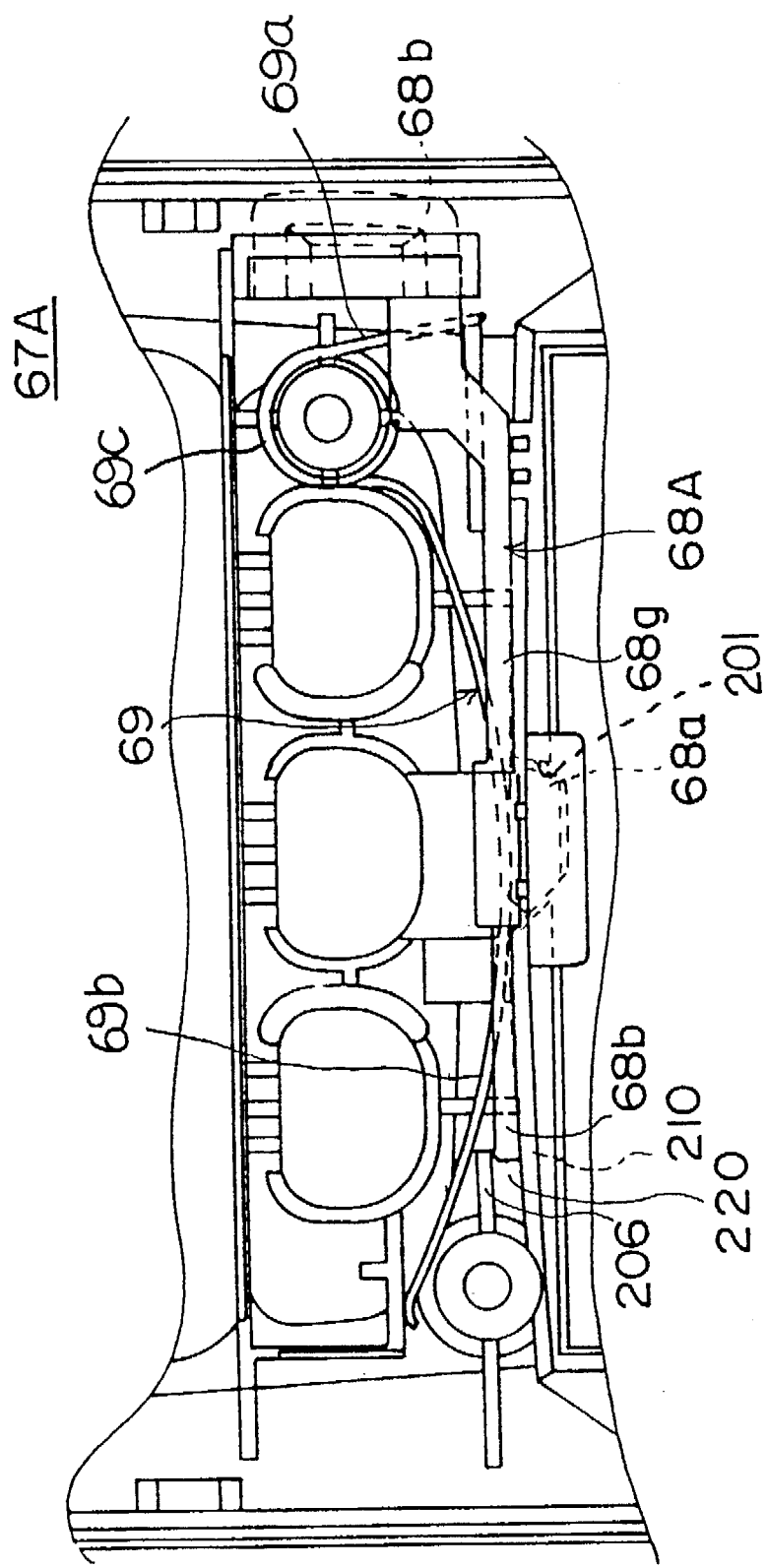

Referring to FIGS. 38A, 38B and 39, a modification of the lid locking member of the foldable portable telephone including the hinge mechanism of the present invention will be described.

In FIGS. 38A through 47, the elements which are the same as corresponding elements in FIGS. 31 through 37B are designated by the same reference numerals, and a description thereof will be omitted.

A lid locking member 67A, shown in FIGS. 38A, 38B and 39, includes a locking unit 68A which is longer than the locking unit 68 of the lid locking member 67 in the previous embodiment.

The locking unit 68A includes an arm portion 68g which is longer than the arm portion 68c of the previous embodiment. The projecting portion 68a is provided at an intermediate part of the arm portion 68g. A leading edge 68h of the arm portion 68g is inserted in a recessed portion 220 between the raised wall 210 and the rib 206. Thus, both ends of the locking unit 68A are supported, which ensures a reliability of the movement of the locking unit 68A.

When the push button 68b is pushed by the user, the locking unit 68A is moved in the direction X1 relative to the telephone body 61. The projecting portion 68a is moved in the direction X1, and the slope 68f slides on the slope 201a of the opening 201. The projecting portion 68a is moved in the direction Y1 toward the inside of the opening 201. As shown in FIG. 33B, the arm portion 68g is resiliently bent in the direction U1.

As the projecting portion 68a is moved inward to the opening 201, the projecting portion 68a is disconnected from the recessed portion 62a of the lid 62. The lid 62 is thus unlocked and the lid 62 will be opened.

When the external force exerted by the user to the push button 68b is removed, the locking unit 68A is moved in the direction X2 back to the initial position due to the biasing force of the arm portion 69a of the spring unit 69. The arm portion 68g of the spring unit 68 returns from the bent condition to the initial, straight condition. Thus, the projecting portion 68a projects from the opening 201 in the direction Y2 again.

Figure 40A:
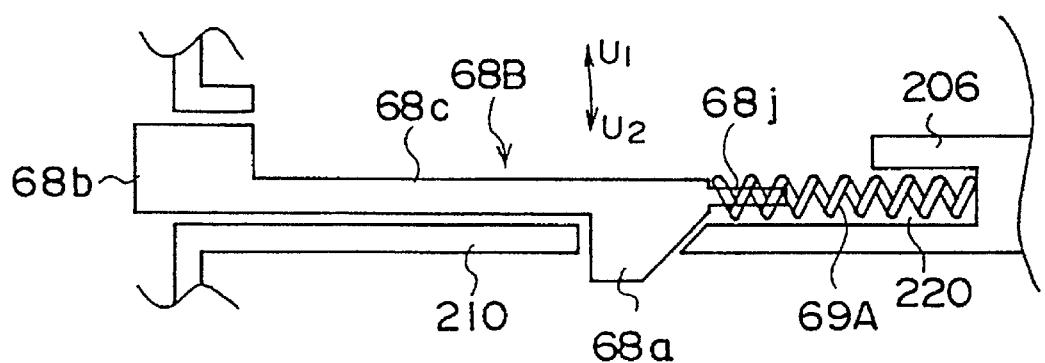
Figure 40B:
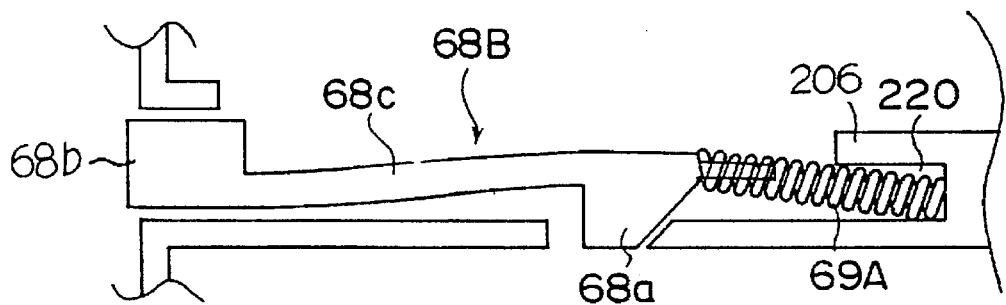

Referring to FIGS. 40A, 40B and 41, another modification of the lid locking member of the foldable portable telephone including the hinge mechanism of the present invention will be described.

A lid locking member 67B, shown in FIGS. 40A, 40B and 41, includes a locking unit 68B and a helical compression spring 69A.

The locking unit 68B includes an extended portion 68j in addition to the locking unit 68 in FIGS. 37A and 37B. The extended portion 68j is additionally provided at the end of the projecting portion 68a. One end of the locking unit 68B is supported.

The compression spring 69A has one end fitted to the extended portion 68j, and the other end is inserted in the recessed portion 220.

When the push button 68b is pushed by the user, the locking unit 68B is moved in the direction X1 relative to the telephone body 61. The projecting portion 68a is moved in the direction X1, and the slope 68f slides on the slope 201a of the opening 201. The projecting portion 68a is moved in the direction Y1 toward the inside of the opening 201. The compression spring 69A is resiliently bent in the direction U1, and the arm portion 68c is resiliently bent in the direction U1, as shown in FIG. 40B.

As the projecting portion 68a is moved inward to the opening 201, the projecting portion 68a is disconnected from the recessed portion 62a of the lid 62. The lid 62 is thus unlocked and the lid 62 will be opened.

When the external force exerted by the user to the push button 68b is removed, the locking unit 68B is moved in the direction X2 back to the initial position due to the biasing force of the compression spring 69A. The arm portion 68c of the spring unit 68 returns from the bent condition to the initial, straight condition. Thus, the projecting portion 68a projects from the opening 201 in the direction Y2 again.

Figure 42A:
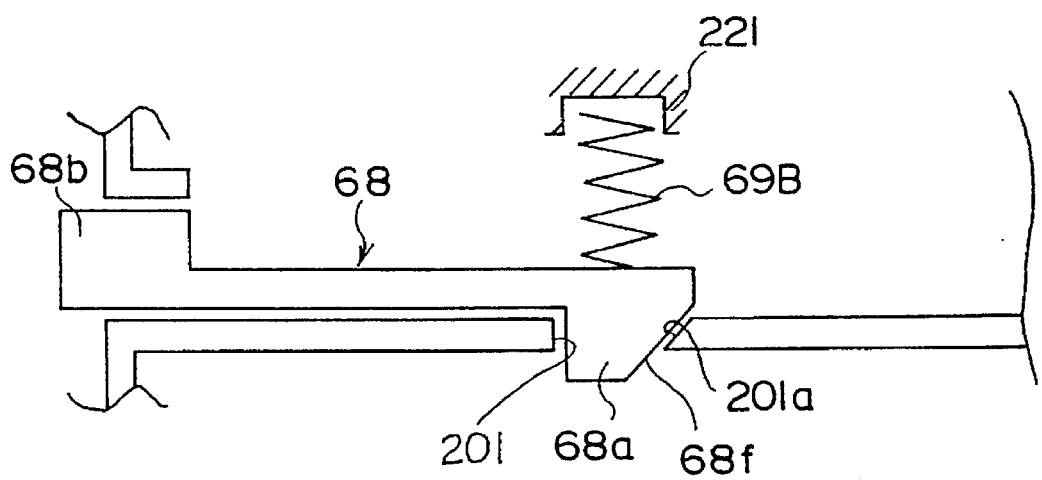
FIGS. 42A, 42B and 43 are diagrams showing still another modification of the lid locking member.
Figure 42B:
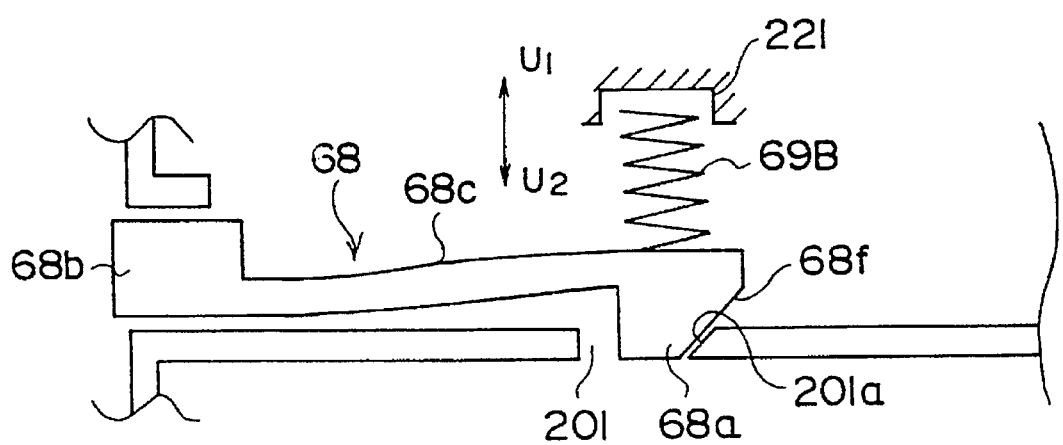
Figure 43:
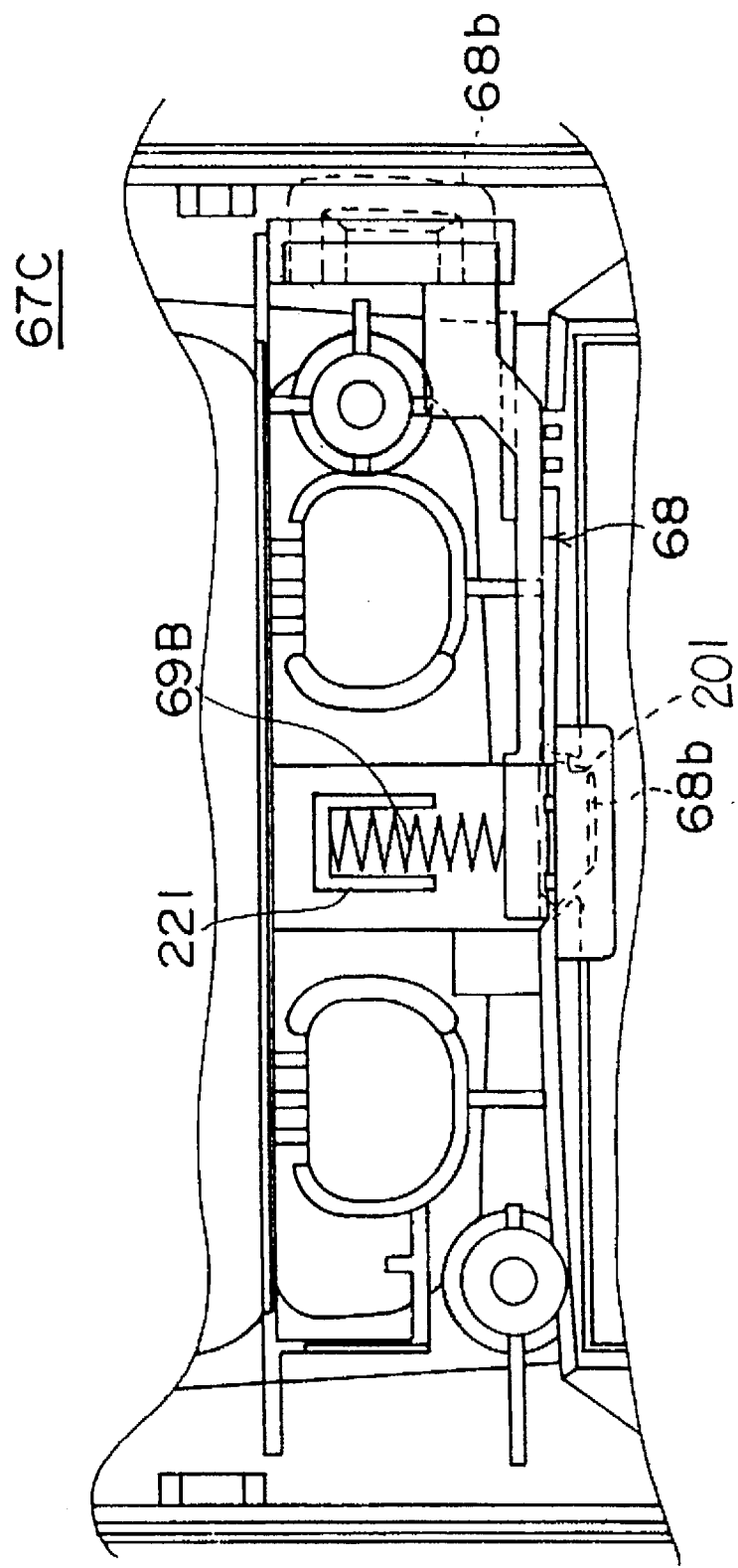

Referring to FIGS. 42A, 42B and 43, still another modification of the lid locking member of the foldable portable telephone including the hinge mechanism of the present invention will be described.

A lid locking member 67C, shown in FIGS. 42A, 42B and 43, includes the locking unit 68 and a helical compression spring 69B.

The compression spring 69B extends in the longitudinal direction of the portable telephone. One end of the compression spring 69B is supported by a spring supporting portion 221 fixed to the telephone body 61. The other end of the compression spring 69B is fitted to the back of the projecting portion 68a.

When the push button 68b is pushed by the user, the locking unit 68 is moved in the direction X1 relative to the telephone body 61. The projecting portion 68a is moved in the direction X1, and the slope 68f slides on the slope 201a of the opening 201. The projecting portion 68a is moved toward the inside of the opening 201 against the biasing force of the compression spring 69B. The compression spring 69B is compressed and the arm portion 68c is resiliently bent in the direction U1 as shown in FIG. 42B.

Accordingly, the projecting portion 68a is disconnected from the recessed portion 62a of the lid 62. The lid 62 is thus unlocked and the lid 62 will be opened.

When the external force exerted by the user to the push button 68b is removed, the locking unit 68 is moved in the direction X2 back to the initial position due to the biasing force of the compression spring 69B. The arm portion 68c of the spring unit 68 returns from the bent condition to the initial, straight condition. Thus, the projecting portion 68a projects from the opening 201 in the direction Y2 again.

Figure 44A:
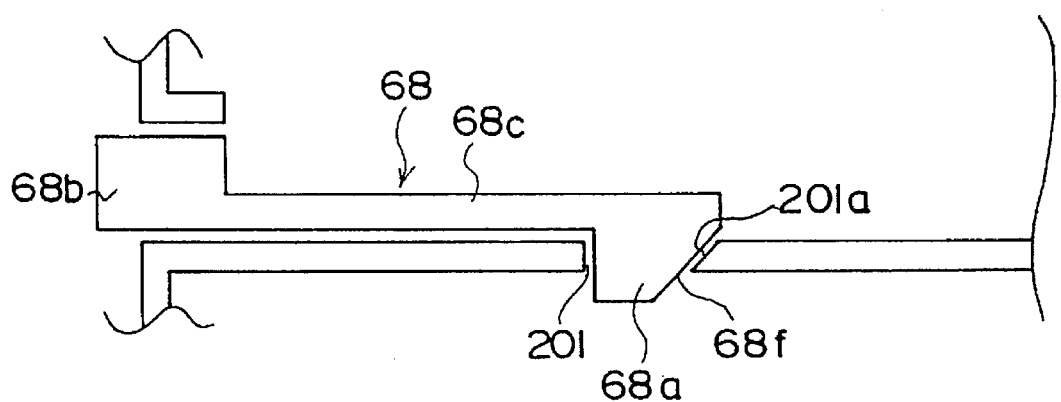
FIGS. 44A, 44b and 45 are diagrams showing a further modification of the lid locking member.
Figure 44B:
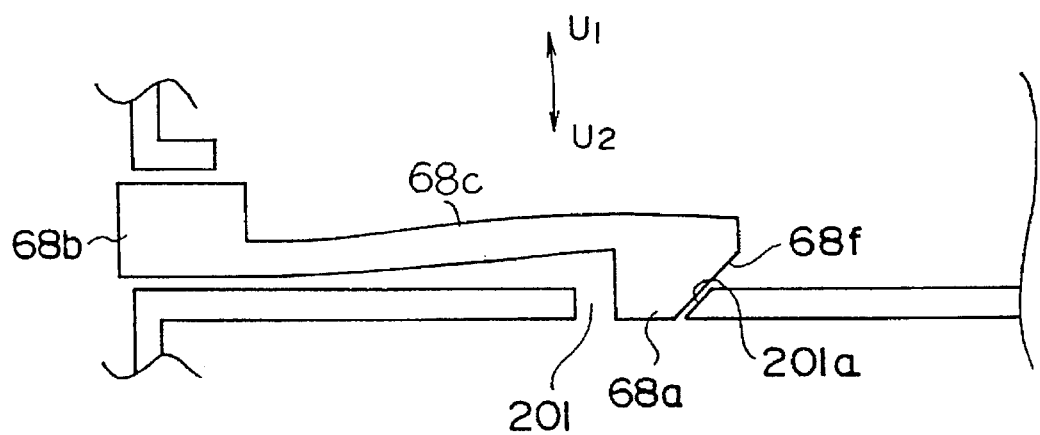
Figure 45:
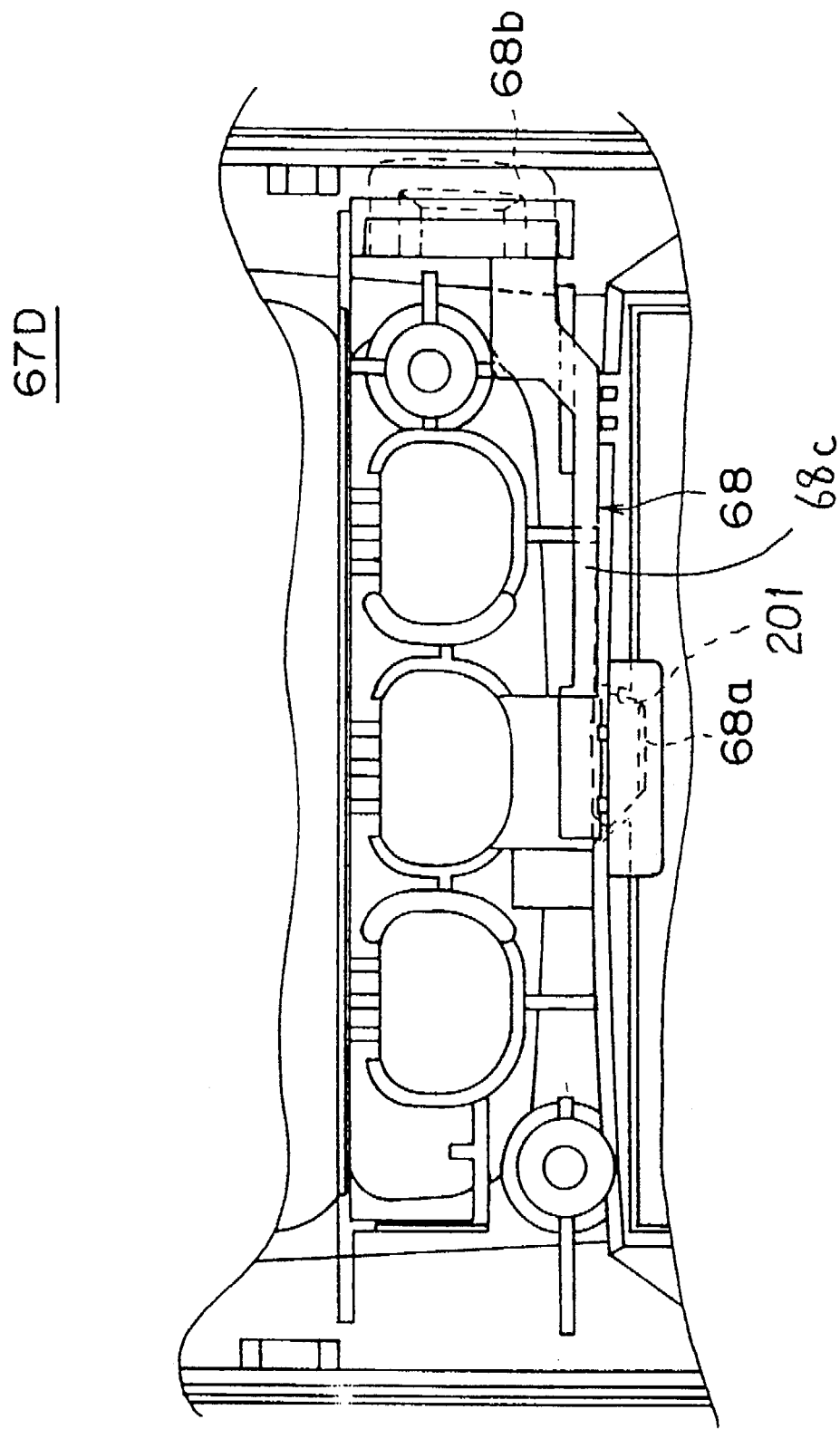

Referring to FIGS. 44A, 44B and 45, a further modification of the lid locking member of the foldable portable telephone including the hinge mechanism of the present invention will be described.

A lid locking member 67D, shown in FIGS. 44A, 44B and 45, includes the locking unit 68 only. No spring unit is included in the lid locking member 67D. As described above, the locking unit 68 is a resin-molded part made of the poly-acetal resin having an appropriate toughness.

When the push button 68b is pushed by the user, the locking unit 68D is moved in the direction X1. The projecting portion 68a is moved in the direction X1, and the slope 68f slides on the slope 201a of the opening 201. The arm portion 68c of the locking unit 68 is resiliently bent in the direction U1 as shown in FIG. 44B. The projecting portion 68a is moved toward the inside of the opening 201.

Accordingly, the projecting portion 68a is disconnected from the recessed portion 62a of the lid 62. The lid 62 is thus unlocked and the lid 62 will be opened.

When the external force exerted by the user to the push button 68b is removed, the locking unit 68 is moved in the direction X2 back to the initial position due to the biasing force of the locking unit 68 itself. The arm portion 68c of the spring unit 68 returns from the bent condition to the initial, straight condition as shown in FIG. 44A. Thus, the projecting portion 68a projects from the opening 201 in the direction Y2 again.

Figure 47:
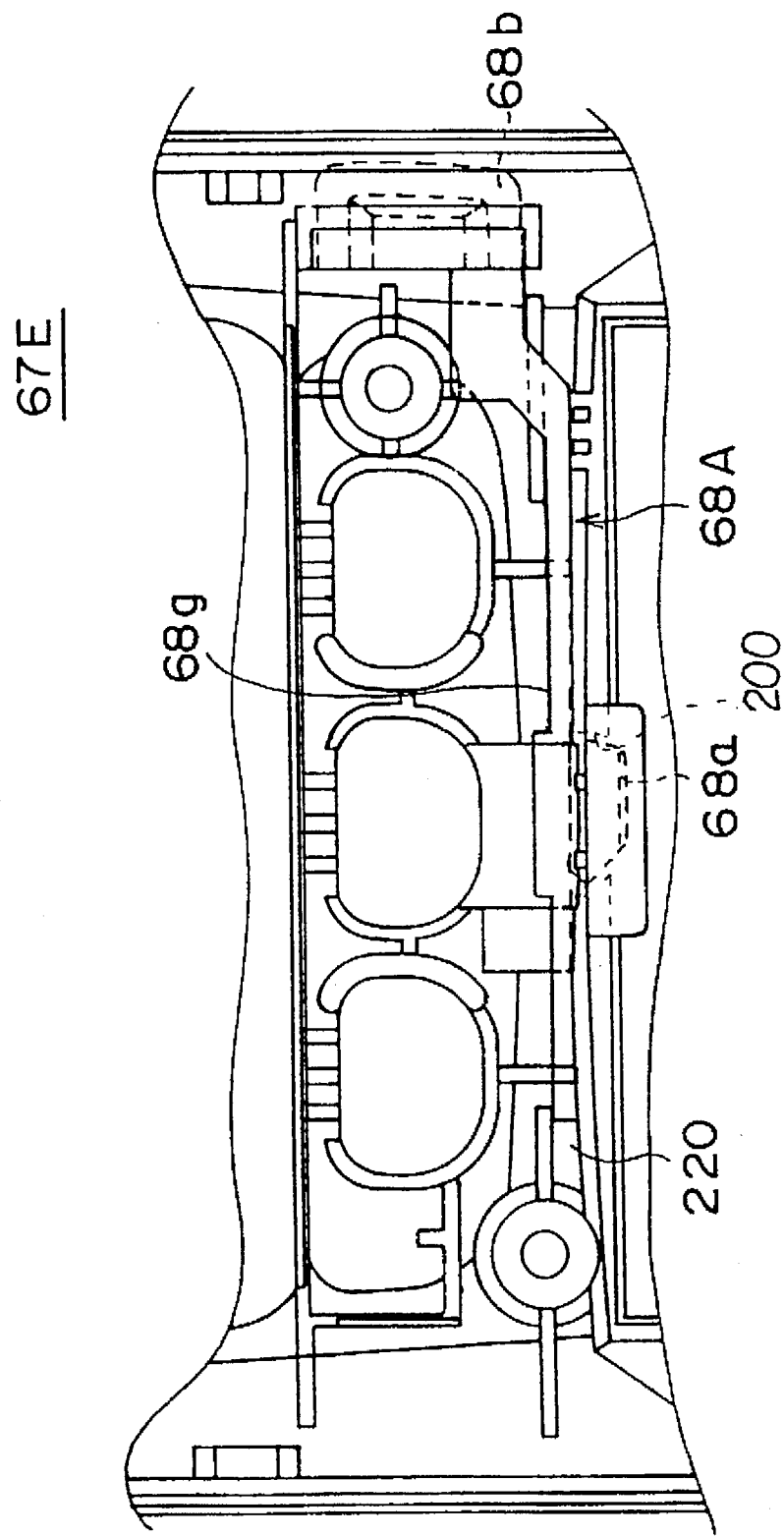

Referring to FIGS. 46A, 46B and 47, another modification of the lid locking member of the foldable portable telephone including the hinge mechanism of the present invention will be described.

A lid locking member 67E, shown in FIGS. 46A, 46B and 47, includes the locking unit 68A only. No spring unit is included in the lid locking member 67E. Similarly to the locking unit 68, the locking unit 68A is a resin-molded part made of the poly-acetal resin having an appropriate toughness.

When the push button 68b is pushed by the user, the locking unit 68A is moved in the direction X1. The projecting portion 68a is moved in the direction X1, and the slope 68f slides on the slope 201a of the opening 201. The arm portion 68c of the locking unit 68A is resiliently bent in the direction U1 as shown in FIG. 46B. Thus, the projecting portion 68a is moved toward the inside of the opening 201.

Accordingly, the projecting portion 68a is disconnected from the recessed portion 62a of the lid 62. The lid 62 is thus unlocked and the lid 62 will be opened.

When the external force exerted by the user to the push button 68b is removed, the locking unit 68A is moved in the direction X2 back to the initial position due to the biasing force of the locking unit 68A itself. The arm portion 68c of the spring unit 68 returns from the bent condition to the initial, straight condition as shown in FIG. 46A. Thus, the projecting portion 68a projects from the opening 201 in the direction Y2 again.

From the foregoing description, it is readily understood that the hinge mechanism of the present invention makes it possible to increase the flexibility in design of the foldable portable telephone. It is possible that the hinge mechanism of the present invention ensures a smooth operation of the foldable portable telephone. It is possible that the hinge mechanism of the present invention facilitates the assembling operations to incorporate the hinge mechanism into the foldable portable telephone.

Further, the present invention is not limited to the above-described embodiments, and variations and modifications may be made without departing from the scope of the present invention.

What is claimed is:

1. A hinge mechanism for use in a portable telephone in which a foldable lid is rotatably supported by the hinge mechanism to rotate the foldable lid between an opened position and a closed position, comprising:

a rotary shaft on which the lid is rotatably supported;
 a first spring being fitted to the shaft, said first spring generates a biasing force to rotate the lid on the shaft in a first direction from the closed position to the opened position;
 a second spring being fitted to the shaft, said second spring generates a biasing force to rotate the lid on the shaft in a second direction opposite to the first direction after the lid is further rotated from the opened position in the first direction;

a first stopper which restricts a rotation of the shaft in the first direction to cancel the biasing force of the first spring when the lid is further rotated on the shaft in the first direction from the opened position; and a second stopper which restricts a rotation of the shaft in the second direction to cancel the biasing force of the second spring when the lid is rotated on the shaft in the second direction back to the opened position after the lid is further rotated in the first direction from the opened position, wherein said hinge mechanism is so arranged to stop the rotation of the lid on the shaft and hold the lid at the opened position when the biasing force of the first spring is canceled by the first stopper and the biasing force of the second spring is canceled by the second stopper.

2. The hinge mechanism according to claim 1, further comprising:

a damper being fitted to the rotary shaft, said damper generates a resisting torque to reduce a rotating speed of the lid on the shaft when said damper is rotated in accordance with the rotation of the lid on the shaft.

3. The hinge mechanism according to claim 1, wherein said first stopper is provided in a casing of a lid opening member, and said first stopper is pushed by a projection of the shaft when the foldable lid is further rotated on the shaft in the first direction from the opened position, thereby restricting the rotation of the shaft in the first direction.

4. The hinge mechanism according to claim 2, wherein said damper comprises a rotor, said rotor having a ratio of its length to its diameter that is approximately ½.

5. The hinge mechanism according to claim 2, wherein said damper is a friction damper which includes a brake shoe and a friction surface, said friction damper being rotated while said brake shoe slides on said friction surface in accordance with the movement of the lid between the opened position and the closed position.

6. The hinge mechanism according to claim 5 wherein said friction damper comprises:

a spring which generates a biasing force to additionally press the brake shoe on the friction surface when the lid is moved from the closed position to the opened position.

7. The hinge mechanism according to claim 5, wherein said friction damper comprises:

a helical compression spring which is provided in the friction damper in a compressed condition, said compression spring generating a biasing force to rotate the lid on the rotary shaft in the first direction when said compression spring is twisted in the second direction, said compression spring generating a biasing force to additionally press the brake shoe on the friction surface when said helical compression spring is compressed.

8. The portable telephone which includes the hinge mechanism according to claim 1, further comprising:

a telephone body; and said foldable lid which is rotatably supported to the telephone body by said hinge mechanism, wherein said hinge mechanism is included in said telephone body.

9. The portable telephone which includes the hinge mechanism according to claim 1, further comprising:

a telephone body; and said foldable lid which is rotatably supported to the telephone body by said hinge mechanism, wherein said foldable lid has an end portion in which said hinge mechanism is included, and said foldable lid is attached to said telephone body.

10. The portable telephone which includes the hinge mechanism according to claim 2, further comprising:

a telephone body; and said foldable lid which is rotatably supported to the telephone body by said hinge mechanism, wherein said foldable lid has a first end portion containing said damper and a second end portion containing said hinge mechanism exclusive of said damper, and said foldable lid is attached to said telephone body.

11. The portable telephone which includes the hinge mechanism according to claim 2, further comprising:

a telephone body; and said foldable lid which is rotatably supported to the telephone body by said hinge mechanism, wherein said foldable lid has an end portion in which said damper is included, said telephone body has an end portion in which said hinge mechanism exclusive of said damper is included, and said foldable lid is attached to said telephone body.

12. The portable telephone which includes the hinge mechanism according to claim 2, further comprising:

a telephone body; and said foldable lid which is rotatably supported to the telephone body by said hinge mechanism, wherein said telephone body has an end portion in which said damper is included, said foldable lid has an end portion in which said hinge mechanism exclusive of said damper is included, and said foldable lid is attached to said telephone body.

13. The portable telephone which includes the hinge mechanism according to claim 2, further comprising:

a telephone body; and said foldable lid which is rotatably supported to the telephone body by said hinge mechanism, wherein said telephone body has a portion which includes an end portion containing only said damper and an end portion containing said hinge mechanism exclusive of said damper, and said foldable lid is attached to said portion of said telephone body.

14. The portable telephone which includes the hinge mechanism according to claim 2, further comprising:

a telephone body;

said foldable lid which is rotatably supported to the telephone body by the hinge mechanism; and a lid locking member which locks the foldable lid when the foldable lid is at the closed position, and unlocks the foldable lid when a push button is pushed by a user, said lid locking member comprising:

a locking unit which includes the push button and a projecting portion, said projecting portion being connected to a recessed portion of the foldable lid when the lid is at the closed position, and said projecting portion being disconnected from the recessed portion when the push button is pushed by the user; and a spring unit which generates a biasing force to return the locking unit back to an original position when a pushing force acting on the push button is removed, and said spring unit generates a biasing force to allow the projecting portion to project from an opening of the telephone body when the pushing force is removed.

15. The portable telephone which includes the hinge mechanism according to claim 2, further comprising:

a telephone body;

said foldable lid which is rotatably supported to the telephone body by the hinge mechanism; and a lid locking member which locks the foldable lid when the foldable lid is at the closed position, and unlocks the foldable lid when a push button is pushed by a user, said lid locking member comprising:

a locking unit which includes the push button, an arm portion, and a projecting portion at an intermediate part of said arm portion, one end of said arm portion being supported on the telephone body, said projecting portion being connected to a recessed portion of the foldable lid when the lid is at the closed position, and said projecting portion being disconnected from the recessed portion when the push button is pushed by the user; and a spring unit which generates a biasing force to return the locking unit back to an original position when a pushing force acting on the push button is removed, and said spring unit generates a biasing force to allow the projecting portion to project from an opening of the telephone body when said pushing force is removed.

16. The portable telephone according to claim 14, wherein said spring unit is a helical torsion spring, said torsion spring including a coil portion, a first arm portion and a second arm portion, said first and second arm portions extending from the coil portion, said coil portion being supported on the telephone body, said first arm portion being connected to the push button of the locking unit, and said second arm portion being connected to the projecting portion of the locking unit.

17. The portable telephone according to claim 14, wherein said locking unit further includes a groove portion in the vicinity of the projecting portion, and said spring unit is a helical torsion spring, said torsion spring including a coil portion, a first arm portion and a second arm portion, said first and second arm portions extending from the coil portion, said coil portion being supported on the telephone body, said first arm portion being connected to the push button of the locking unit, and said second arm portion being fitted in said groove portion of the locking unit.

18. The portable telephone which includes the hinge mechanism according to claim 2, further comprising:

a telephone body;

said foldable lid which is rotatably supported to the telephone body by the hinge mechanism; and a foldable lid locking member which locks the lid when the foldable lid is at the closed position, and unlocks the foldable lid when a push button is pushed by a user, said lid locking member comprising:

a locking unit which includes the push button, an arm portion, and a projecting portion at an intermediate part of said arm portion, said projecting portion being connected to a recessed portion of the foldable lid when the lid is at the closed position, and said projecting portion being disconnected from the recessed portion when the push button is pushed by the user; and a spring unit which generates a biasing force to return the locking unit back to an original position when a pushing force acting on the push button is removed, and said spring unit generates a biasing force to allow the projecting portion to project from an opening of the telephone body when said pushing force is removed, said spring unit having one end fitted to the arm portion of the locking unit, and said spring unit having the other end supported on the telephone body.

19. The portable telephone which includes the hinge mechanism according to claim 2, further comprising:

a telephone body;

said foldable lid which is rotatably supported to the telephone body by the hinge mechanism; and a foldable lid locking member which locks the lid when the foldable lid is at the closed position, and unlocks the foldable lid when a push button is pushed by a user, said lid locking member comprising:

a locking unit which includes the push button and a projecting portion, said projecting portion being connected to a recessed portion of the foldable lid when the lid is at the closed position, and said projecting portion being disconnected from the recessed portion when the push button is pushed by the user; and a spring unit which generates a biasing force to return the locking unit back to an original position when a pushing force acting on the push button is removed, and said spring unit generates a biasing force to allow the projecting portion to project from an opening of the telephone body when the pushing force is removed, wherein said spring unit is a helical compression spring, said compression spring having one end supported on the telephone body, and said compression spring having the other end fitted to the projecting portion of the locking unit.

20. The portable telephone which includes the hinge mechanism according to claim 2, further comprising:

a telephone body;

said foldable lid which is rotatably supported to the telephone body by the hinge mechanism; and a foldable lid locking member which locks the lid when the foldable lid is at the closed position, and unlocks the foldable lid when a push button is pushed by a user, said lid locking member comprising:

a locking unit which includes the push button, a resiliently deformable arm portion and a projecting portion, said projecting portion being connected to a recessed portion of the foldable lid when the lid is at the closed position, said projecting portion being disconnected from the recessed portion when the push button is pushed by the user, and said projecting portion including a slope slidable on an inner surface of an opening of the telephone body, wherein the locking unit is returned back to an original position due to a biasing force of said arm portion when a pushing force acting on the push button is removed, and the projecting portion projects from the opening of the telephone body due to said biasing force of said arm portion when said pushing force is removed.

21. The portable telephone which includes the hinge mechanism according to claim 2, further comprising:

a telephone body;

said foldable lid which is rotatably supported to the telephone body by the hinge mechanism; and a foldable lid locking member which locks the lid when the foldable lid is at the closed position, and unlocks the foldable lid when a push button is pushed by a user, said lid locking member comprising:

a locking unit which includes the push button, a resiliently deformable arm portion, and a projecting portion at an intermediate part of said arm portion, said arm portion having an end supported on the telephone body, said projecting portion being connected to a recessed portion of the foldable lid when the lid is at the closed position, said projecting portion being disconnected from the recessed portion when the push button is pushed by the user, and said projecting portion including a slope slidable on an inner surface of an opening of the telephone body, wherein the locking unit is returned back to an original position due to a biasing force of said arm portion when a pushing force acting on the push button is removed, and the projecting portion projects from the opening of the telephone body due to said biasing force when said pushing force of said arm portion is removed.

22. A hinge mechanism for use in a portable telephone in which a foldable lid is rotatably supported by the hinge mechanism to rotate the foldable lid between an opened position and a closed position, comprising:

a casing;

a first shaft rotatably connected to the casing;

a second shaft on which the lid is rotated, said first shaft and said second shaft being rotatably connected to each other;

a first spring being connected to said casing and said first shaft, said first spring generates a biasing force to rotate the first shaft relative to the casing in a first direction in which the lid is rotated from the closed position to the opened position;

a second spring being connected to said first shaft and said second shaft, said second spring generates a biasing force to rotate the first shaft relative to the second shaft in a second direction opposite to the first direction after the lid is further rotated from the opened position in the first direction;

a first stopper which restricts a rotation of the first shaft to the casing in the first direction to cancel the biasing force of the first spring when the lid is further rotated in the first direction from the opened position; and a second stopper which restricts a rotation of the first shaft to the second shaft in the second direction to cancel the biasing force of the second spring when the lid is rotated in the second direction back to the opened position after the lid is further rotated in the first direction from the opened position, wherein said hinge mechanism is so arranged to stop the rotation of the lid on the second shaft and hold the lid at the opened position when the biasing force of the first spring is canceled by the first stopper and the biasing force of the second spring is canceled by the second stopper.

23. The hinge mechanism according to claim 22, wherein said second spring is a snap leaf spring, and said second shaft comprises a cam portion having flat surfaces connected to said snap leaf spring, so that said second stopper is constituted by the connection of said cam portion and said snap leaf spring.

24. The hinge mechanism according to claim 22, further comprising:

a damper, being fitted to the first shaft, said damper generates a resisting torque to reduce a rotating speed of the lid on the second shaft when said damper is rotated in accordance with the rotation of the lid.

25. The hinge mechanism according to claim 23, further comprising:

a damper, being fitted to the first shaft, said damper generates a resisting torque to reduce a rotating speed of the lid on the second shaft when said damper is rotated in accordance with the rotation of the lid.

* * * * *